(12) United States Patent
Motoishi et al.

(10) Patent No.: US 8,947,868 B2
(45) Date of Patent: Feb. 3, 2015

(54) PROTECTIVE COVER AND INFORMATION PROCESSOR

(75) Inventors: Takuya Motoishi, Tokyo (JP); Yuuki Kubota, Tokyo (JP); Yasushi Itoshiro, Nagano (JP); Junichiro Ishii, Nagano (JP); Hiroshi Katayama, Nagano (JP); Junichiro Misawa, Nagano (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 13/611,857

(22) Filed: Sep. 12, 2012

(65) Prior Publication Data

US 2013/0083465 A1   Apr. 4, 2013

(30) Foreign Application Priority Data

Sep. 30, 2011 (JP) .................................. 2011-218614
Aug. 28, 2012 (JP) .................................. 2012-187293

(51) Int. Cl.
*H05K 5/00* (2006.01)

(52) U.S. Cl.
USPC .................................................. 361/679.21

(58) Field of Classification Search
USPC .................................................. 361/679.21
See application file for complete search history.

(56) References Cited

U.S. PATENT DOCUMENTS

| 7,136,282 | B1 * | 11/2006 | Rebeske | 361/679.55 |
|---|---|---|---|---|
| 7,855,879 | B2 * | 12/2010 | Kim | 361/679.28 |
| 7,869,843 | B2 * | 1/2011 | Ladouceur et al. | 455/575.3 |
| 8,009,421 | B2 * | 8/2011 | Misawa | 361/679.55 |
| 8,605,421 | B2 * | 12/2013 | Verschoor et al. | 361/679.3 |
| 2005/0105264 | A1 * | 5/2005 | Chen | 361/683 |
| 2009/0129007 | A1 * | 5/2009 | Muller | 361/679.27 |
| 2011/0222232 | A1 * | 9/2011 | Ma et al. | 361/679.21 |

FOREIGN PATENT DOCUMENTS

JP     2006-155050 A    6/2006

* cited by examiner

*Primary Examiner* — Forrest M Phillips
(74) *Attorney, Agent, or Firm* — Sony Corporation

(57) ABSTRACT

A protective cover includes an input operating unit and a cover unit. Through the input operating unit, an input operation to an electronic apparatus is performed. In the cover unit, the input operating unit is disposed. In the protective cover, the cover unit includes a folding section and two plate sections connected to the folding section. A connection terminal section is provided to which the electronic apparatus is connected. A wiring section which interconnects the input operating unit and the connection terminal section and which is bent attendantly on folding at the folding section is disposed inside the cover unit. Folding at the folding section into a predetermined shape enables setting of a cover mode in which the electronic apparatus is covered.

17 Claims, 66 Drawing Sheets

FIG.71

| <STATE 5> LAID-FLAT MODE, INSIDE-OUT MODE | |
|---|---|
| VIRTUAL KEYBOARD | DISPLAYED |
| KEYBOARD | IMPOSSIBLE |
| FORCIBLE INPUT | EFFECTIVE |

| <STATE 6> LAID-FLAT MODE, INSIDE-OUT MODE | |
|---|---|
| VIRTUAL KEYBOARD | NON-DISPLAYED |
| KEYBOARD | IMPOSSIBLE |
| FORCIBLE INPUT | EFFECTIVE |

| <STATE 1> LAID-FLAT MODE, INSIDE-OUT MODE | |
|---|---|
| VIRTUAL KEYBOARD | DISPLAYED |
| KEYBOARD | IMPOSSIBLE |
| FORCIBLE INPUT | NULLIFIED |

| <STATE 2> LAID-FLAT MODE, INSIDE-OUT MODE | |
|---|---|
| VIRTUAL KEYBOARD | NON-DISPLAYED |
| KEYBOARD | IMPOSSIBLE |
| FORCIBLE INPUT | NULLIFIED |

STATE 5 → FIRST FORCIBLE INPUT KEY → STATE 6
STATE 1 → FIRST FORCIBLE INPUT KEY → STATE 6
STATE 2 → FIRST FORCIBLE INPUT KEY → STATE 6

| <STATE 3> STAND MODE | |
|---|---|
| VIRTUAL KEYBOARD | DISPLAYED |
| KEYBOARD | POSSIBLE |
| FORCIBLE INPUT | EFFECTIVE |

| <STATE 4> STAND MODE | |
|---|---|
| VIRTUAL KEYBOARD | NON-DISPLAYED |
| KEYBOARD | POSSIBLE |
| FORCIBLE INPUT | EFFECTIVE |

| <STATE 7> STAND MODE | |
|---|---|
| VIRTUAL KEYBOARD | DISPLAYED |
| KEYBOARD | POSSIBLE |
| FORCIBLE INPUT | NULLIFIED |

| <STATE 8> STAND MODE | |
|---|---|
| VIRTUAL KEYBOARD | NON-DISPLAYED |
| KEYBOARD | POSSIBLE |
| FORCIBLE INPUT | NULLIFIED |

STATE 3 → FIRST FORCIBLE INPUT KEY → STATE 4
STATE 7 → FIRST FORCIBLE INPUT KEY → STATE 4
STATE 8 → FIRST FORCIBLE INPUT KEY → STATE 4

FIG.73
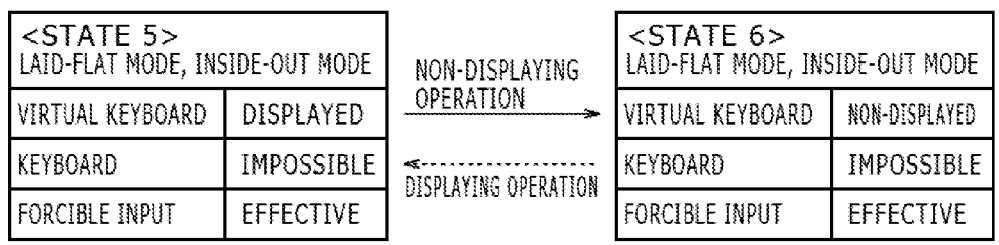
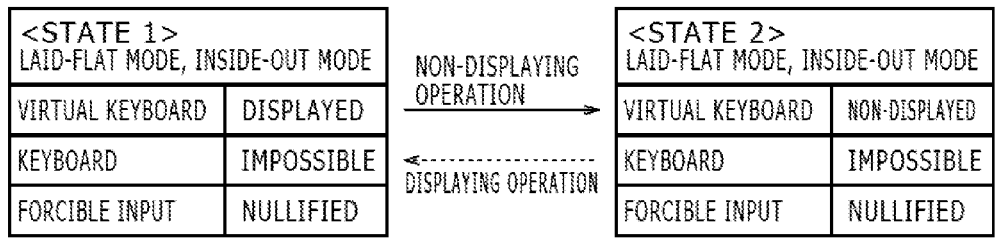
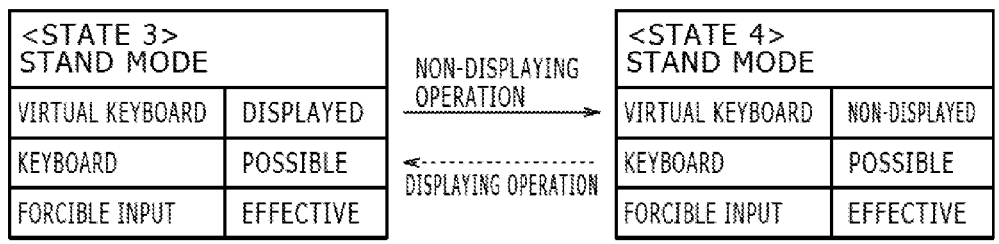
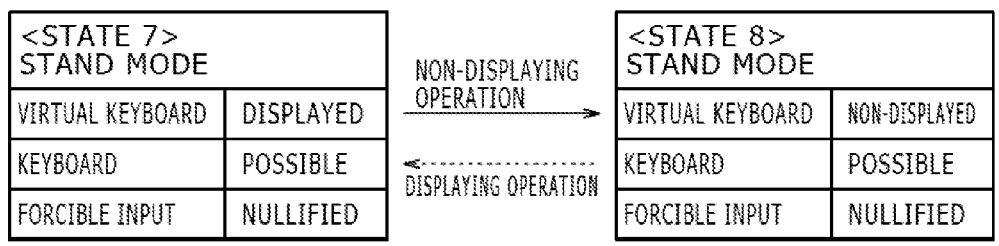

PROTECTIVE COVER AND INFORMATION PROCESSOR

CROSS-REFERENCE TO RELATED APPLICATION

The present application claims priority from Japanese Patent Application Nos. JP 2011-218614 filed in the Japanese Patent Office on Sep. 30, 2011, and JP 2012-187293 filed in the Japanese Patent Office on Aug. 28, 2012, the entire contents of which are incorporated herein by reference.

BACKGROUND

The present technology relates to a technical field concerning a protective cover and an information processor. More particularly, the present technology relates to a technical field for realizing enhanced convenience in use while securing a simplified structure and a reduced thickness, in regard of a protective cover and an information processor, wherein an input operating unit for inputting to an electronic apparatus and a foldable wiring section are disposed inside the protective cover.

There are information processors, such as personal computers, wherein predetermined information can be inputted to an electronic apparatus having a display surface through an input operating unit such as a keyboard and the inputted information can be processed.

Such information processors include those equipped with a protective cover which is provided with a plurality of folding sections and is folded into a predetermined shape so as to cover the electronic apparatus, thereby protecting the electronic apparatus (see, for example, Japanese Patent Laid-open No. 2006-155050, hereinafter referred to as Patent Document 1).

In the information processor described in Patent Document 1, the protective cover is folded into a predetermined shape to thereby house the electronic apparatus in the inside thereof, and the information processor is carried with the electronic apparatus in the housed state. Thus, protection of the electronic apparatus while the information processor is carried is ensured.

In addition, in the information processor described in Patent Document 1, the protective cover can be folded into another shape so as to function as a stand against which the electronic apparatus can be set standing. Where operations such as inputting of information through the input operating unit are conducted with the electronic apparatus kept standing against the protective cover functioning as a stand, it is possible to attain enhanced operability of the electronic apparatus in use.

Thus, the protective cover not only houses and protects the electronic apparatus but also functions as a stand for the electronic apparatus to thereby ensure good operability. Accordingly, with the protective cover, enhanced convenience in use of the information processor can be promised.

Besides, such protective covers as above-mentioned include those in which an input operating unit such as a keyboard is disposed in the protective cover, the input operating unit can be operated externally, and an external operation on the input operating unit causes information to be inputted to the electronic apparatus through wireless communication. In such a protective cover, since the input operating unit is disposed inside the protective cover, it is unnecessary to prepare a separate input operating unit. Thus, enhanced convenience in use is promised.

SUMMARY

In the last-mentioned protective cover, however, inputting of information to the electronic apparatus is performed by wireless communication. Therefore, a circuit substrate and a power supply (battery) for wireless communication have to be disposed inside the protective cover in addition to the input operating unit. Accordingly, the protective cover would be complicated in structure, hampering realization of a thinner configuration.

Thus, there is a need for a protective cover and an information processor wherein enhanced convenience in use is realized while securing a simplified structure and a reduce thickness, whereby the above-mentioned problems involved in the related art are solved.

According to an embodiment of the present technology, firstly, there is provided a protective cover including: an input operating unit through which an input operation to an electronic apparatus is performed; and a cover unit in which the input operating unit is disposed. In the protective cover, the cover unit includes a folding section and two plate sections connected to the folding section, and a connection terminal section is provided to which the electronic apparatus is connected. A wiring section which interconnects the input operating unit and the connection terminal section and which is bent attendantly on folding at the folding section is disposed inside the cover unit, and folding at the folding section into a predetermined shape enables setting of a cover mode in which the electronic apparatus is covered.

In the protective cover, therefore, information is inputted to the electronic apparatus through the wiring section by an operation on the input operating unit.

Secondly, in the above-mentioned protective cover, preferably, folding at the folding section into a shape different from the predetermined shape permits part of the plate sections to function as a stand section against which the electronic apparatus can stand, whereby setting of a stand mode in which the electronic apparatus can stand against the stand section is performed.

Thus, with folding at the folding section into a shape different from the predetermined shape, part of the plate sections functions as the stand section against which the electronic apparatus can stand, whereby setting of the stand mode in which the electronic apparatus can stand is performed. This increases the use of the protective cover.

Thirdly, in the above-mentioned protective cover, preferably, a back plate operative to support the electronic apparatus when the electronic apparatus stands against the stand section is attached to the stand section.

Since the back plate operative to bear the electronic apparatus when the electronic apparatus stands against the stand section is attached to the stand section, the electronic apparatus is permitted to stand against the stand section through the back plate.

Fourthly, in the above-mentioned protective cover, preferably, the connection terminal section is provided at a surface of the back plate, and part of the wiring section is disposed inside the back plate.

With the connection terminal section provided at a surface of the back plate and with part of the wiring section disposed inside the back plate, the wiring section is connected to the connection terminal section provided on the back plate.

Fifthly, in the above-mentioned protective cover, preferably, one of the plate sections functions as a mount section including: a mount surface which is contacted or approached by a side portion of the electronic apparatus when the electronic apparatus stands against the stand section; and a position restraining section which restrains the position of the electronic apparatus.

Thus, one of the plate sections functions as the mount section including: the mount surface which is contacted or approached by a side portion of the electronic apparatus when the electronic apparatus stands against the stand section; and the position restraining section which restrains the position of the electronic apparatus. This ensures that the position of the electronic apparatus relative to the cover unit is restrained by the position restraining section.

Sixthly, in the above-mentioned protective cover, preferably, one of the plate sections functions as an operating region section having the input operating unit, and a plurality of the position restraining sections are provided at an interval along a direction in which the mount section and the operating region section are aligned.

Thus, one of the plate sections functions as the operating region section having the input operating unit, and a plurality of the position restraining sections are provided at an interval along the direction in which the mount section and the operating region section are aligned. This ensures that the inclination status of the electronic apparatus is changed through selection of the position restraining section.

Seventhly, in the above-mentioned protective cover, preferably, a position restraining projection projecting from the mount surface is provided as the position restraining section.

Where the position restraining projection projecting from the mount surface is provided as the position restraining section, a simplified position restraining section is realized.

Eighthly, in the above-mentioned protective cover, preferably, a position restraining recess opening in the mount surface is formed as the position restraining section.

Where the position restraining recess opening in the mount surface is provided as the position restraining section, a simplified position restraining section is realized.

Ninthly, in the above-mentioned protective cover, preferably, the position restraining recess is formed in part other than part where the wiring section is disposed.

The structure in which the position restraining recess is formed in part other than the part where the wiring section is disposed is free of obstacle to the arrangement of the wiring section relative to the mount section.

Tenthly, in the above-mentioned protective cover, preferably, a position restraining magnet is provided as the position restraining section.

With the position restraining magnet provided as the position restraining section, the position restraining section is formed without processing a surface of the cover unit.

Eleventhly, in the above-mentioned protective cover, preferably, a first input operating unit and a second input operating unit are provided as the input operating unit, and the folding section is provided between the first input operating unit and the second input operating unit.

With the first input operating unit and the second input operating unit provided as different kinds of the input operating unit and with the folding section provided between the first input operating unit and the second input operating unit, the folding section can be folded when the protective cover is set into the cover mode.

Twelfthly, in the above-mentioned protective cover, preferably, binding parts are provided respectively at one end portion and other end portion of the cover unit, and the binding parts are bound to each other so that the electronic apparatus is wholly covered when the cover mode is set.

With the binding parts provided respectively at the one end portion and the other end portion of the cover unit and with the binding parts interconnected so that the electronic apparatus is entirely covered when the cover mode is set, the electronic apparatus is housed inside the cover unit.

Thirteenthly, in the above-mentioned protective cover, preferably, the cover unit is formed from an elastomer.

Where the cover unit is formed from an elastomer, the electronic apparatus is not liable to slip out of position relative to the cover unit.

Fourteenthly, in the above-mentioned protective cover, preferably, the cover unit is provided with a contact-preventing section which is located between the plate section and the electronic apparatus when the cover mode is set.

Where the cover unit is provided with the contact-preventing section which is located between the plate section and the electronic apparatus when the cover mode is set, the electronic apparatus is prevented from making contact with the operating region section when the cover mode is set.

Fifteenthly, in the above-mentioned protective cover, preferably, the cover unit is provided with a stand section against which the electronic apparatus is permitted to stand, the input operating unit is provided with an operating key, and that part of the plate section which faces the operating key is provided with an operating recess opening to a side opposite to the operating key side.

Thus, the cover unit is provided with the stand section against which the electronic apparatus is permitted to stand, the input operating unit is provided with the operating key or keys, and that part of the plate section which faces each operating key is provided with the operating recess opening to the side opposite to the operating key side. This configuration reduces the area of contact between the operating region section and the electronic apparatus.

Sixteenthly, in the above-mentioned protective cover, preferably, the cover unit is provided with a stand section against which the electronic apparatus is permitted to stand, a back plate which supports the electronic apparatus when the electronic apparatus stands against the stand section is attached to the stand section, and the electronic apparatus is supported on the back plate so as to be turnable and movable along the back plate.

Thus, the cover unit is provided with the stand section against which the electronic apparatus is permitted to stand, the back plate which bears the electronic apparatus when the electronic apparatus stands against the stand section is attached to the stand section, and the electronic apparatus is supported on the back plate so as to be turnable and movable along the back plate. This ensures that the orientation of the electronic apparatus can be changed.

According to another embodiment of the present technology, there is provided an information processor including: an electronic apparatus having a display surface; and a protective cover including an input operating unit through which an input operation to the electronic apparatus is performed and a cover unit in which the input operating unit is disposed. In the information processor, the cover unit includes a folding section and two plate sections connected to the folding section, and a connection terminal section is provided to which the electronic apparatus is connected. A wiring section which interconnects the input operating unit and the connection terminal section and which is bent attendantly on folding at the folding section is disposed inside the cover unit, and folding at the folding section into a predetermined shape enables setting of a cover mode in which the electronic apparatus is covered.

In the information processor, therefore, information is inputted to the electronic apparatus through the wiring section by an operation on the input operating unit.

The protective cover according to one embodiment of the present technology includes: the input operating unit through which the input operation to the electronic apparatus is performed; and the cover unit in which the input operating unit is disposed. In the protective cover, the cover unit includes the folding section and the two plate sections connected to the folding section, and the connection terminal section is provided to which the electronic apparatus is connected. The wiring section which interconnects the input operating unit and the connection terminal section and which is bent attendantly on folding at the folding section is disposed inside the cover unit, and folding at the folding section into a predetermined shape enables setting of a cover mode in which the electronic apparatus is covered.

Therefore, it is unnecessary to dispose a circuit substrate and a battery for wireless communication inside the protective cover, in addition to the input operating unit. Accordingly, in regard of the protective cover, enhanced convenience in use can be realized while securing a simplified structure and a reduced thickness.

In the embodiment of the present technology, folding at the folding section into the shape different from the predetermined shape permits the part of the plate sections to function as the stand section against which the electronic apparatus can stand, whereby setting of the stand mode in which the electronic apparatus can stand against the stand section is performed.

This ensures that the protective cover finds a variety of uses, and enhanced convenience of the protective cover can be promised.

In the embodiment of the present technology, the back plate operative to support the electronic apparatus when the electronic apparatus stands against the stand section is attached to the stand section.

This makes it possible to stabilize the standing state of the electronic apparatus.

In the embodiment of the present technology, the connection terminal section is provided at the surface of the back plate, and the part of the wiring section is disposed inside the back plate.

This ensures that the wiring section is connected to the connection terminal section provided at the back plate. Therefore, a stable standing state of the electronic apparatus is secured, and a stable connection state of the wiring section to the electronic apparatus can be secured.

In the embodiment of the present technology, one of the plate sections functions as the mount section including: the mount surface which is contacted or approached by a side portion of the electronic apparatus when the electronic apparatus stands against the stand section; and the position restraining section which restrains the position of the electronic apparatus.

Therefore, the position restraining section prevents the electronic apparatus from slipping out of position relative to the cover unit, the electronic apparatus is permitted to stand against the stand section in a stable state, and a good use condition can be secured.

In the embodiment of the present technology, one of the plate sections functions as the operating region section having the input operating unit, and a plurality of the position restraining sections are provided at an interval along the direction in which the mount section and the operating region section are aligned.

This makes it possible to hold the electronic apparatus with a change in the inclination status of the electronic apparatus, and to promise an enhanced convenience in use.

In the embodiment of the present technology, the position restraining projection projecting from the mount surface is provided as the position restraining section.

This makes it possible to hold the electronic apparatus in a stable state by a simple configuration.

In the embodiment of the present technology, the position restraining recess opening in the mount surface is formed as the position restraining section.

This makes it possible to hold the electronic apparatus in a stable state by a simple configuration.

In the embodiment of the present technology, the position restraining recess is formed in part other than the part where the wiring section is disposed.

This makes it possible to form the position restraining section without obstructing in any way the arrangement of the wiring section relative to the mount section.

In the embodiment of the present technology, the position restraining magnet is provided as the position restraining section.

This makes it possible to hold the electronic apparatus in a stable state, without processing a surface of the cover unit.

In the embodiment of the present technology, the first input operating unit and the second input operating unit are provided as the input operating unit, and the folding section is provided between the first input operating unit and the second input operating unit.

Since the folding section can be folded when the protective cover is set into the cover mode, therefore, a reduction in the size of the protective cover in the cover mode can be realized while securing enhanced operability.

In the embodiment of the present technology, the binding parts are provided respectively at the one end portion and the other end portion of the cover unit, and the binding parts are bound to each other so that the electronic apparatus is wholly covered when the cover mode is set.

This makes it possible to attain enhanced portability and to prevent the electronic apparatus from being disengaged from the protective cover.

In the embodiment of the present technology, the cover unit is formed from an elastomer.

This ensures that the electronic apparatus is not liable to slip out of position relative to the cover unit, and the electronic apparatus can be held in a stable state without providing any part for exclusive use for restraining the position of the electronic apparatus.

In the embodiment of the present technology, the cover unit is provided with the contact-preventing section which is located between the plate section and the electronic apparatus when the cover mode is set.

This ensures that when the cover mode is set, the electronic apparatus is not contacted by the operating region section but is contacted by the contact-preventing section, so that the electronic apparatus can be prevented from being marred.

In the embodiment of the present technology, the cover unit is provided with the stand section against which the electronic apparatus is permitted to stand, the input operating unit is provided with the operating key, and that part of the plate section which faces the operating key is provided with the operating recess opening to the side opposite to the operating key side.

This ensures that when the cover mode is set, the area of contact between the operating region section and the electronic apparatus is small, so that deposition of fingerprints or dust on the electronic apparatus can be restrained.

In the embodiment of the present technology, the cover unit is provided with the stand section against which the electronic apparatus is permitted to stand, the back plate which supports the electronic apparatus when the electronic apparatus stands against the stand section is attached to the stand section, and the electronic apparatus is supported on the back plate so as to be turnable and movable along the back plate.

This makes it possible to use the electronic apparatus with changes in orientation, so that enhanced convenience in use can be promised.

The information processor according to another embodiment of the present technology includes: the electronic apparatus having the display surface; and the protective cover including the input operating unit through which the input operation to the electronic apparatus is performed and the cover unit in which the input operating unit is disposed. In the information processor, the cover unit includes the folding section and the two plate sections connected to the folding section, and the connection terminal section is provided to which the electronic apparatus is connected. The wiring section which interconnects the input operating unit and the connection terminal section and which is bent attendantly on folding at the folding section is disposed inside the cover unit, and folding at the folding section into the predetermined shape enables setting of the cover mode in which the electronic apparatus is covered.

This makes it unnecessary to provide a circuit substrate and a battery for wireless communication inside the cover unit of the protective cover, in addition to the input operation unit, and to realize enhanced convenience in use while securing a simplified structure and a reduced thickness.

BRIEF DESCRIPTION OF THE DRAWINGS

FIG. 70 is a schematic side view showing a condition where the detection switch is ON;

FIG. 71 shows, together with FIGS. 72 to 75, transitions between various states of the protective cover, and shows transitions in state when a first forcible input key is operated by the user;

FIG. 73 shows transitions in state when an operation of setting the displayed/non-displayed state of a virtual keyboard is carried out by the user;

DETAILED DESCRIPTION OF THE PREFERRED EMBODIMENTS

Figure 1:
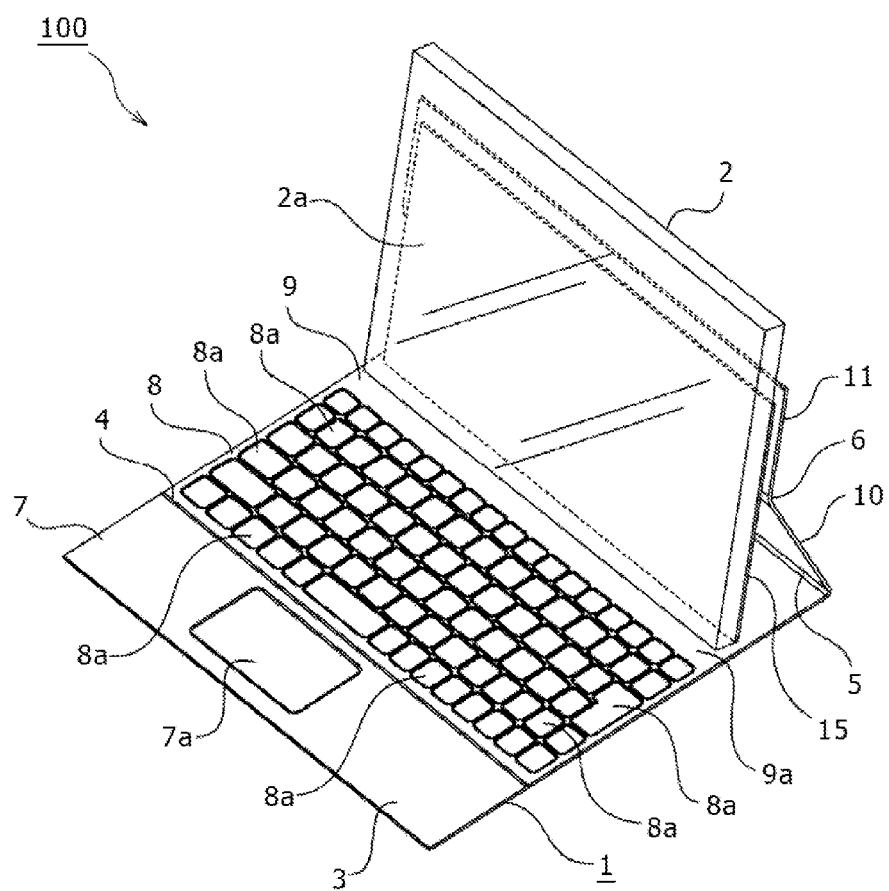
FIG. 1 shows, together with FIGS. 2 to 51, a best mode for carrying out the present technology, and is a perspective view of an information processor in a condition where a protective cover is set in a stand mode.

Now, best modes for carrying out the present technology will be described referring to the attached drawings.

In the best modes as follows, an information processor of the present technology is applied to a personal computer, and a protective cover of the present technology to a protective cover for protecting an electronic apparatus of the personal computer.

Incidentally, the range of application of the present technology is not limited to the personal computer and the protective cover for protecting the electronic apparatus of the personal computer. The present technology is widely applicable to various information processors such as input devices such as PDAs (personal digital assistants), electronic notes, electronic memos, etc. and communication devices capable of inputting information, represented by portable phones, and protective covers provided for these various information processors.

In the following description, the forward (front), rearward (rear), leftward (left) and rightward (right) directions (sides) will refer to those directions (sides) in the condition where the protective cover is placed on a desk or the like in a vertically elongated flat plat form. In addition, in the condition where the electronic apparatus is set standing against the protective cover, the user's side will be referred to as the front side, and the electronic apparatus side as the rear side, in describing the front, rear, upper, lower, left and right sides.

Incidentally, the front, rear, upper, lower, left and right sides described in the following are merely for convenience of description, and these directions are not restrictive of the carrying-out of the present technology.

[Configuration of Information Processor in First Embodiment]

Now, the configuration of an information processor in the first embodiment will be described below.

An information processor 100 in the first embodiment includes a protective cover 1 and an electronic apparatus 2 (see FIGS. 1 to 4).

The protective cover 1 is foldable, and includes a cover unit 3 and required parts disposed inside the cover unit 3. The protective cover 1 is formed in a thin, vertically elongated, substantially rectangular plate-like shape in its state before being folded (see FIGS. 5 and 6).

The cover unit 3 is formed from, for example, an elastomer, which is a material having a high coefficient of friction.

Incidentally, the material of the cover unit 3 is not restricted to elastomers but may be, for example, silicones, felt, compressed felt, resin materials such as polypropylene and ABS (acrylonitrile-butadiene-styrene copolymer), etc., leather or the like.

The cover unit 3 is formed in a bag-like shape from the above-mentioned material such as elastomer, and the required parts are disposed inside the cover unit 3.

The cover unit 3 has a first folding section 4, a second folding section 5 and a third folding section 6 which extend in the left-right direction and are provided in this order along the direction from the front side toward the rear side, at intervals along the front-rear direction.

Of the cover unit 3, the part on the front side of the first folding section 4 is provided as a first operating region section 7. Of the part between the first folding section 4 and the second folding section 5, the front-side portion (roughly one half the part) is provided as a second operating region section 8, and the portion on the rear side of the second operating region section 8 is provided as a mount section 9. The part between the second folding section and the third folding section 6 is provided as a link section 10. The part on the rear side of the third folding section 6 is provided as a stand section 11.

The first operating region section 7, the second operating region section 8, the mount section 9, the link section 10 and the stand section 11 are each provided as a plate section.

In the interiors of the first operating region section 7, the second operating region section 8, the mount section 9, the link section 10 and the stand section 11, thin plate-like members (not shown) are disposed respectively. Consequently, the first operating region section 7, the second operating region section 8, the mount section 9, the link section 10 and the stand section 11 are set high in rigidity, whereas the first folding section 4, the second folding section 5 and the third folding section 6 which are not provided therein with any plate-like member are each in an easily foldable state. The plate-like members are formed, for example, paper, resin or metal.

Figure 5:
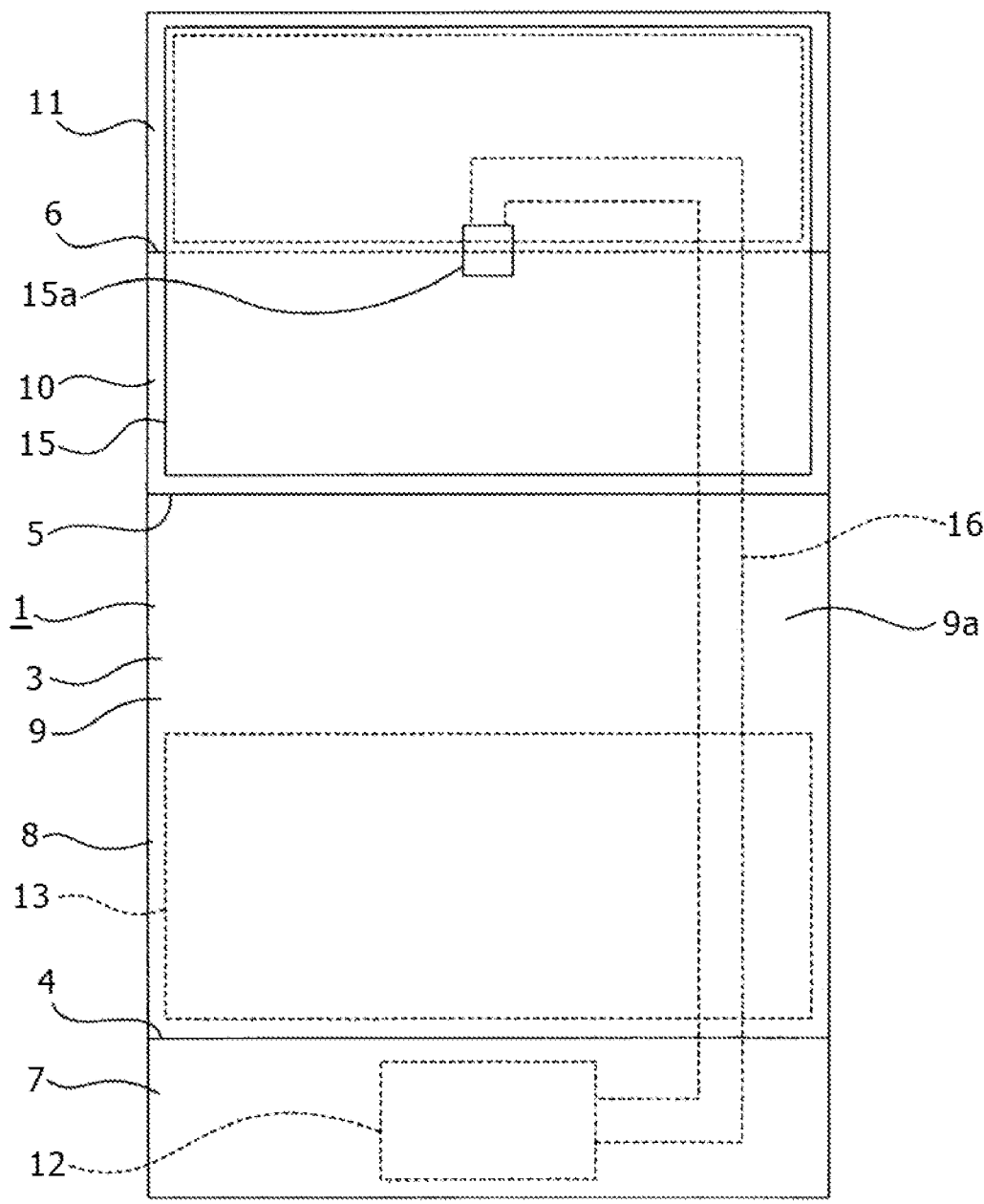
FIG. 5 is a schematic plan view of a cover.
Figure 6:
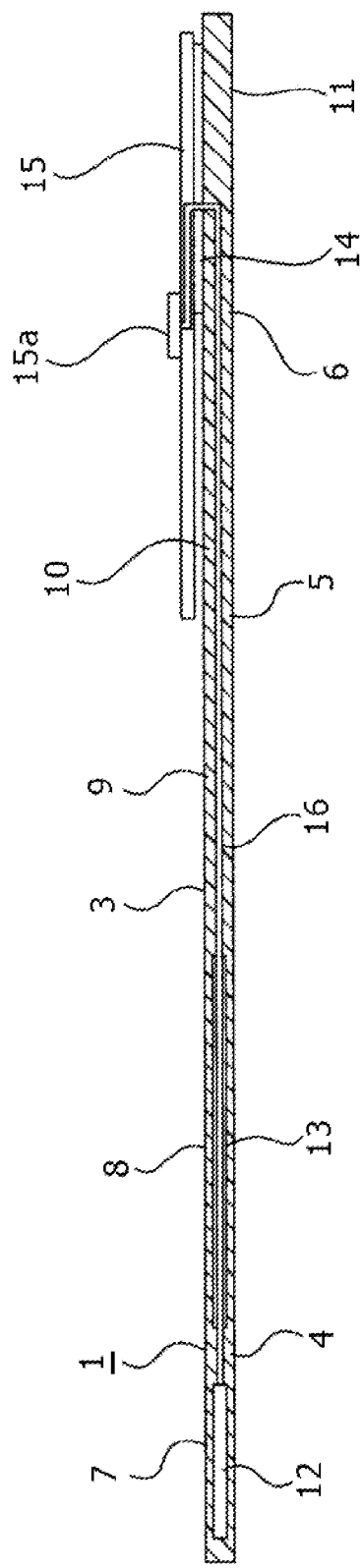
FIG. 6 is a schematic side view of the cover.

Inside the first operating region section 7 is disposed a touch pad 12 which functions as a first input operating unit (see FIGS. 5 and 6). The touch pad 12 is disposed in a left-right-directionally roughly central area of the first operating region section 7. The tough pad 12 can be operated by an operation from the upper side of the first operating region section 7, and is operated, for example, by an electrostatic system wherein a change in capacitance (electrostatic capacity) is detected or a pressure-sensing system wherein a change in pressure is detected.

Figure 7:
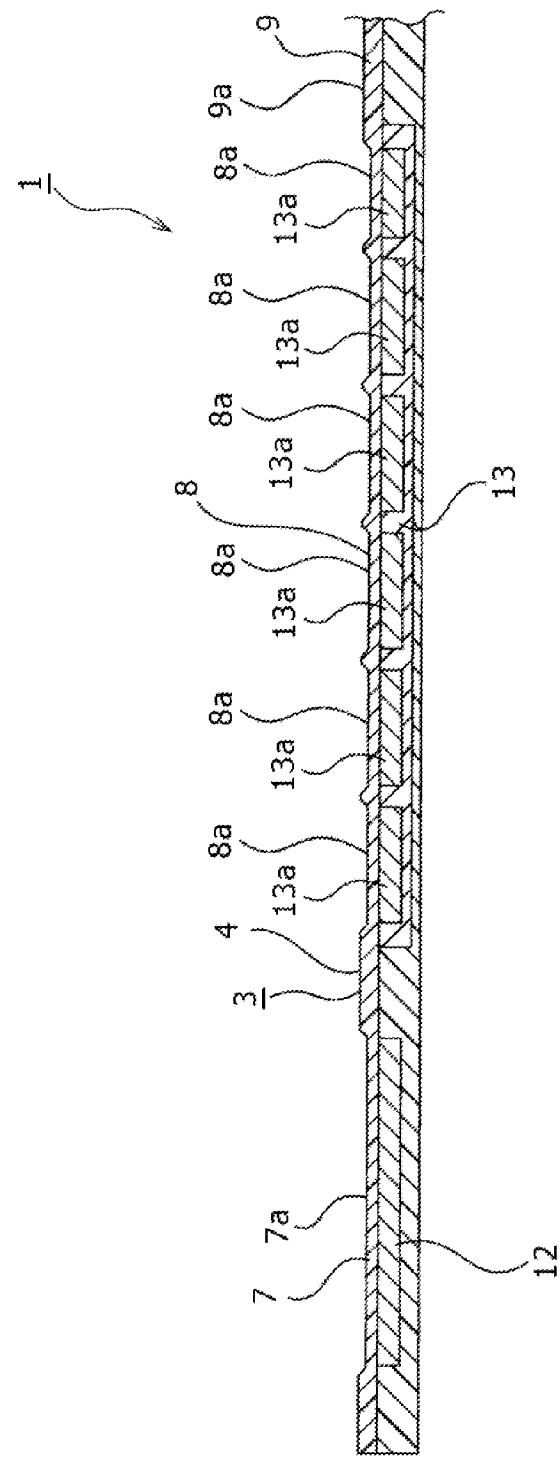
FIG. 7 is a schematic enlarged sectional view showing an operating recess formed in the cover.

The first operating region section 7 is formed, on the upper side of the area where the touch pad 12 is disposed, with a shallow operating recess 7a opening to the upper side (see FIGS. 1 and 7). With the operating recess 7a thus formed, the user can externally specify a position on the touch pad 12, which ensures enhanced convenience in use.

At a front end portion of the first operating region section 7 is provided a binding part, which will be described later.

Inside the second operating region section 8 there is disposed a keyboard 13 which functions as a second input operating unit (see FIGS. 5 and 6). The keyboard 13 is provided with a plurality of operating keys 13a, 13a . . . (see FIG. 7). The operating keys 13a, 13a . . . are arranged in the front-rear direction and the left-right direction, and can be operated by operations from the upper side of the second operating region section 8. These keys are operated, for example, by an electrostatic system wherein a change in capacitance is detected or a pressure-sensing system wherein a change in pressure is detected or a contact system wherein key switches or membrane switches are operated by pressing operations.

The second operating region section 8 is formed, on the upper side of areas where the operating keys 13a, 13a . . . are disposed, with shallow operating recesses 8a, 8a . . . opening to the upper side (see FIGS. 1 and 7). With the operating recesses 8a, 8a . . . thus formed, the user can externally specify positions of the operating keys 13a, 13a . . . of the keyboard 13, which promises enhanced convenience in use.

Incidentally, the touch pad 12 and the keyboard 13 may be detachable from the cover unit 3.

An upper surface of the mount section 9 is formed as a mount surface 9a (see FIGS. 1, 5 and 6).

On the upper surface (front surface) of the stand section 11, a back plate 15 formed in a horizontally elongated rectangular shape is fixed by an adhesive 14, for example (see FIGS. 1, 2, 5 and 6).

The back plate 15 is formed in a rectangular shape of which the horizontal length is slightly smaller than the horizontal length of the stand section 11 and the vertical length is greater than the vertical length of the stand section 11. The vertical length of the back plate 15 is set to be slightly smaller than the total vertical length of the stand section 11 and the link section 10. The back plate 15 is fixed, at its about one half on the front side, to the stand section 11 with the adhesive 14. A connection terminal section 15a is provided at a roughly central part of the front surface of the back plate 15.

A portion exclusive of a one-end-side portion of a wiring board 16 which functions as a wiring section is disposed inside the cover unit 3 (see FIGS. 5 and 6). As the wiring board 16, for example, a flexible printed wiring board is used. As the wiring section, those of other kinds may also be used insofar as they are bendable; for example, cables having conductors coated with a coating portion may be used.

Of the wiring board 16, an other-end portion is connected to the touch pad 12, a portion near the other end is connected to the keyboard 13, and a one-end portion is connected to the connection terminal section 15a provided on the back plate 15. The wiring board 16 is disposed inside the first operating region section 7, the second operating region section 8, the mount section 9, the link section 10 and the stand section 11 in this order from the other-end side. A portion near the one end of the wiring board 16 is protruded from the stand section 11, and the protruded portion is passed through the adhesive 14 and the inside of the back plate 15, to be connected to the connection terminal section 15a.

The electronic apparatus 2 is formed, for example, in a thin, horizontally elongated rectangular shape, and has a battery.

As the electronic apparatus 2, for example, a tablet terminal is used. A tablet terminal is a device such that input of various kinds of information, display of information, modifications of information displayed, etc. can be performed by operations made on a display surface of the device with a stylus pen or a finger. Examples of the tablet terminal include those of various forms such as electronic note, computer device, electronic dictionary, electronic calculator, game machine, telecommunication device, electronic book, etc.

The electronic apparatus 2 is operated by supplying electric power from the battery. Incidentally, the electronic apparatus 2 can be supplied with electric power also from an external power supply (commercial power supply).

A front surface of the electronic apparatus 2 is formed as a display surface 2a. On the display surface 2a of the electronic apparatus 2, for example, not only characters or pictures or video pictures are displayed but also a virtual keyboard can be displayed; in addition, a character input column is displayed in which characters inputted through operations on the keyboard 13 or the virtual keyboard are displayed. The virtual keyboard displayed on the display surface 2a has a plurality of operation keys arranged in the same manner as the operating keys 13a, 13a, . . . of the keyboard 13.

Besides, the display surface 2a functions also as an operating surface through which the user can make a predetermined input operation with a stylus pen or a finger. The operating surface can be operated, for example, by an electrostatic system wherein a change in capacitance is detected or a pressure-sensing system wherein a change in pressure is detected.

Figure 8:
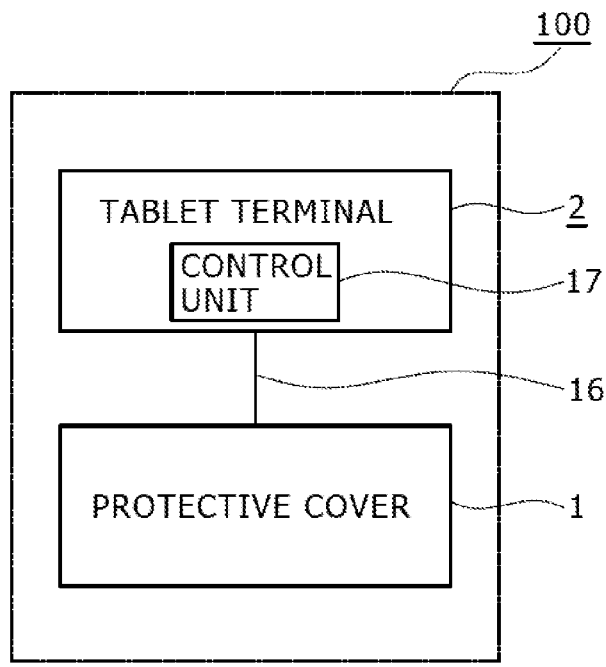
FIG. 8 is a block diagram showing a configuration of the information processor.

In the electronic apparatus 2 there is incorporated a control unit 17 such as a CPU (central processing unit) which controls the whole part of the information processor 100 (see FIG. 8). Processing of information inputted according to operations on the touch pad 12 and the keyboard 13, display of images on the display surface 2a according to information inputted, etc. are performed by the control unit 17.

Figure 9:
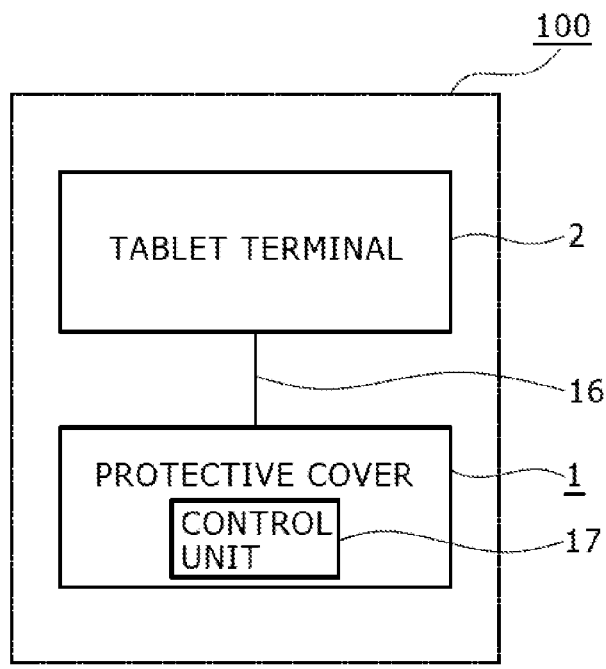
FIG. 9 is a block diagram showing another configuration of the information processor.

Incidentally, while an example wherein the control unit 17 is incorporated in the electronic apparatus 2 has been described above, a configuration may also be adopted wherein the control unit 17 is incorporated in the protective cover 1 (see FIG. 9).

The electronic apparatus 2 is provided with a terminal section (not shown) on a surface on the opposite side from the display surface 2a. With the terminal section connected to the connection terminal section 15a provided on the back plate 15, the electronic apparatus 2 is connected to the keyboard 13 and the touch pad 12 through the wiring board 16.

[Modes of Protective Cover]

In the protective cover 1, there are set, as will be described below, a stand mode wherein the protective cover 1 is folded to be used as a stand for the electronic apparatus 2 (see FIGS. 1 and 2) and a cover mode wherein the protective cover 1 houses therein and protects the electronic apparatus 2 (see FIGS. 3 and 4).

Figure 2:
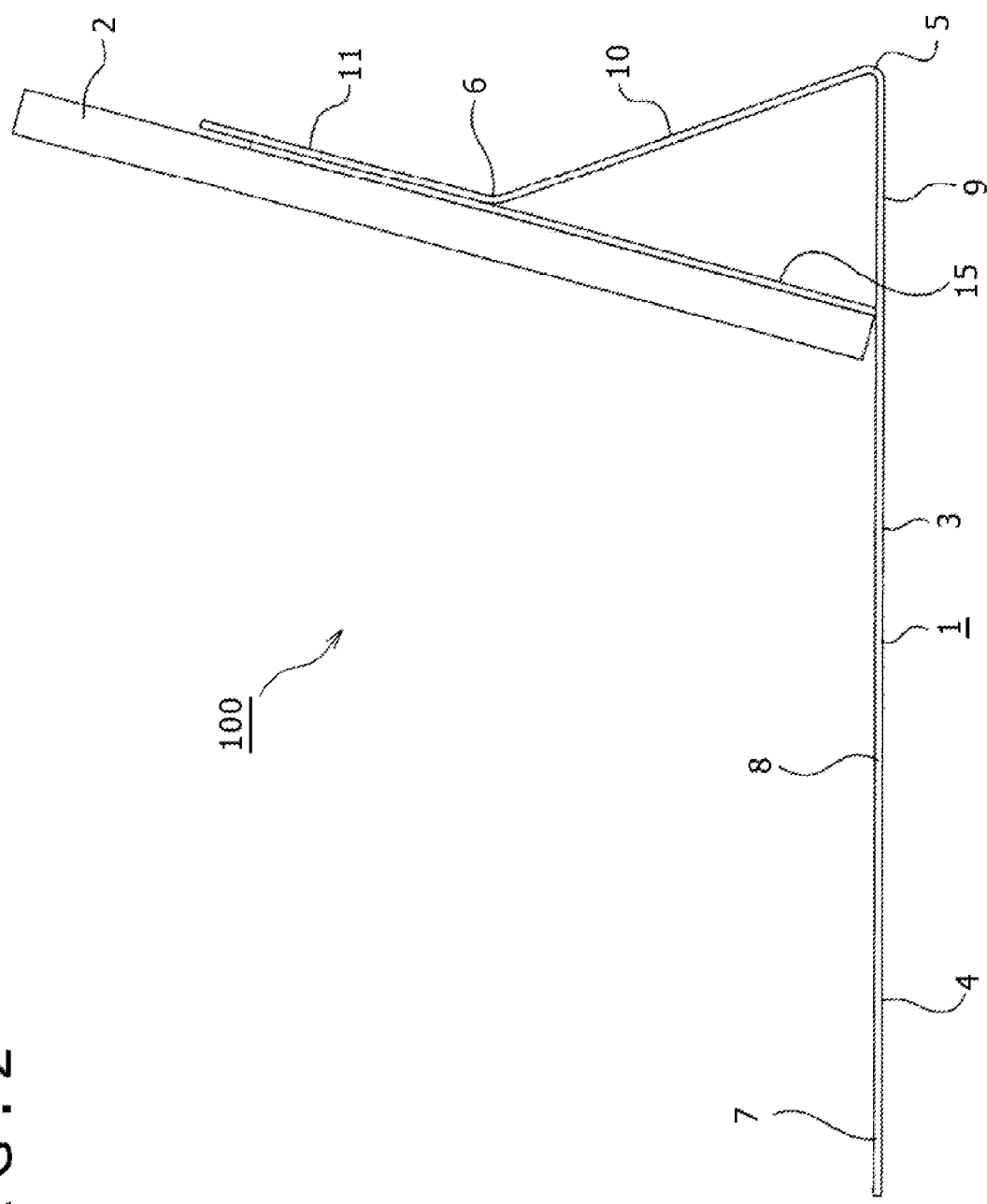
FIG. 2 is a side view of the information processor in the condition where the protective cover is set in the stand mode.

The stand mode is set by folding the link section 10 at the second folding section 5 in relation to the mount section 9 and folding the stand section 11 at the third folding section 6 in relation to the link section 10 (see FIGS. 1 and 2).

The link section 10 is folded at an angle of not less than 90°, for example, about 100 to 150°, relative to the mount section 9, in the direction for approaching the keyboard 13. The stand section 11 is folded at an angle of less than 90°, for example, about 10 to 60°, relative to the link section 10, in the direction for coming away from the keyboard 13.

In the stand mode wherein the sections are folded in this manner, the electronic apparatus 2 is set to stand against the stand section 11 of the protective cover 1 through the back plate 15. In the stand mode in which the electronic apparatus 2 stands against the stand section 11, the electronic apparatus 2 is borne by the back plate 15 in the state wherein the display surface 2a is inclined to be obliquely oriented to an upper front side; in this case, a lower end portion of the back plate 15 is mounted on the mount section 9 in the state of making contact with the mount surface 9a. The electronic apparatus 2 is in contact with or comes close to the mount surface 9a at the lower surface.

As above-mentioned, the cover unit 3 is formed from an elastomer, which is a material having a high coefficient of friction. Therefore, in the condition where the lower end portion of the back plate 15 is in contact with the mount surface 9a, the back plate 15 is not liable to slip off relative to the mount surface 9a. Accordingly, the electronic apparatus 2 can be held in a stable state, without providing any part exclusive use for restraining the position of the electronic apparatus 2.

In the stand mode, it is possible to perform various operations on the touch pad 12, the keyboard 13 and the electronic apparatus 2.

Figure 3:
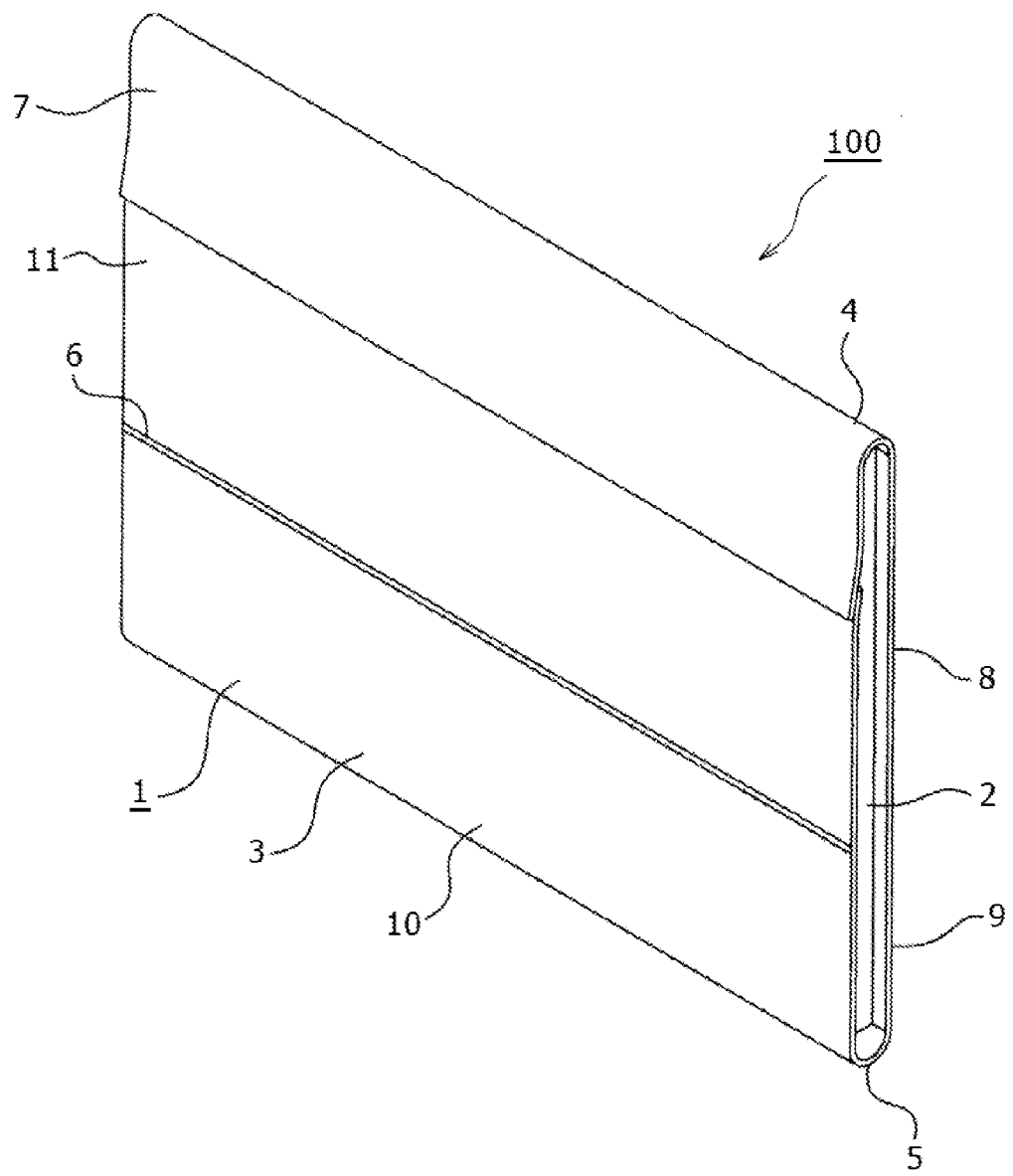
FIG. 3 is a perspective view of the information processor in a condition where the protective cover is set in a cover mode.
Figure 4:
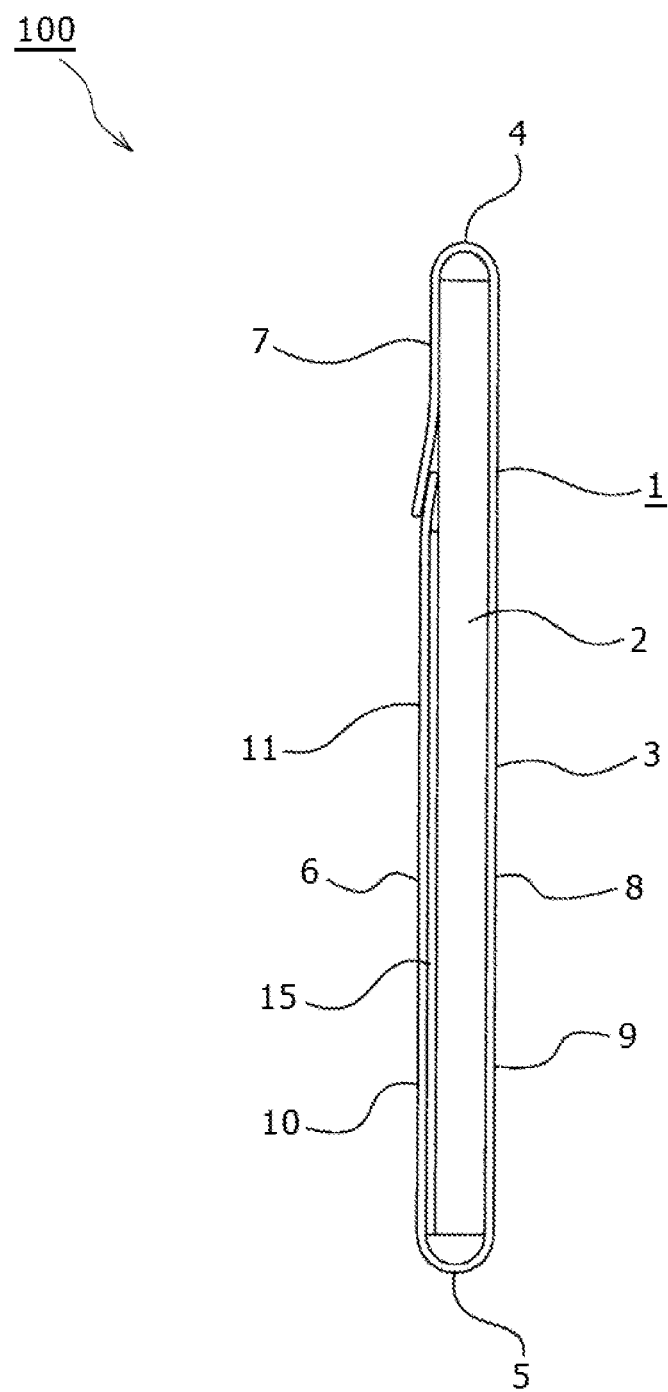
FIG. 4 is a side view of the information processor in the condition where the protective cover is set in the cover mode.

On the other hand, the cover mode is set by folding the first operating region section 7 at the first folding section 4 in relation to the second operating region section 8 and folding the link section 10 at the second folding section 5 in relation to the mount section 9, in the condition wherein the display surface 2a of the electronic apparatus 2 is mounted on the second operating region section 8 and the mount section 9 (see FIGS. 3 and 4).

The first operating region section 7 is folded at an angle of about 180° relative to the second operating region section 8 in the direction for approaching the keyboard 13, and the link section 10 is folded at an angle of about 180° relative to the mount section 9 in the direction for approaching the keyboard 13.

In the cover mode wherein the sections are folded in this manner, the binding part provided in the first operating region section 7 and a binding part provided in the stand section 11 are bound to each other, whereby the electronic apparatus 2 is housed inside the protective cover 1 in the state of being enveloped in the protective cover 1.

In the cover mode, the information processor 100 can be carried in the state wherein the electronic apparatus 2 is protected by the protective cover 1.

In the cover mode, the electronic apparatus 2 is enveloped in the protective cover 1 in the state wherein its display surface 2a is in contact with the second operating region section 8.

In this case, since the second operating region section 8 is formed with the operating recesses 8a, 8a . . . opening to the display surface 2a side, the area of contact between the second operating region section 8 and the display surface 2a is small and, therefore, deposition of fingerprints or dust on the display surface 2a can be restrained.

[Operation of Information Processor]

In the information processor 100 configured as above-described, when the touch pad 12 is operated by an operation from the upper side of the first operating region section 7, an information signal according to the operation is outputted to the electronic apparatus 2 through the wiring board 16. The information signal thus outputted is subjected to a predetermined processing under control by the control unit 17, whereby an operation such as displaying an image on the display surface 2a of the electronic apparatus 2 is carried out.

In addition, when some of the operating keys 13a, 13a . . . of the keyboard 13 are operated by operations from the upper side of the second operating region section 8, an information signal or signals according to the operations are outputted to the electronic apparatus 2 through the wiring board 16. The information signal or signals thus outputted are subjected to a predetermined processing under control by the control unit 17, whereby an operation such as displaying an image on the display surface 2a of the electronic apparatus 2 is carried out.

The above-mentioned operations are performed by supplying electric power from the battery provided in the electronic apparatus 2. Therefore, the operations such as outputting of information signals according to operations on the touch pad 12 and the keyboard 13 are carried out by supplying electric power from the battery to the touch pad 12 and the keyboard 13 through the wiring board 16.

As above-mentioned, in the information processor 100, the operations according to operations on the touch pad and the keyboard 13 are carried out not by wireless communication but by wired communication through the wiring board 16.

[Position Restraining Section]

Now, examples of a position restraining section provided in the mount section 9 of the protective cover 1 will be described below (see FIGS. 10 to 17).

By a position restraining section provided in the mount section 9, the electronic apparatus 2 is prevented from slipping out of position relative to the mount section 9, and the electronic apparatus 2 is held standing against the stand section 11 in a stable state, whereby good use conditions of the information processor 100 can be secured.

First Example

Figure 10:
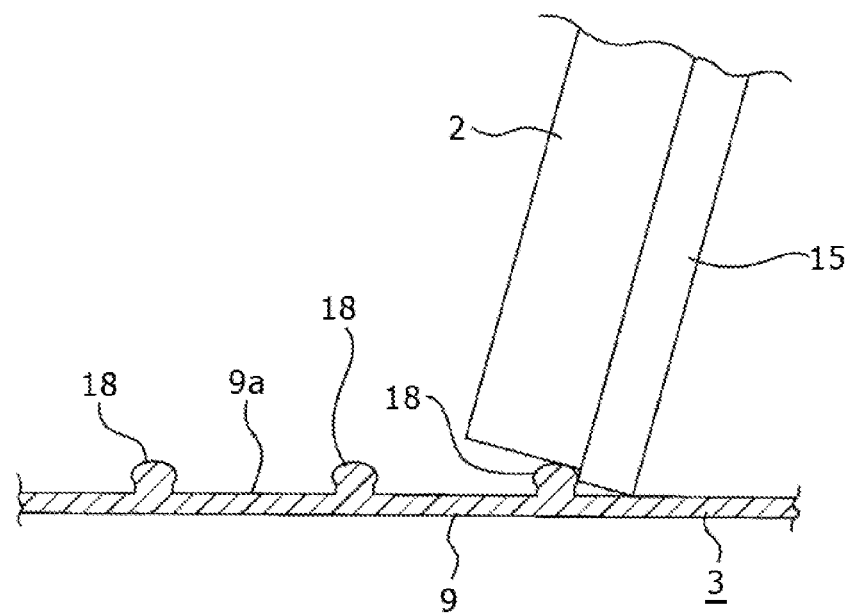
FIG. 10 shows, together with FIGS. 11 to 17, examples of a position restraining section, and is an enlarged sectional view showing a first example.

As a first example of the position restraining section, position restraining projections 18, 18, . . . projecting upward from the mount surface 9a and extending in the left-right direction are provided, at intervals along the front-rear direction (see FIG. 10). A lower end portion of the back plate 15 or a lower end portion of the electronic apparatus 2 is engaged with the position restraining projection 18, from the rear side, whereby the electronic apparatus 2 is held in a predetermined inclined state.

With the lower end portion of the back plate 15 or the lower end portion of the electronic apparatus 2 put into engagement with a desired one 18 of the position restraining projections 18, 18, . . . , the electronic apparatus 2 can be held in a desirably changed inclined state, which promises enhanced convenience in use.

Where the position restraining projections 18, 18 . . . projecting upward from the mount surface 9a are thus provided as position restraining sections, the electronic apparatus 2 can be held in a stable state with a simple configuration.

Second Example

Figure 11:
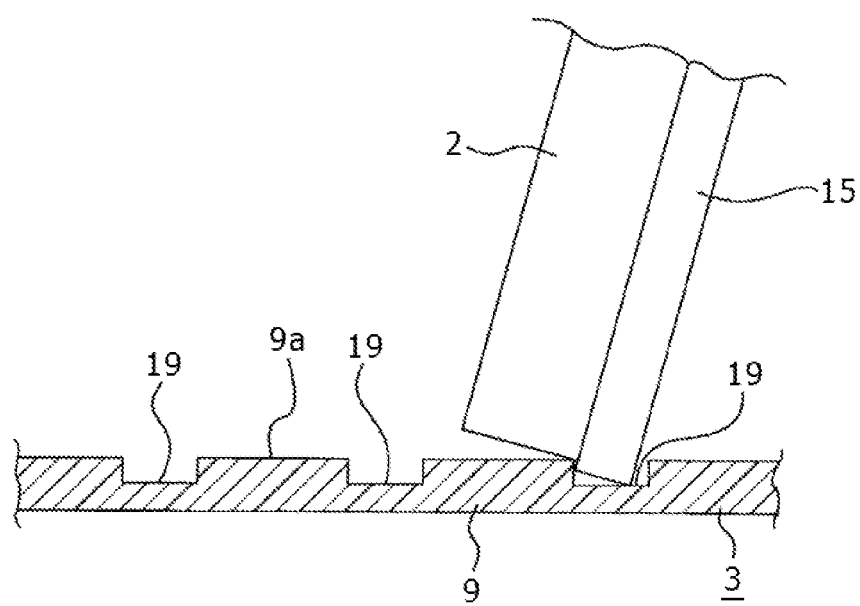
FIG. 11 is an enlarged sectional view showing a second example.
Figure 12:
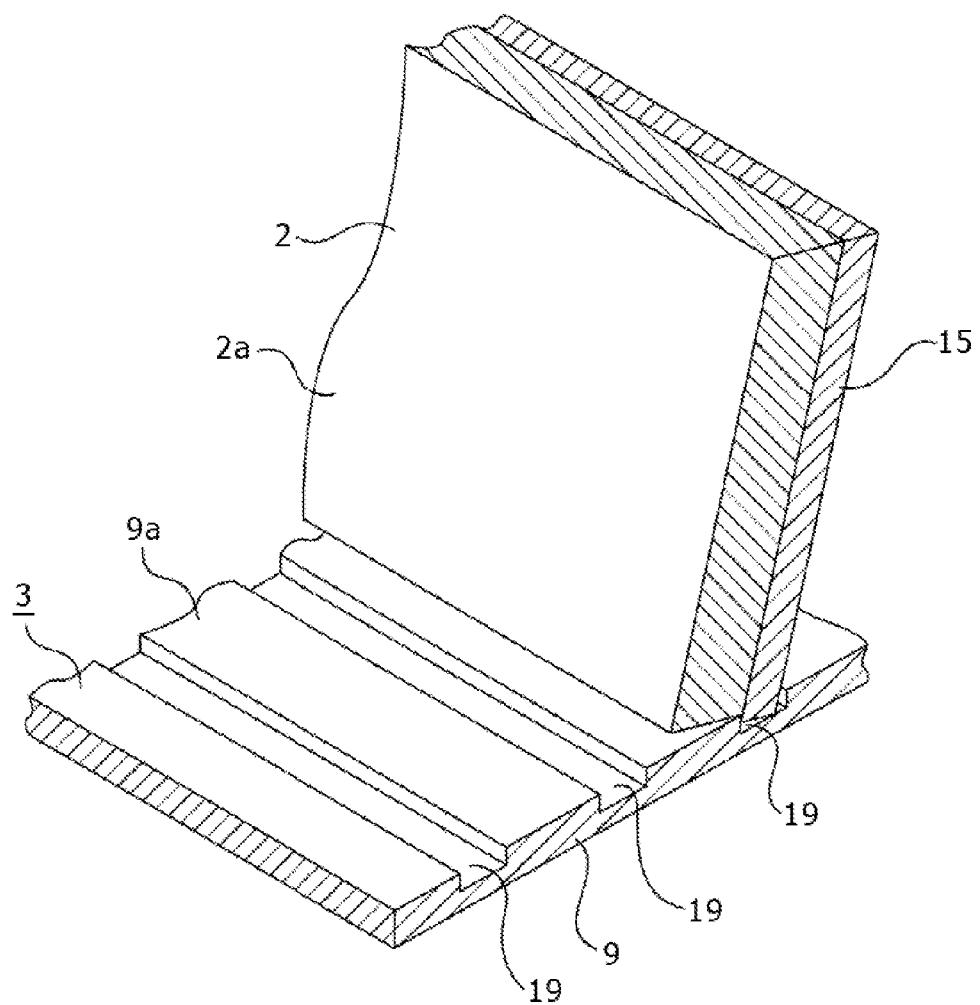
FIG. 12 is an enlarged perspective view showing the second example.

As a second example of the position restraining section, position restraining recesses 19, 19, . . . opening to the upper side and extending in the left-right direction are formed in the mount surface 9a, at intervals along the front-rear direction (see FIGS. 11 and 12). A lower end portion of the back plate 15 or a lower end portion of the electronic apparatus 2 is inserted into the position restraining recess 19, whereby the electronic apparatus 2 is held in a predetermined inclined state.

With the lower end portion of the back plate 15 or the lower end portion of the electronic apparatus 2 put into engagement with a desired one 19 of the position restraining recesses 19, 19, . . . , the electronic apparatus 2 can be held in a changed inclined state, which ensures enhanced convenience in use.

Where the position restraining recesses 19, 19, . . . opening in the mount surface 9a are thus formed as position restraining sections, the electronic apparatus 2 can be held in a stable state with a simple configuration.

Figure 13:
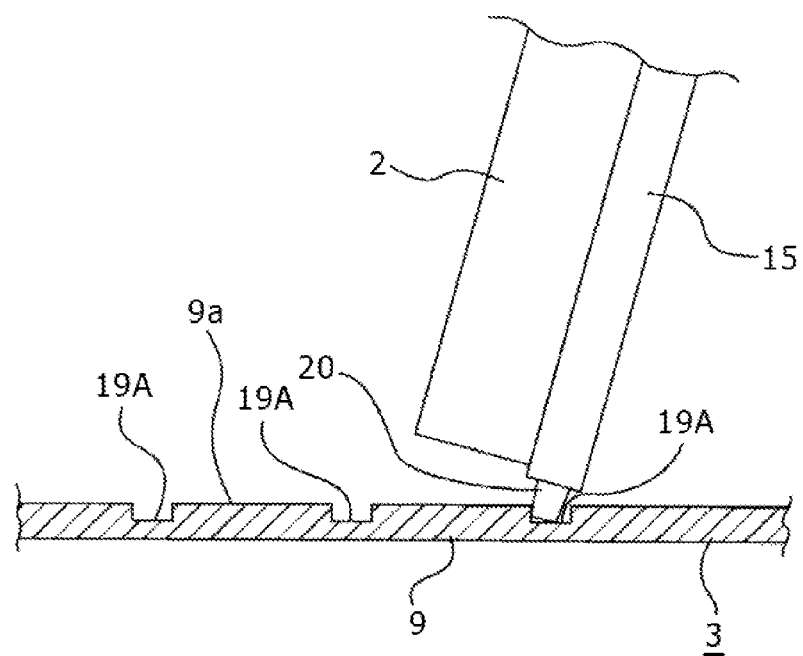
FIG. 13 is an enlarged sectional view showing a further example of the second example.
Figure 14:
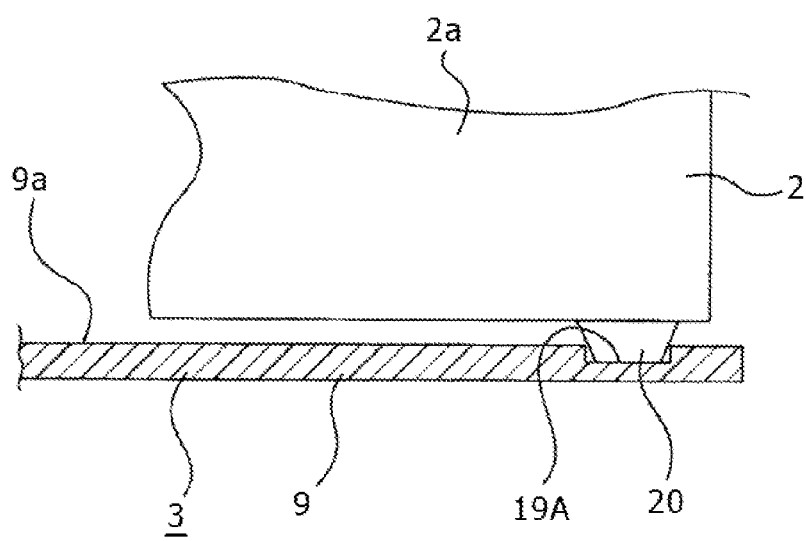
FIG. 14 is an enlarged sectional vies showing the further example of the second example, as viewed from the front side.

Incidentally, as the position restraining sections, position restraining recesses 19A, 19A, . . . opening to the upper side and spaced apart in the left-right direction may be formed in the mount surface 9a, at intervals along the front-rear direction (see FIGS. 13 and 14). The position restraining recesses 19A, 19A, . . . may be formed, for example, in left-right pairs each of which composed of two recesses spaced apart in the left-right directions and which are located at intervals along the front-rear direction.

In this case, a lower end portion of the back plate 15 or a lower end portion of the electronic apparatus 2 is provided with two insertion projections 20, 20 spaced apart in the left-right direction (FIGS. 13 and 14 show an example wherein the back plate is provided with the insertion projections). The insertion projections 20, 20 of the back plate 15 or the electronic apparatus 2 are inserted respectively into the position restraining recesses 19A, 19A, whereby the electronic apparatus 2 is held in a predetermined inclined state.

With the insertion projections 20, 20 of the back plate 15 or the electronic apparatus 2 inserted into desired ones 19A, 19A of the position restraining recesses 19A, 19A, . . . , the electronic apparatus 2 can be held in a desirably changed inclined state, which promises enhanced convenience in use.

Where the position restraining recesses 19A, 19A, . . . opening in the mount surface 9a are thus formed as position restraining recesses, electronic apparatus 2 can be held in a stable state with a simple configuration.

In addition, where the position restraining sections are formed in the mount section 9 at positions spaced apart in the left-right direction, like the position restraining recesses 19A, 19A, . . . , the position restraining sections can be formed at parts of the mount section 9 other than the part where the wiring board 16 is disposed. Accordingly, the position restraining sections can be formed without obstructing in any way the arrangement of the wiring board 16 relative to the mount section 9.

Third Example

Figure 15:
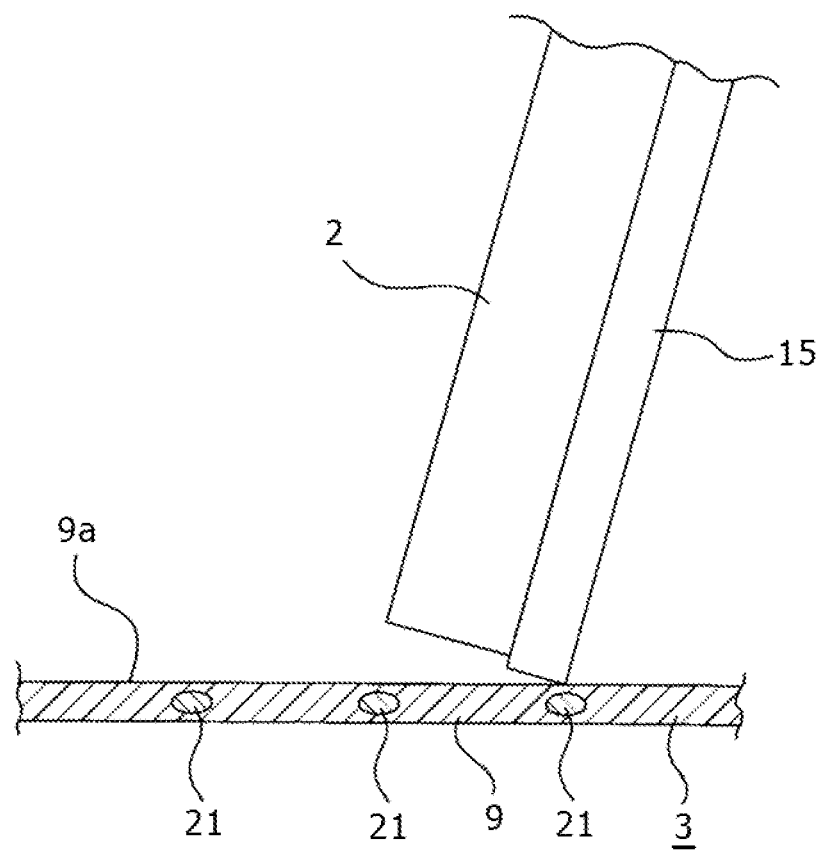
FIG. 15 is an enlarged sectional view showing a third example.

As a third example of the position restraining section, position restraining magnets 21, 21, . . . arranged in the mount section 9 are provided, at intervals along the front-rear direction (see FIG. 15). A lower end portion of the back plate 15 or a lower end portion of the electronic apparatus 2 is formed of a magnetic material. This ensures that the lower end portion of the back plate 15 or the lower end portion of the electronic apparatus 2 is attracted by the position restraining magnet 21, whereby the electronic apparatus 2 is held in a predetermined inclined state.

With the lower end portion of the back plate 15 or the lower end portion of the electronic apparatus 2 attracted by a desired one 21 of the position restraining magnets 21, 21, . . . , the electronic apparatus 2 can be held in a desirably changed inclined state, which ensures enhanced convenience in use.

Where the position restraining magnets 21, 21, . . . are thus arranged in the mount section 9 as position restraining sections, the electronic apparatus 2 can be held in a stable state, without processing a surface of the cover unit 3.

Incidentally, in the case where the lower end portion of the back plate 15 or the lower end portion of the electronic material 2 is not formed of a magnetic material, a magnetic material or magnet to be attracted by the position restraining magnet 21 may be provided at the lower end portion of the back plate 15 or the lower end portion of the electronic apparatus 2.

Fourth Example

Figure 16:
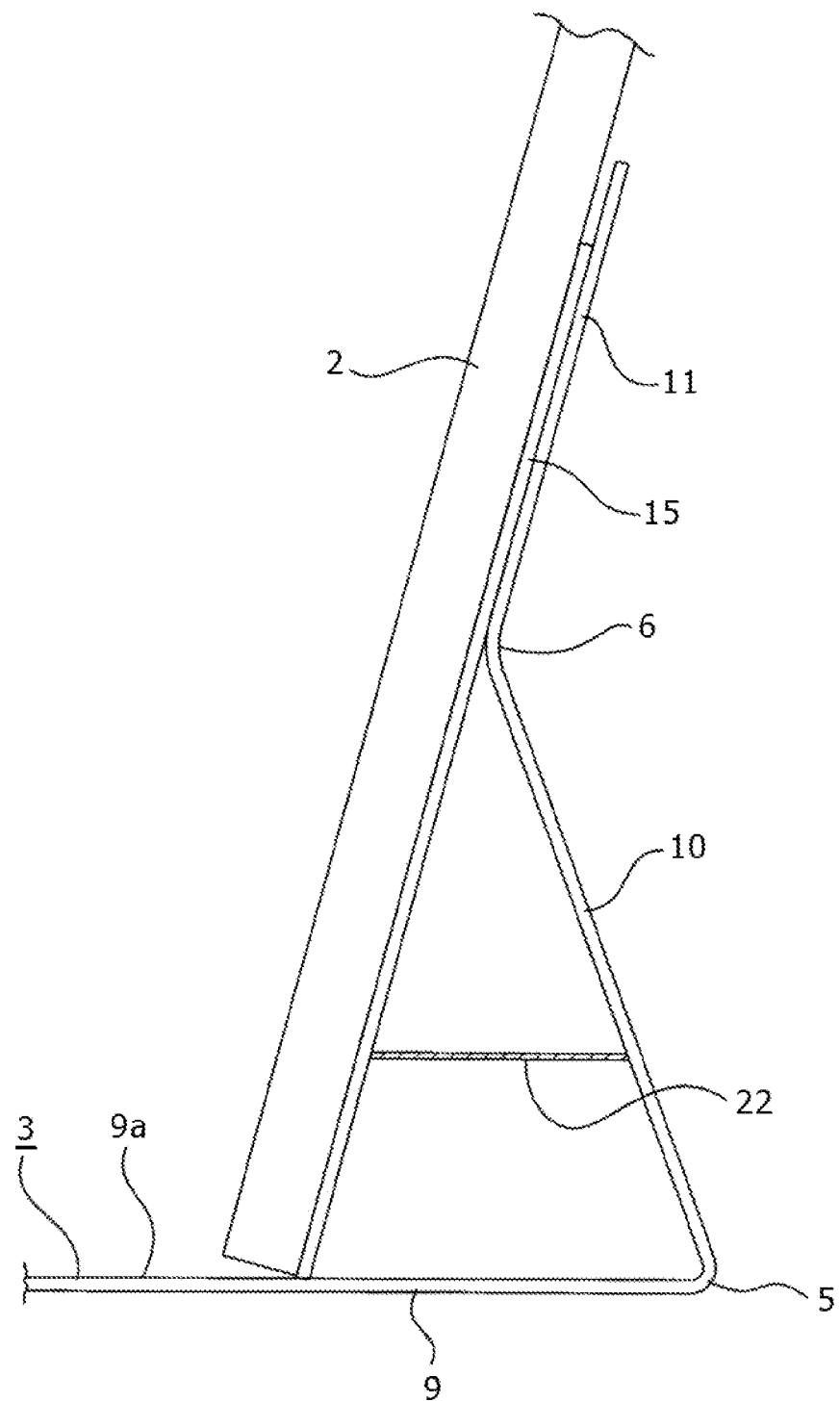
FIG. 16 is a side view showing a fourth example.

As a fourth example of the position restraining section, a string member 22 for tying the link section 10 and the back plate 15 to each other is provided (see FIG. 16). With the string member 22 set into a stretched state, the electronic apparatus 2 is held in a predetermined inclined state.

Figure 17:
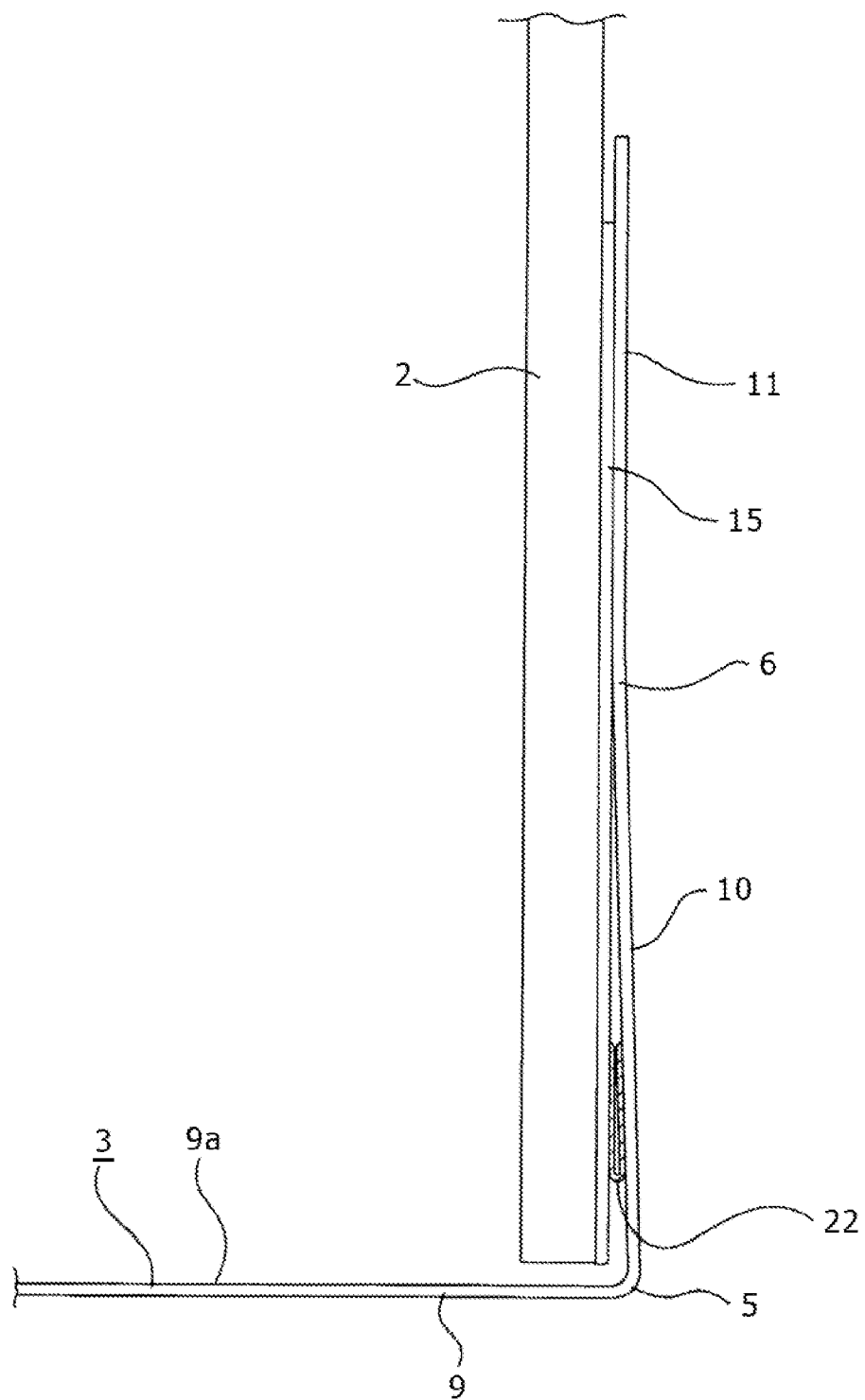
FIG. 17 is a side view showing the fourth example in a state wherein a string member is folded.

When the protective cover 1 is set into the cover mode, the string member 22 is folded between the cover unit 3 and the back plate 15 (see FIG. 17).

Where the string member 22 for tying the link section 10 and the back plate 15 together is thus provided as the position restraining section, the electronic apparatus 2 can be held in a stable state with a simple configuration, without processing a surface of the cover unit 3.

In addition, since the string member 22 is folded when the protective cover 1 is set into the cover mode, the presence of the string member 22 would not hamper in any way the setting of the protective cover 1 into the cover mode.

[Binding Parts]

Now, examples of binding parts provided respectively in the first operating region section 7 and in the stand section 11 or the like, of the protective cover 1, will be described below (see FIGS. 18 to 32).

In the condition wherein the protective cover 1 is set in the cover mode, binding parts provided respectively in the first operating region section 7 and in the stand section are bound to each other, whereby portability of the information processor 100 can be enhanced and the electronic apparatus 2 can be prevented from slipping out of the protective cover 1.

First Example

Figure 18:
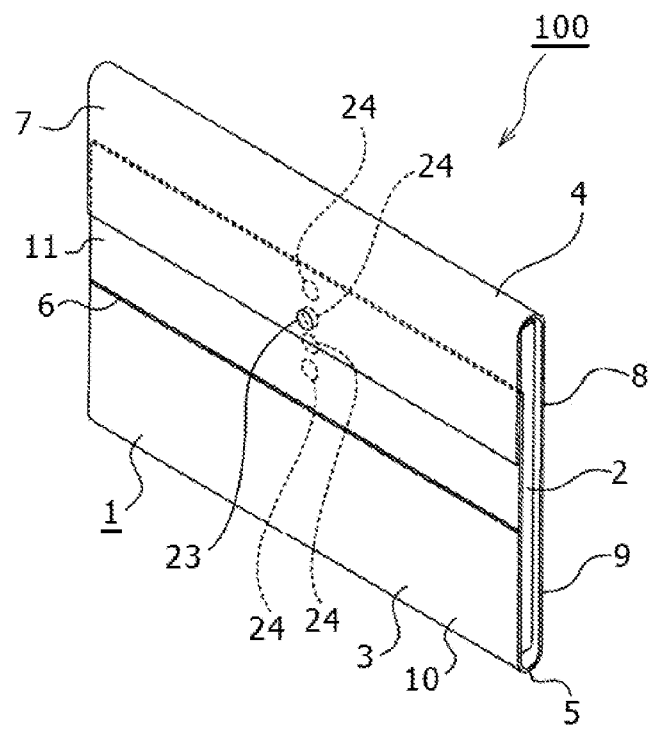
FIG. 18 shows, together with FIGS. 19 to 32, examples of a binding part, and is a perspective view showing a first example.

As a first example of binding parts, the first operating region section 7 is provided with a magnet 23 whereas the stand section 11 is provided with magnetic members 24, 24 . . . at intervals along the front-rear direction (see FIG. 18). With the magnetic member 24 attracted by the magnet 23, the magnet 23 and the magnetic member 24 are bound to each other.

Figure 19:
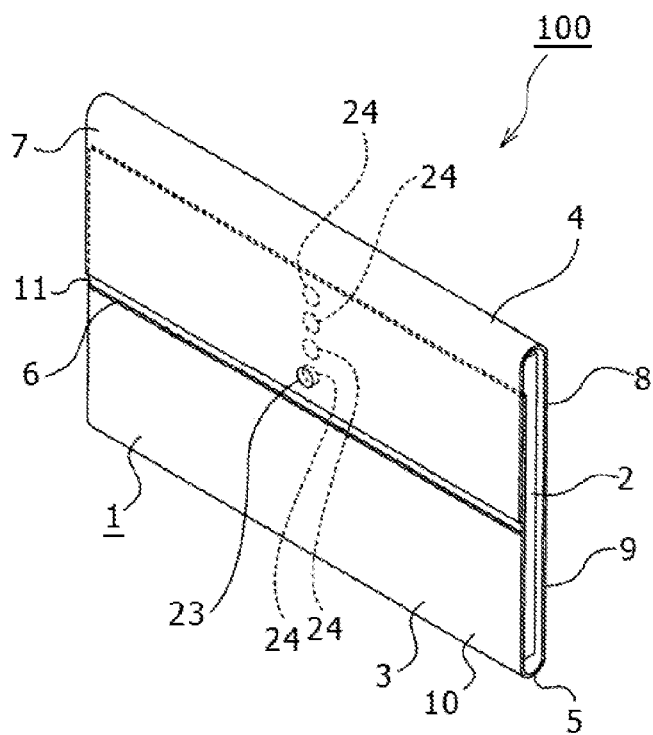
FIG. 19 is a perspective view showing an example wherein a binding position is changed from that in FIG. 18, in the first example.
Figure 20:
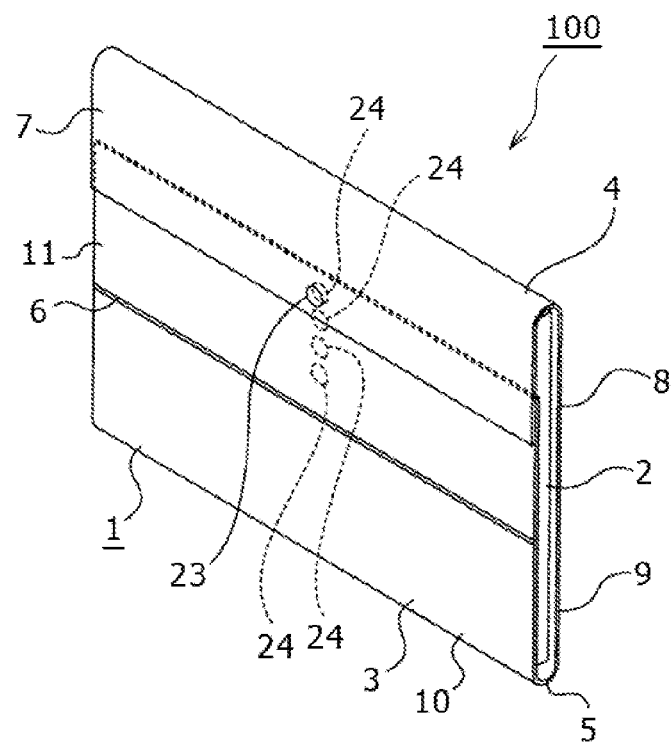
FIG. 20 is a perspective view showing an example wherein the binding position is changed from those in FIGS. 18 and 19, in the first example.

With a desired one 24 of the magnetic members 24, . . . attracted onto the magnet 23, the size of the protective cover 1 in the cover mode can be changed according to the size of the electronic apparatus 2 (see FIGS. 19 and 20). In this case, in order to ensure that the protective cover 1 can be folded at different parts according as its size in the cover mode is changed, the cover unit 3 is provided at its predetermined parts with folding parts which can be folded according to the change in the size of the protective cover 1 in the cover mode.

Incidentally, while an example wherein the first operating region section 7 is provided with the magnet 23 and the stand section 11 is provided with the magnetic members 24 has been described above, this is not restrictive. For example, on the contrary to the above, the first operating region section 7 may be provided with magnetic members whereas the stand section 11 may be provided with a magnet. Furthermore, both the first operating region section 7 and the stand section 11 may be provided with magnets.

Second Example

Figure 21:
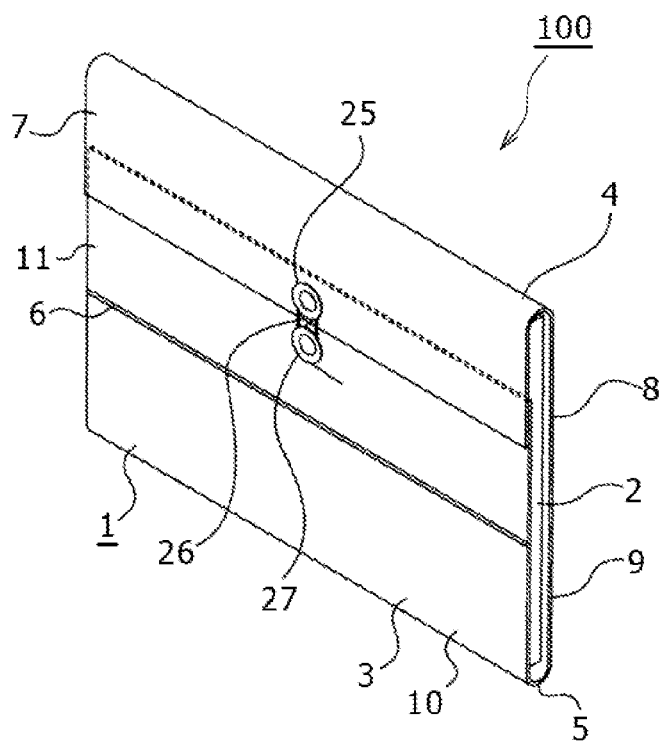
FIG. 21 is a perspective view showing a second example.

As a second example of binding parts, one of the first operating region section 7 and the stand section 11 is provided with a clamp 25 whereas the other is provided with a clamp 27 having a string 26 connected thereto (see FIG. 21). With the string 26 wound around the clamp 25, the clamp 25 and the clamp 27 are bound together.

By changing the winding position of the string 26 around the clamp 27, the size of the protective cover 1 in the cover mode can be modified.

Third Example

Figure 22:
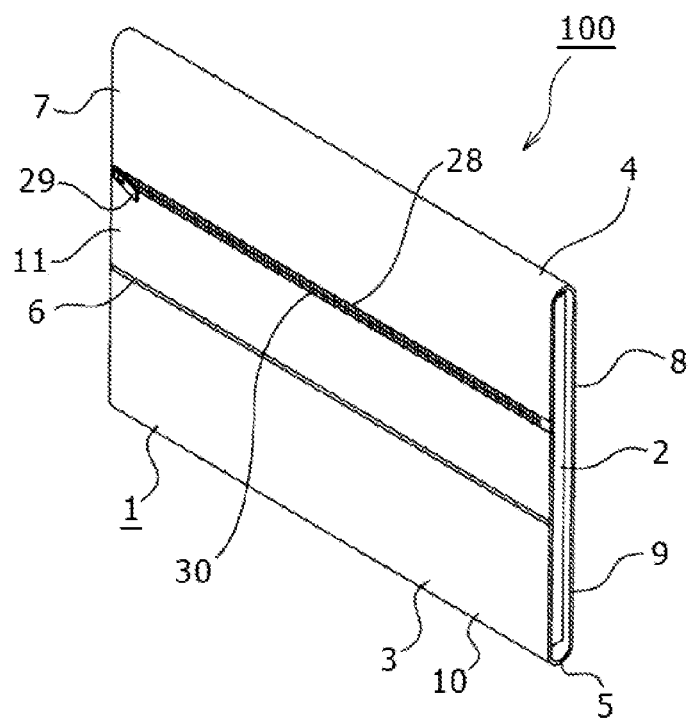
FIG. 22 is a perspective view showing a third example.

As a third example of binding parts, one of the first operating region section 7 and the stand section 11 is provided with an element 28 whereas the other is provided with an element 30 having a slider 29 supported thereon, whereby a slide fastener is configured (see FIG. 22). With the slider slid, the element 28 and the element 30 are interlocked together.

Incidentally, in the third example of the binding parts, a hook-and-loop fastener (Velcro fastener) may be used in place of the slide fastener.

Fourth Example

Figure 23:
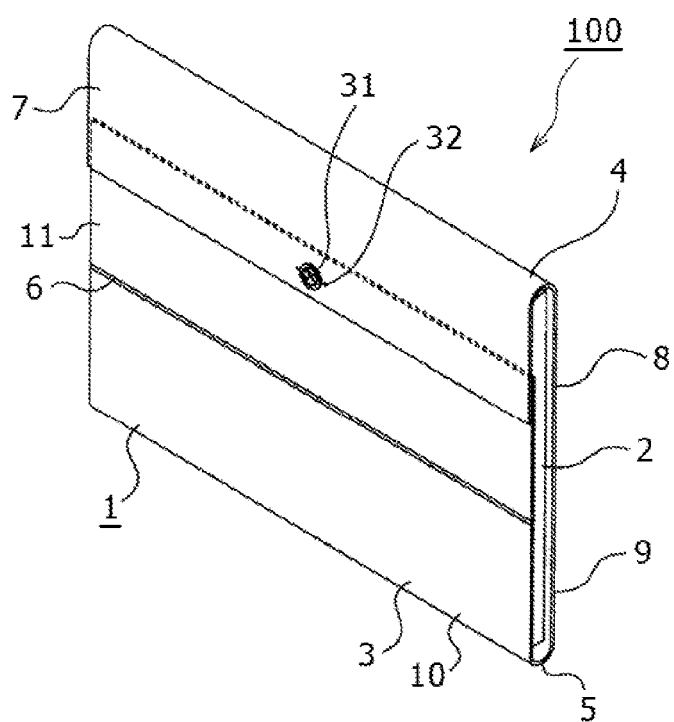
FIG. 23 is a perspective view showing a fourth example.

As a fourth example of binding parts, one of the first operating region section 7 and the stand section 11 is provided with a button 31 whereas the other is formed with a slit 32 (see FIG. 23). The button 31 is inserted into the slit 32, and the button 31 and part surrounding the slit 32 are engaged with each other and bound together.

Fifth Example

Figure 24:
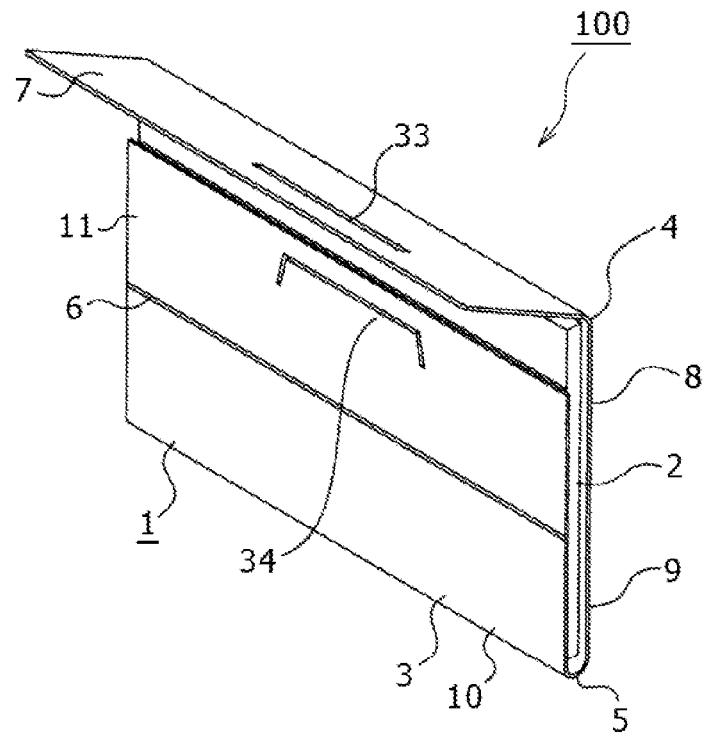
FIG. 24 is a perspective view showing a fifth example in a state before binding parts are bound to each other.
Figure 25:
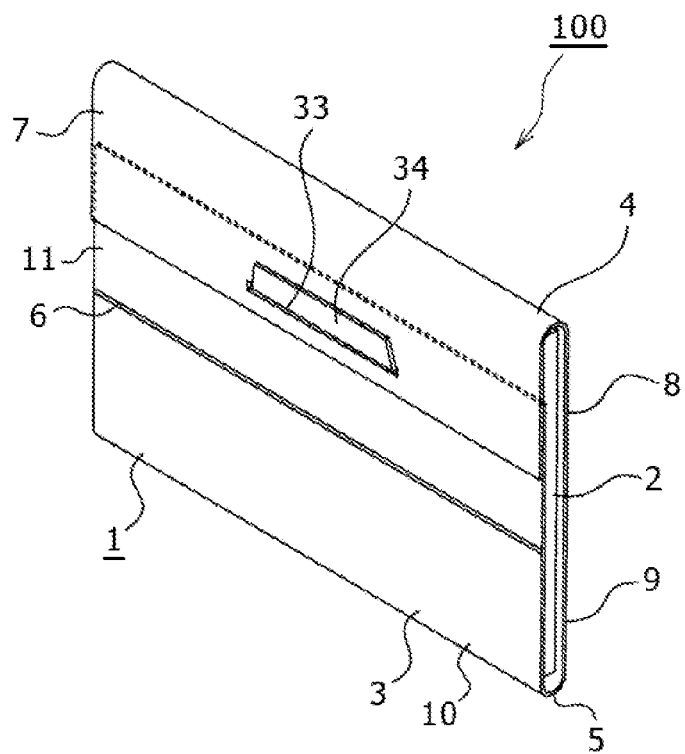
FIG. 25 is a perspective view showing the fifth example in a state where the binding parts are bound to each other.

As a fifth example of binding parts, the first operating region section 7 is formed with a slit 33 whereas the stand section 11 is provided with a tongue-like engagement piece 34 formed by forming a roughly U-shaped cut in the stand section 11 (see FIG. 24). The engagement piece 34 is inserted into the slit 33, and the engagement piece 34 and that part of the first operating region section 7 surrounding the slit 33 are engaged with each other and bound together (see FIG. 25).

Sixth Example

Figure 26:
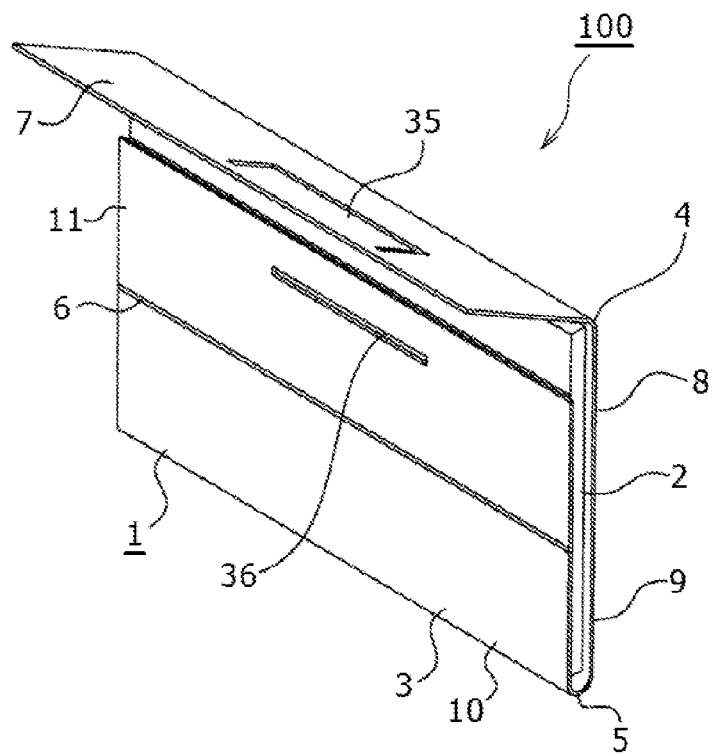
FIG. 26 is a perspective view showing a sixth example in a state before binding parts are bound to each other.
Figure 27:
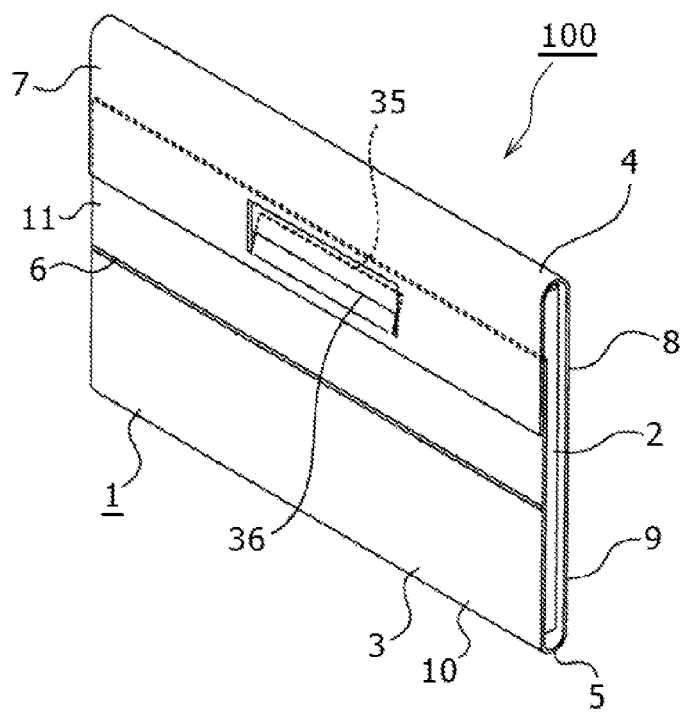
FIG. 27 is a perspective view showing the sixth example in a state where the binding parts are bound to each other.

As a sixth example of binding parts, the first operating region section 7 is provided with a tongue-like engagement piece 35 by forming a roughly U-shaped cut in the first operating region section 7 whereas the stand section 11 is formed with a slit 36 (see FIG. 26). The engagement piece 35 is inserted into the slit 36, and the engagement piece 35 and that part of the stand section 11 surrounding the slit 36 are engaged with each other and bound together (see FIG. 27).

Seventh Example

Figure 28:
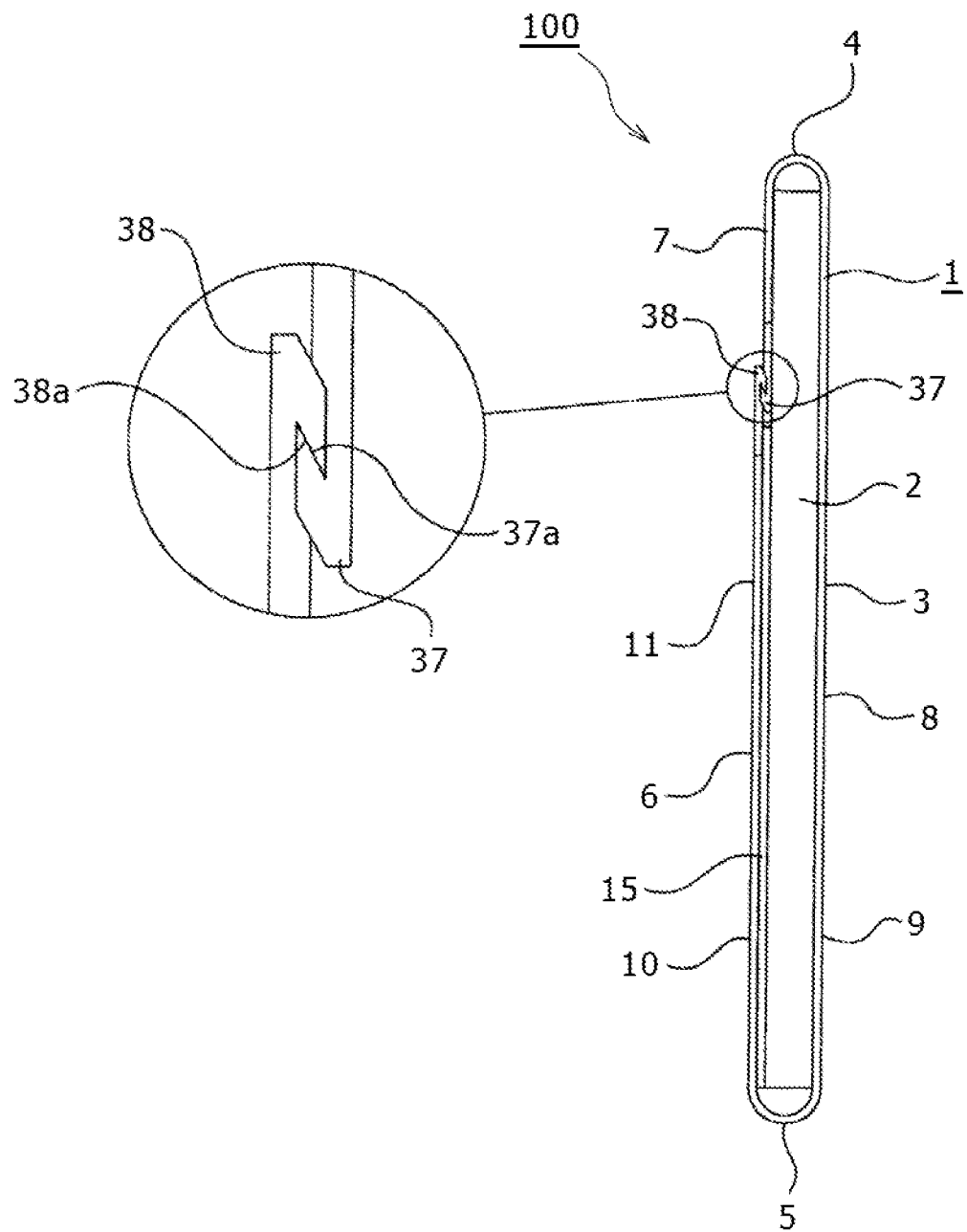
FIG. 28 is a side view showing a seventh example.

As a seventh example of binding parts, the first operating region section 7 and the stand section 11 are provided respectively with engaging projections 37 and 38 formed to project in such a manner as to be turned back from a tip edge (see FIG. 28). With the engaging projections 37 and 38 thus provided, the first operating region section 7 and the stand section 11 are formed with engaging recesses 37a and 38a, respectively.

In this case, a tip portion of the first operating region section 7, a tip portion of the stand section 11 and the engaging projections 37 and 38 are desirably formed of a high-hardness material. In addition, that portion of the first operating region section 7 other than the tip portion and that portion of the stand section 11 other than the tip portion are desirably formed of a stretchable material.

When the engaging projection 37 is inserted into the engaging recess 38a and the engaging projection 38 is inserted into the engaging recess 37a in the condition where the engaging recesses 37a and 38a are opened in opposite directions, the engaging projections 37 and 38 are engaged with each other and bound together.

Eighth Example

Figure 29:
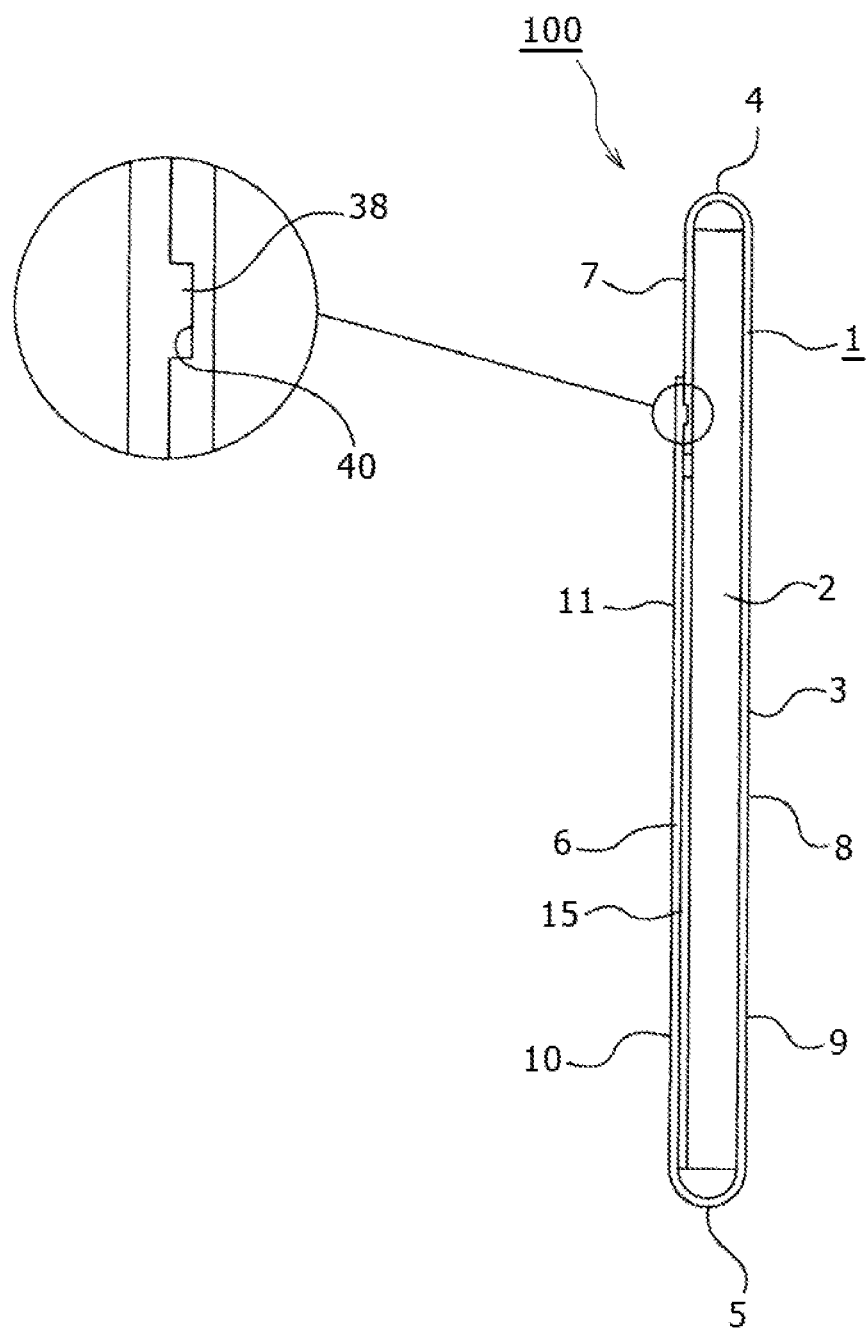
FIG. 29 is a side view showing an eighth example.

As an eighth example of binding parts, one of the first operating region section 7 and the stand section 11 is provided with a projection 39 whereas the other is formed with a recess 40 (see FIG. 29). With the projection 39 fitted into the recess 40, the projection 39 and the recess 40 are bound together.

Ninth Example

Figure 30:
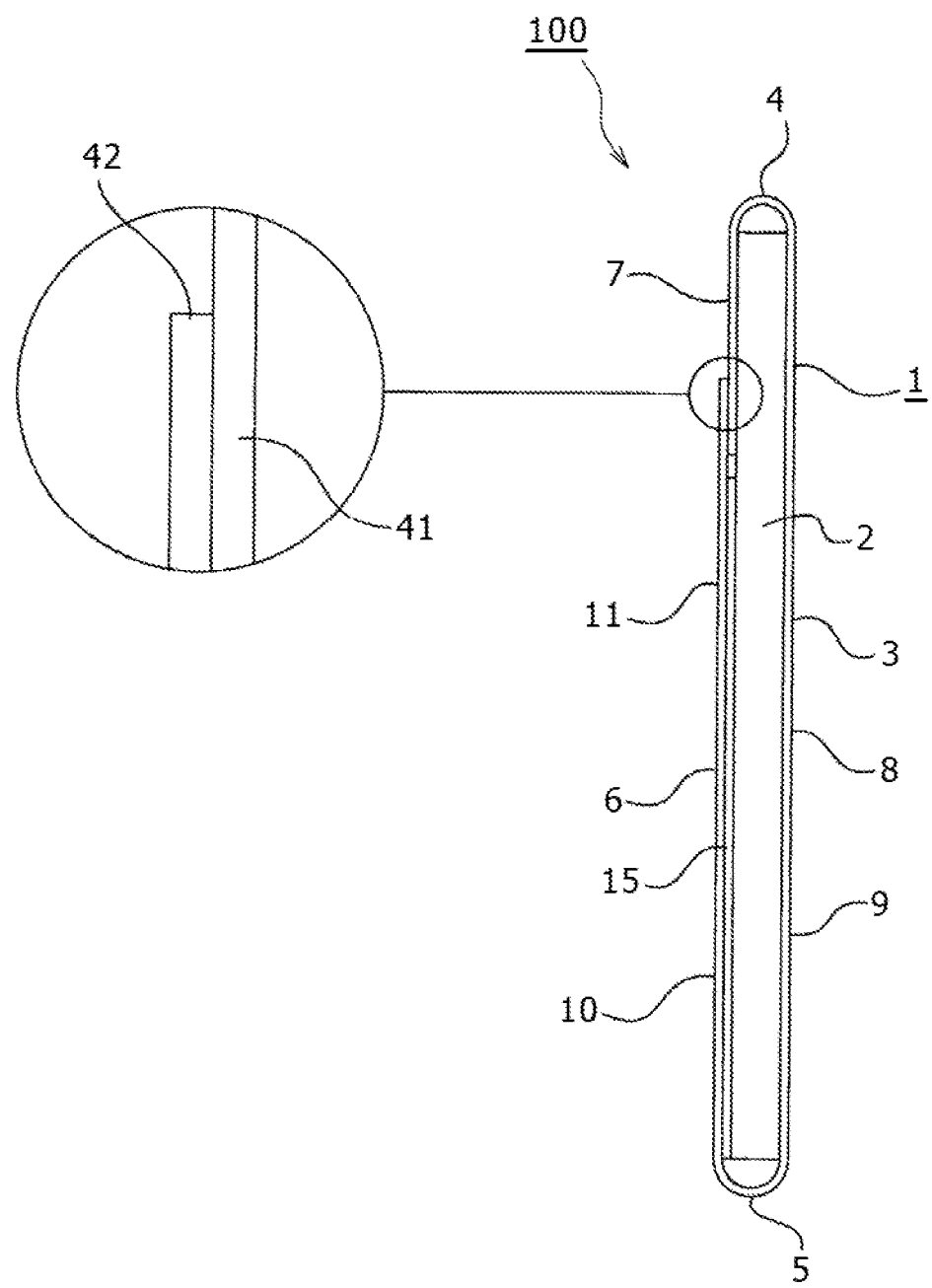
FIG. 30 is a perspective view showing a ninth example in a state before binding parts are bound to each other.
Figure 31:
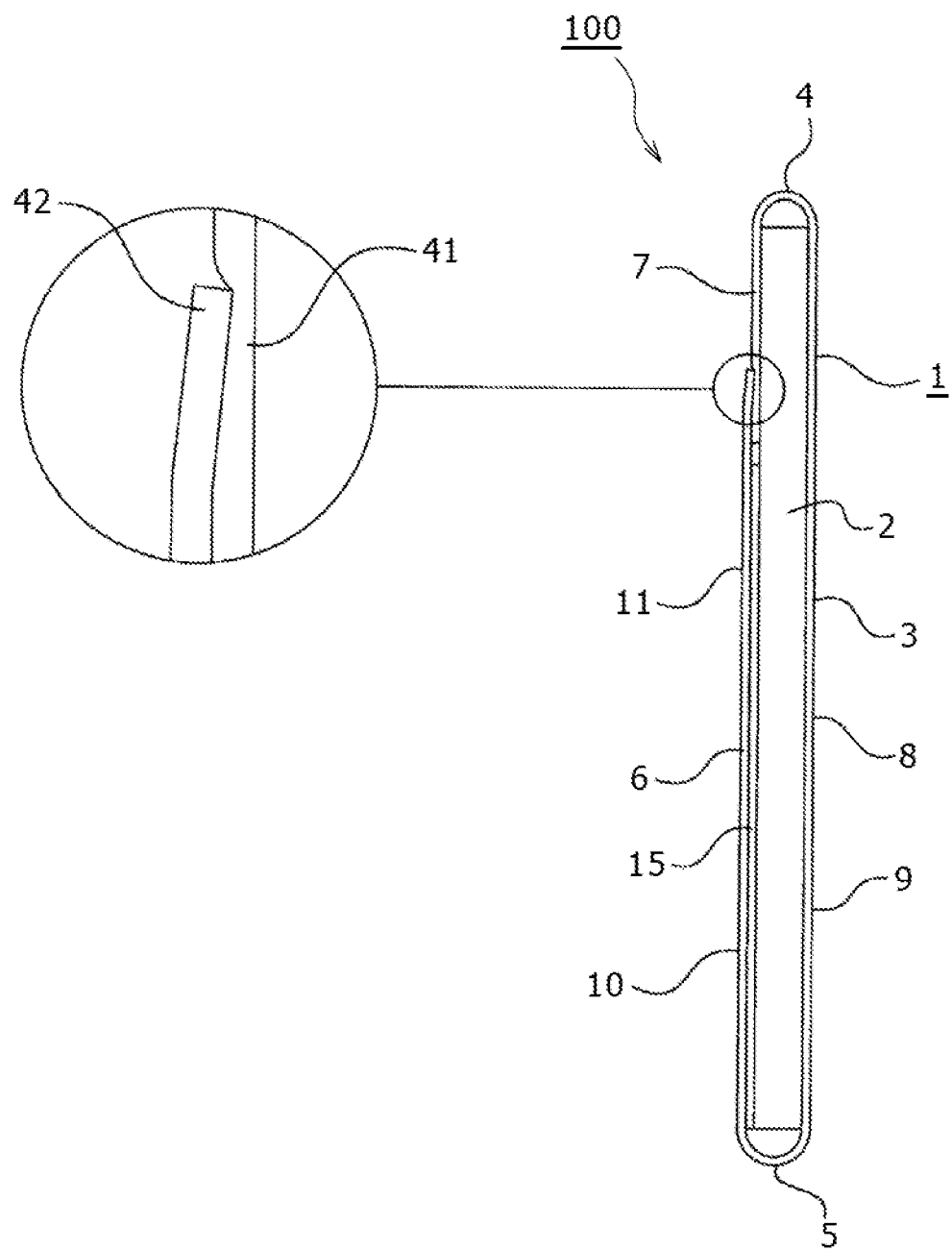
FIG. 31 is a perspective view showing the ninth example in a state where the binding parts are bound to each other.
Figure 32:
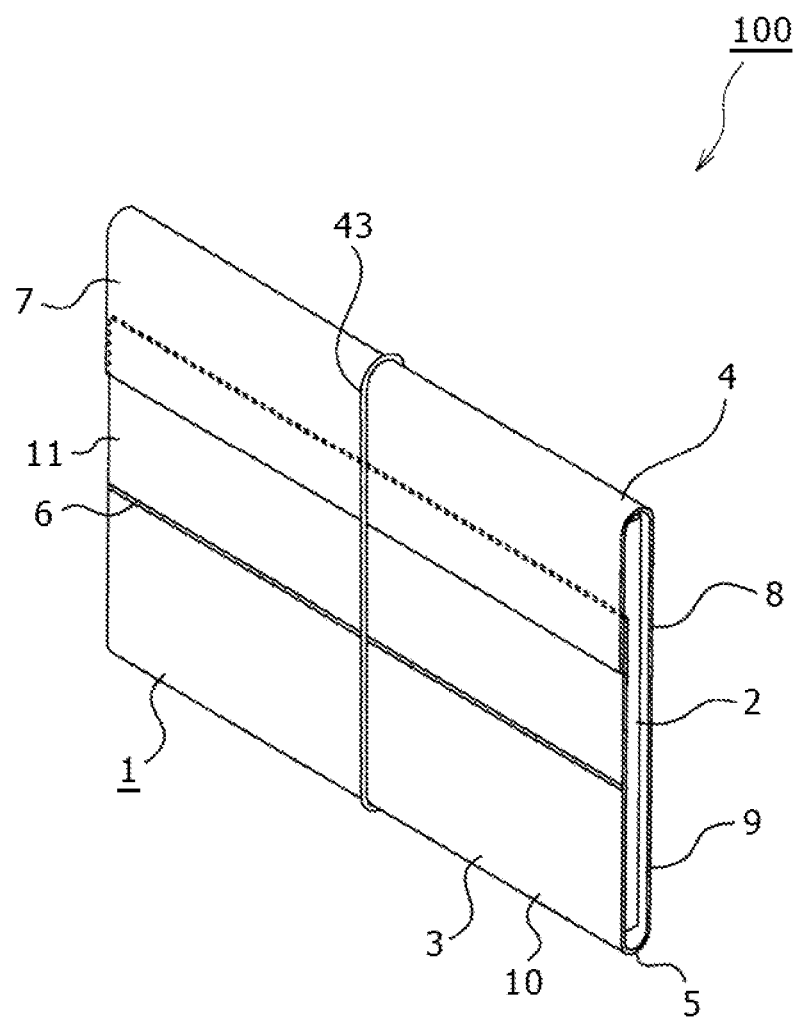
FIG. 32 is a perspective view showing other example.

As a ninth example of binding parts, a tip portion of the first operating region section 7 is provided as a flexible part 41 having a low hardness whereas a tip portion of the stand section 11 is provided as a spring part 42 capable of elastic deformation (see FIG. 30). With the spring part 42 elastically deformed and pressed against the flexible part 41, the flexible part 41 and the spring part 42 are bound together (see FIG. 31).

By changing the pressing position of the spring part 42 against the flexible part 41, the size of the protective cover 1 in the cover mode can be modified.

Incidentally, while an example wherein the first operating region section 7 is provided with the flexible part 41 whereas the stand section 11 is provided with the spring part 42 has been described above, this is not restrictive. On the contrary, the first spring region section 7 may be provided with a spring part whereas the stand section 11 may be provided with a flexible part.

Other Example

While examples of binding parts provided in the first operating region section 7 and the stand section 11 of the protective cover 1 have been described above, these examples are not restrictive. The first operating region section 7 and the stand section 11 may not be provided with binding parts; instead, for example, the protective cover 1 set in the cover mode may be held with a rubber band 43, so as to enhance portability of the information processor 100 and to prevent the electronic apparatus 2 from slipping out of the protective cover 1 (see FIG. 32).

[Modification of Protective Cover]

Now, a modification of the protective cover 1 will be described below (see FIGS. 33 to 35).

Figure 33:
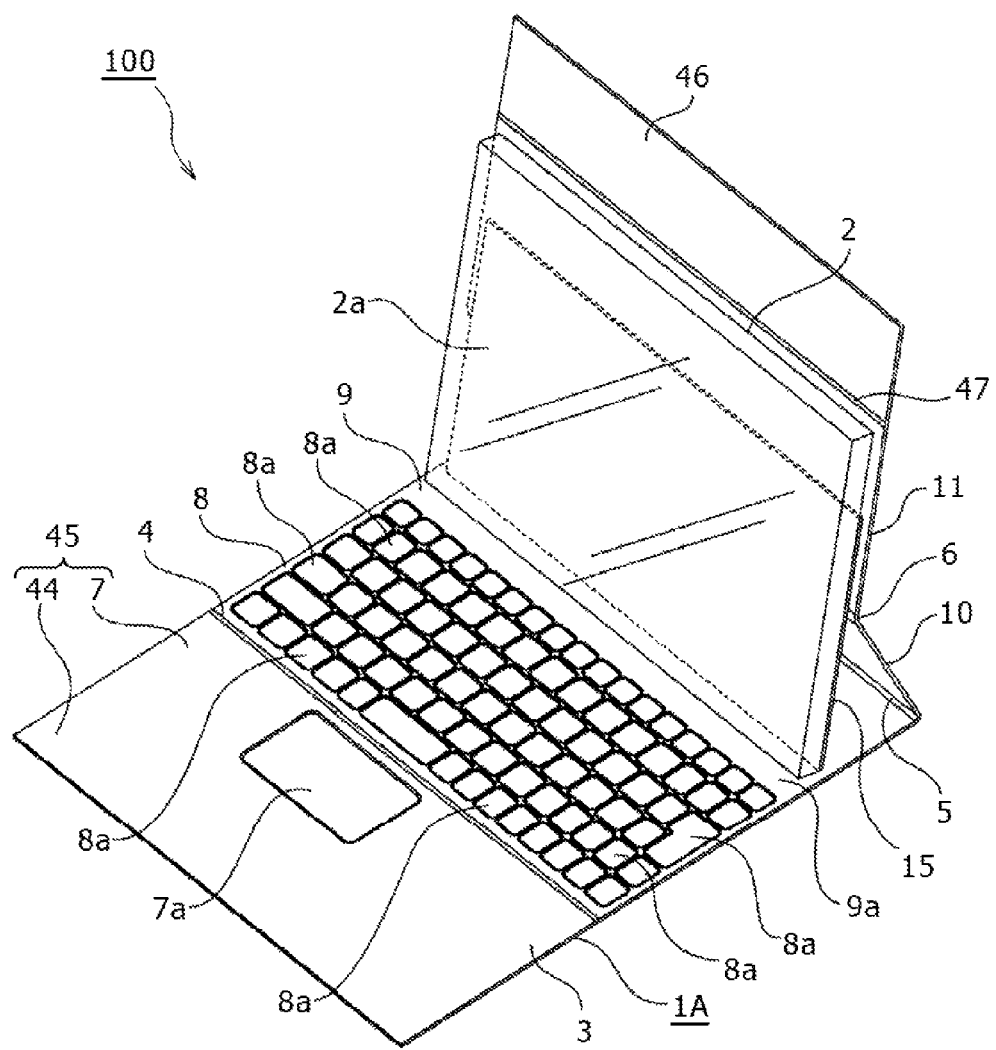
FIG. 33 shows, together with FIGS. 34 and 35, a modification of the protective cover, and is a perspective view showing a condition where the protective cover is set in a stand mode.

In a protective cover 1A according to the modification, in addition to the configuration of the protective cover 1 described above, an extension section 44 continuous with the first operating region section 7 is provided on the front side of the first operating region section 7, and the first operating region section 7 and the extension section 44 constitute a contact-preventing section (see FIG. 33). The length of the contact-preventing section 45 in the front-rear direction is set approximately equal to the length of the second operating region section 8 in the front-rear direction. Incidentally, the contact-preventing section 45 is desirably formed of a low-hardness material.

The protective cover 1A is provided, on the rear side (upper side) of the stand section 11, with a turn-back section 46 continuous with the stand section 11, and the part between the stand section 11 and the turn-back section 46 is provided as a fourth folding section 47.

In the protective cover 1A, the first operating region section 7 and the stand section 11 are not provided with binding parts; instead, binding parts are provided respectively at an end portion, on the first operating region section 7 side, of the lower surface of the second operating region section 8 and at the turn-back section 46.

Figure 34:
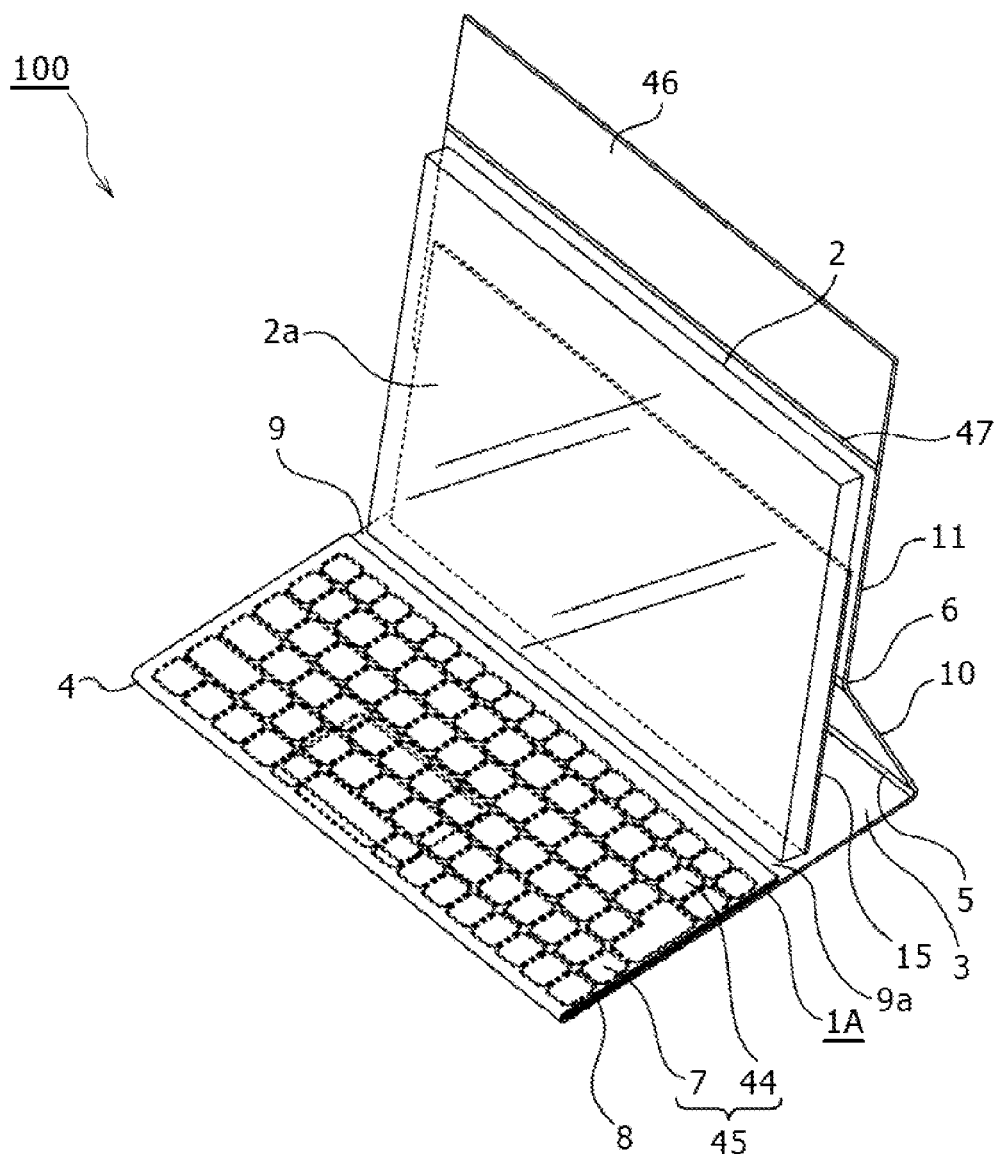
FIG. 34 is a perspective view showing a condition where a second operating region section is closed with a contact-preventing section.
Figure 35:
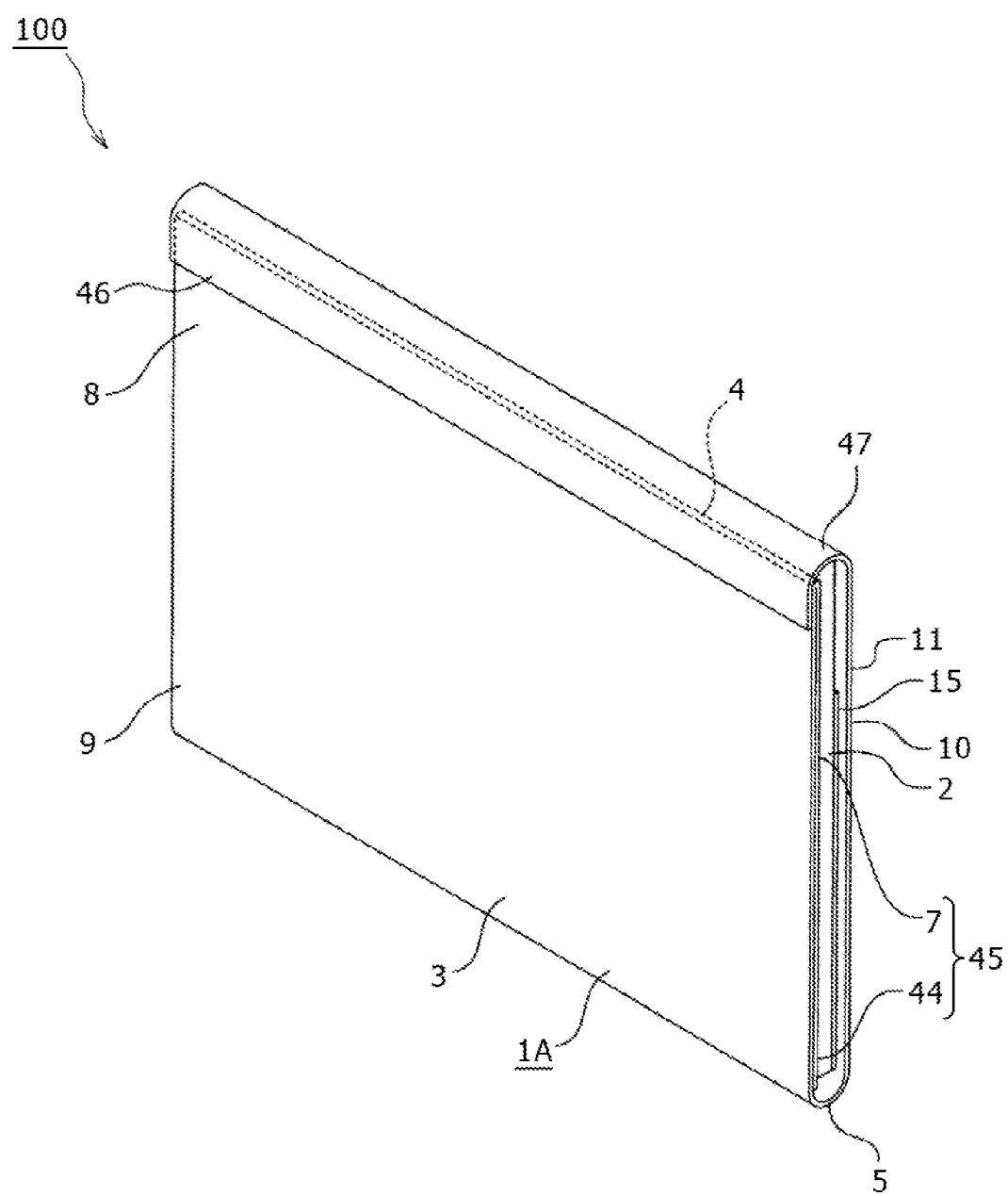
FIG. 35 is a perspective view showing the protective cover in a cover mode.

When the protective cover 1A is set into the cover mode, first, the contact-preventing section 45 is folded at the first folding section 4 in relation to the second operating region section 8, whereby the second operating region section 8 is covered up with the contact-preventing section 45 from above (see FIG. 34).

Next, the link section 10 is folded at the second folding section 5 in relation to the mount section 9, so as to put the electronic apparatus 2 onto the contact-preventing section 45. In this instance, the display surface 2a of the electronic apparatus 2 is brought into contact with the contact-preventing section 45.

Finally, the turn-back section 46 is folded at the fourth folding section 47 at an angle of about 180° in relation to the stand section 11, so as to set the protective cover 1A into the cover mode, and the binding part of the first operating region section 7 and the binding part of the turn-back section 46 are bound together. Consequently, the electronic apparatus 2 is housed inside the protective cover 1A in the state of being enveloped in the protective cover 1A (see FIG. 35).

Where the contact-preventing section 45 is thus provided, it is ensured that upon setting of the cover mode, the display surface 2a of the electronic apparatus 2 is not contacted by the second operating region section 8 but is contacted by the contact-preventing section 45, whereby the display surface 2a can be prevented from being marred. Particularly, where the contact-preventing section 45 is formed of a low-hardness material, marring of the display surface 2a can be prevented at high probability.

[Modifications of Electronic Apparatus and Back Plate]

Figure 36:
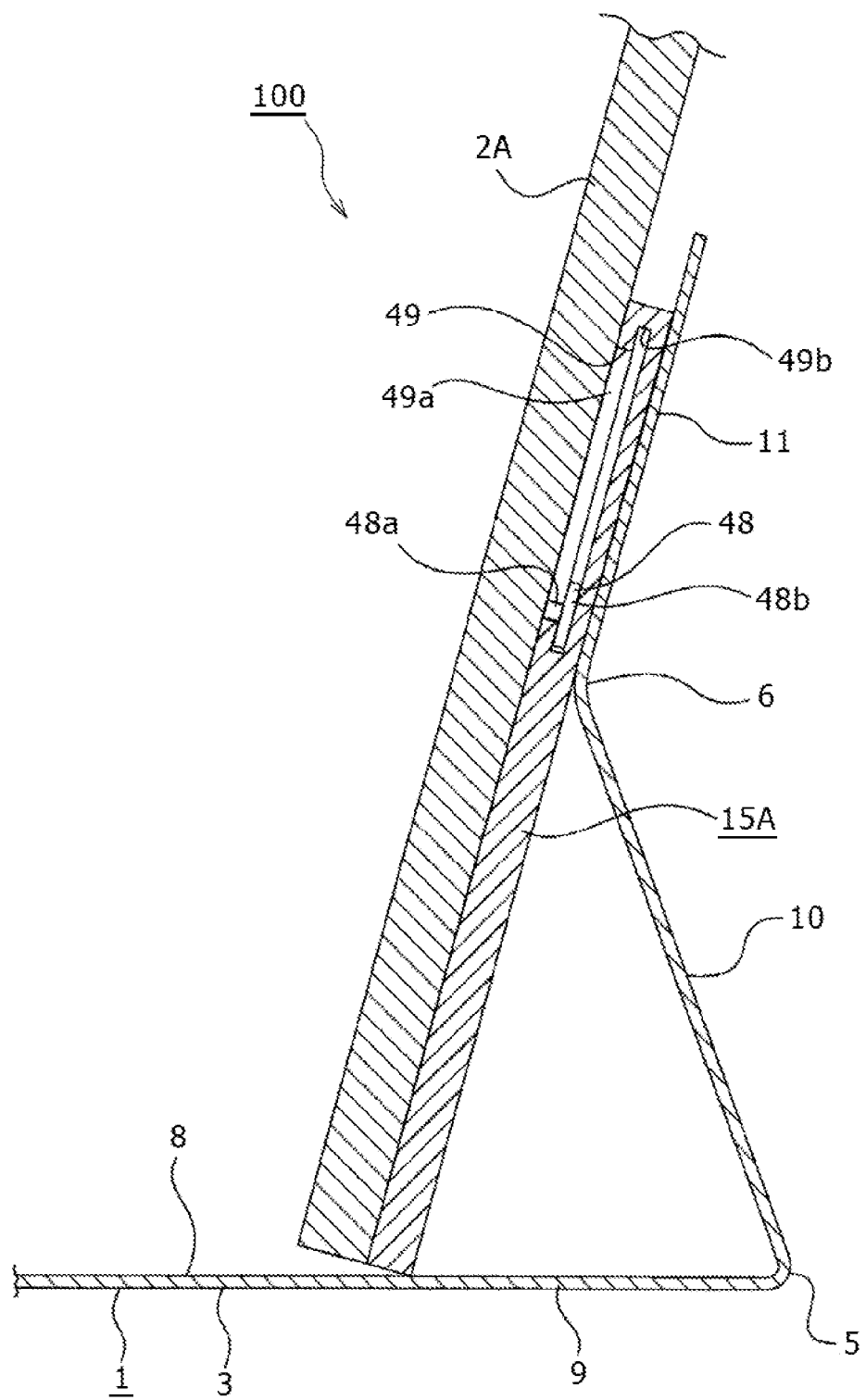
FIG. 36 shows, together with FIGS. 37 and 38, a first modification of an electronic apparatus and a back plate, and is a side view showing the same partly in section.

Now, a first modification of the electronic apparatus and the back plate will be described below (see FIGS. 36 to 38).

In an electronic apparatus 2A according to the first modification, in addition to the configuration of the electronic apparatus 2 described above, a supported shaft 48 projecting from the back surface is provided. The supported shaft 48 has a small-diameter shaft section 48a continuous with the back surface of the electronic apparatus 2A, and a large-diameter shaft section 48b provided at a tip portion of the small-diameter shaft section 48a (see FIG. 36).

In a back plate 15A according to the first modification, in addition to the configuration of the back plate 15, a vertically elongated support hole 49 opening to the front side is provided. The support hole 49 includes a narrow part 49a located on the front side and a wide part 49b located on the rear side. The horizontal width of the wide part 49b is set larger than the horizontal width of the narrow part 49a.

With the small-diameter shaft section 48a supported by the narrow part 49a and with the large-diameter shaft section 48b supported by the wide part 49b, the electronic apparatus 2A is supported on the back plate 15A so as to be vertically movable and be turnable with the supported shaft 48 as a center of turning.

Figure 37:
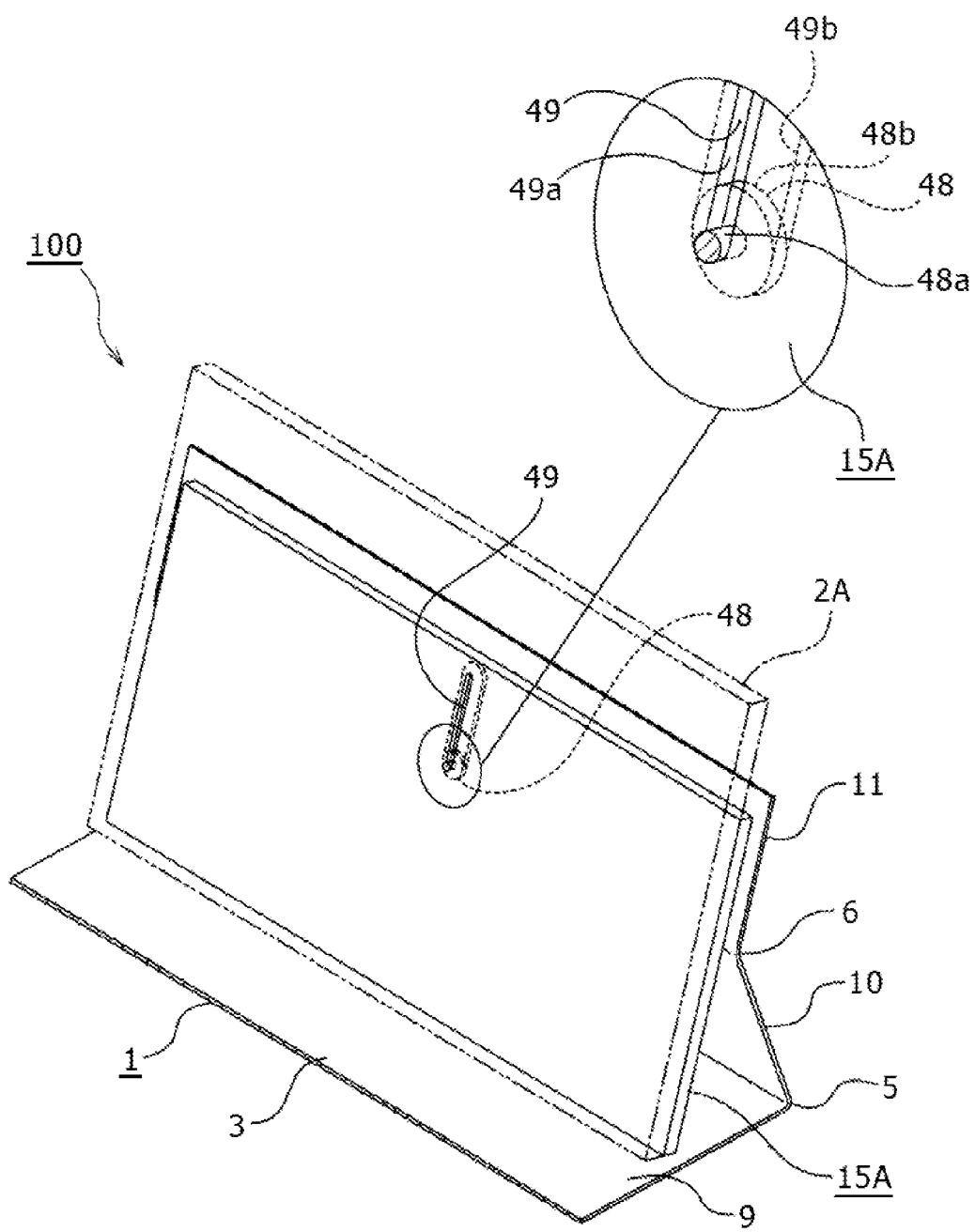
FIG. 37 is a perspective view showing a condition where the electronic apparatus is placed in a landscape state.
Figure 38:
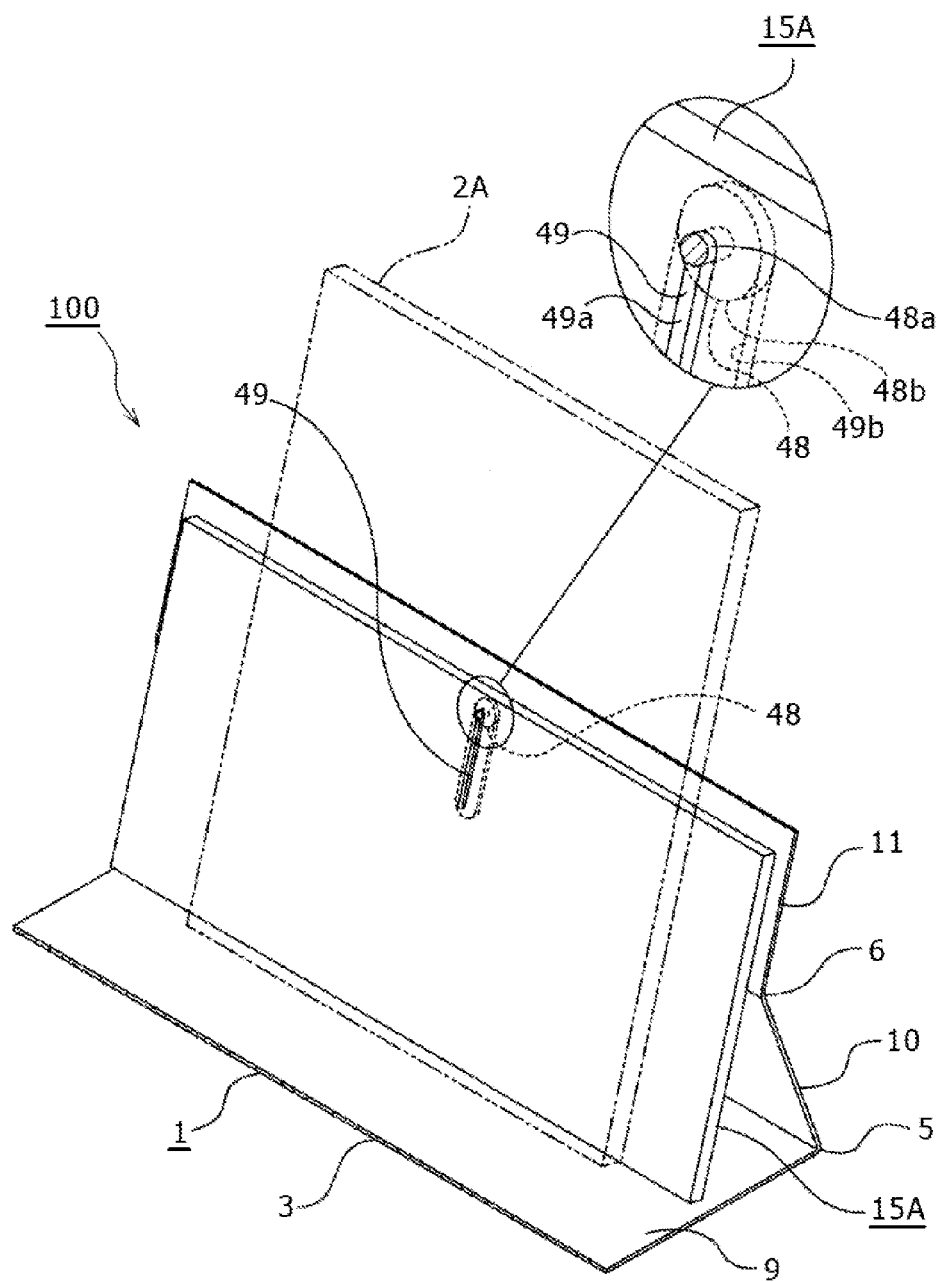
FIG. 38 is a perspective view showing a condition where the electronic apparatus is placed in a portrait state.

In the condition wherein the supported shaft 48 is located on the lower side within the support hole 49, the electronic apparatus 2A is set standing against the stand section 11 of the protective cover 1 through the back plate 15A, in a horizontally elongated state (landscape state) (see FIG. 37).

When the electronic apparatus 2A in the horizontally elongated state is moved upward relative to the back plate 15A and turned by 90° with the supported shaft 48 as a center of turning, the electronic apparatus 2A is put into a vertically elongated state. The electronic apparatus 2A is turned in the state of being lifted up from the mount section 9 together with the back plate 15A, in order to avoid its contact with the mount section 9.

Specifically, when the electronic apparatus 2A moved upward is turned by 90°, it is set in the vertically elongated state. Subsequently, the back plate 15A is put in contact with the mount surface 9 of the cover unit 3, whereby the electronic apparatus 2A is set standing against the stand section 11 of the protective cover 1 through the back plate 15A, in the vertically elongated state (portrait state) (see FIG. 38). In this case, the control unit 17 performs such a control that characters and the like displayed on the display surface 2a of the electronic apparatus 2A are displayed in upright state even when the electronic apparatus 2A is thus set in the vertically elongated state.

When operations reverse to the above are conducted starting from the condition wherein the electronic apparatus 2A is in the vertically elongated state, the electronic apparatus 2A is again set standing against the stand section 11 of the protective cover 1 through the back plate 15A, in the horizontally elongated state (landscape state) (see FIG. 37).

Incidentally, when the electronic apparatus 2A is moved upward and downward relative to the back plate 15A and turned as above-mentioned, the position of a terminal part of the electronic apparatus 2A relative to the connection terminal section 15a is changed. In this case, therefore, a configuration is, for example, adopted wherein the terminal part and the connection terminal section 15a are interconnected through a flexible printed wiring board. Alternatively, another configuration is adopted wherein the electronic apparatus 2A is provided with two terminal parts respectively at positions according to the change in its position (posture) relative to the back plate 15A. With such a measure taken, it is ensured that the terminal part and the connection terminal section 15a are interconnected, irrespectively of the position (posture) of the electronic apparatus 2A relative to the back plate 15A.

With the electronic apparatus 2A supported on the back plate 15A in a turnable and movable manner as above-mentioned, the electronic apparatus 2A can be used by changing its orientation, which promises enhanced convenience in use.

Incidentally, while an example wherein the electronic apparatus 2A is provided with the supported shaft 48 whereas the back plate 15A is provided with the support hole 49 by which to support the supported shaft 48 has been described above, a reverse configuration may also be adopted in which the electronic apparatus is formed with a support hole whereas the back plate is provided with a supported shaft to be supported in the support hole.

Now, a second modification of the electronic apparatus and the back plate will be described below (see FIGS. 39 to 41).

Figure 39:
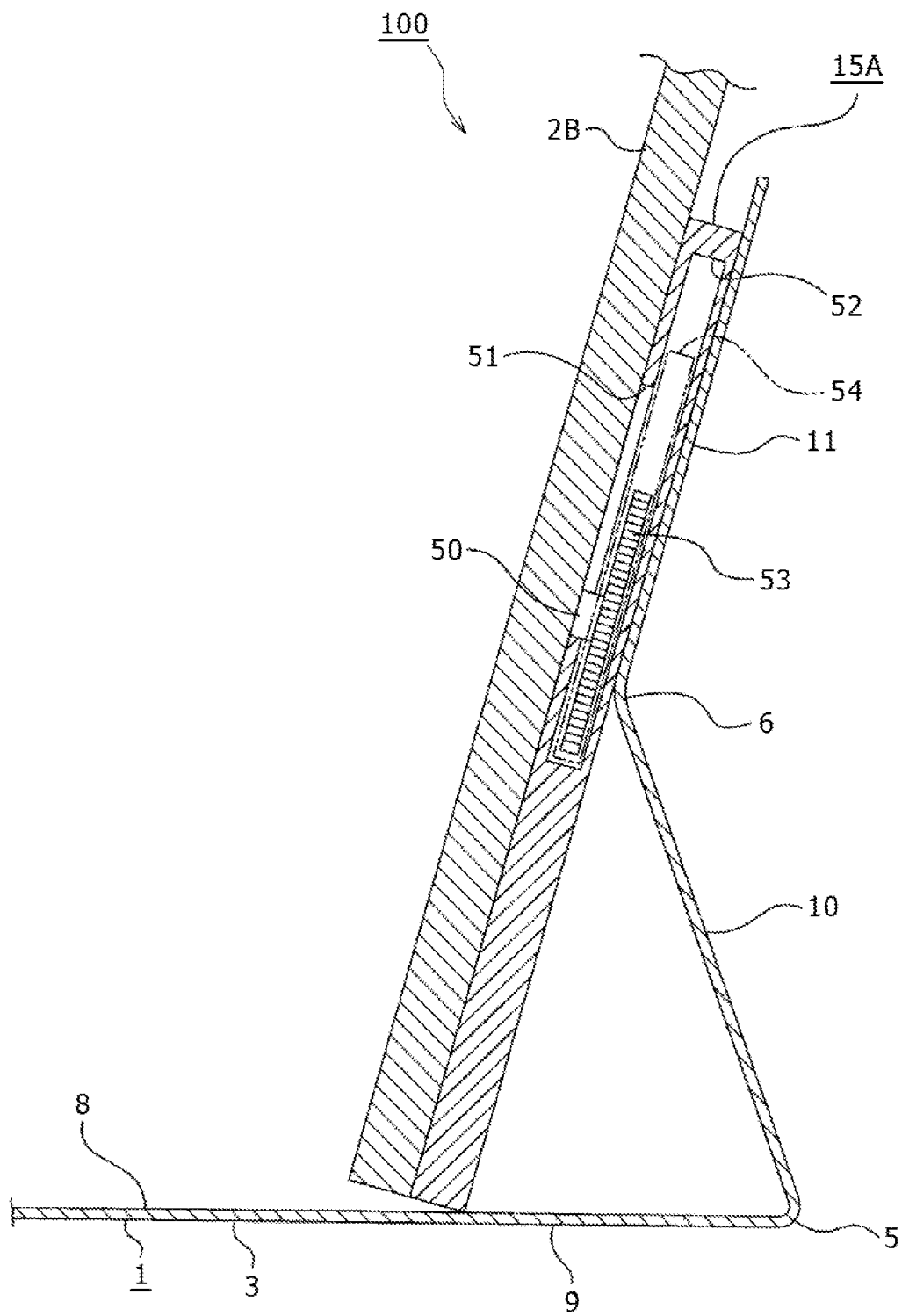
FIG. 39 shows, together with FIGS. 40 and 41, a second modification of the electronic apparatus and the back plate, and is a side view showing the same partly in section.

In an electronic apparatus 2B according to the second modification, in addition to the configuration of the electronic apparatus 2, a connecting shaft 50 projecting from the back surface is provided (see FIG. 39).

In a back plate 15B according to the second modification, in addition to the configuration of the back plate 15, a vertically elongated support hole 51 opening to the front side is provided. The back plate 15B is provided with a mechanism layout space 52 on the rear side of the support hole 51, and the mechanism layout space 52 communicates with the support hole 51.

In the mechanism layout space 52 are laid out a pinion gear 53 and a rack 54.

The connecting shaft 50 is connected to a central portion of the pinion gear 53. Therefore, the pinion gear 53 and the electronic apparatus 2B are rotated as one body.

The rack 54 is disposed in a vertically extending state. The rack 54 is in mesh with the pinion gear 53. When the electronic apparatus 2 is turned, therefore, the pinion gear 53 is moved in the vertical direction while in mesh with the rack 54, so that the electronic apparatus 2B is also moved vertically as the pinion gear 53 is moved vertically.

Thus, the electronic apparatus 2B is supported on the back plate 15A through the pinion gear 53 so as to be vertically movable and be turnable with the connecting shaft 50 as a center of turning.

Figure 40:
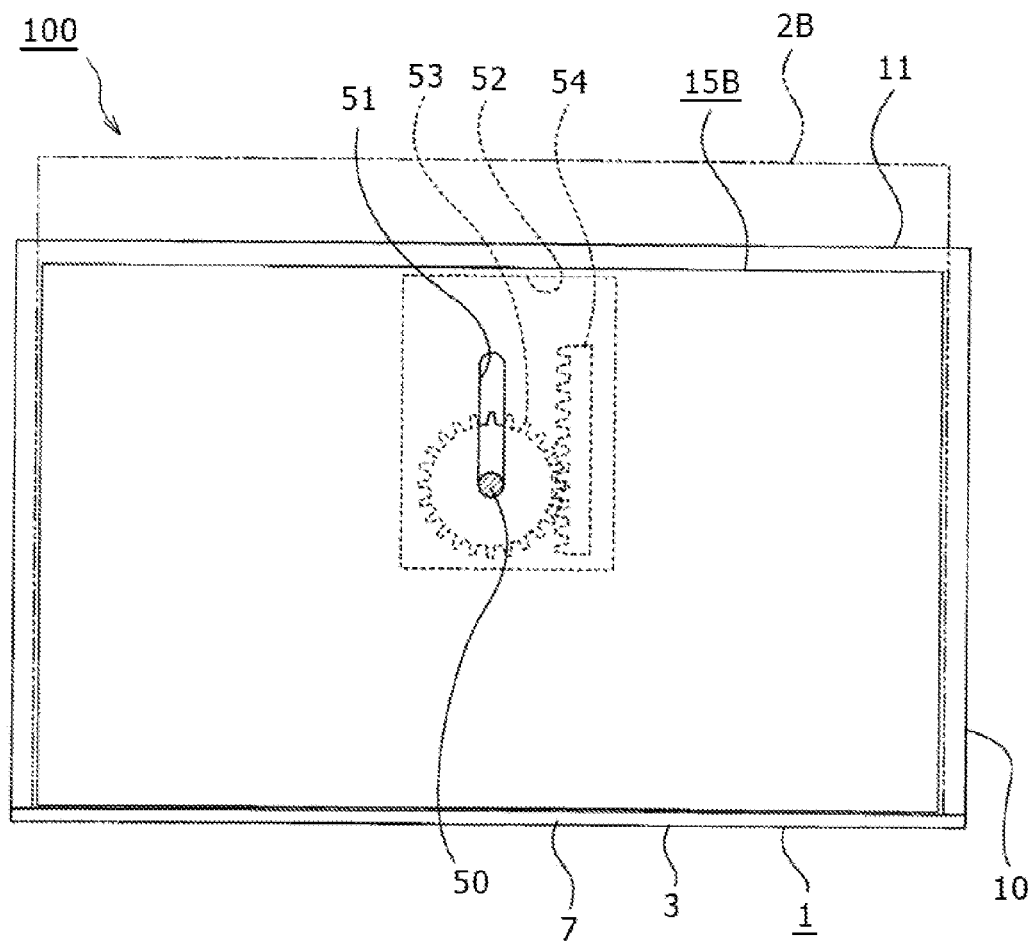
FIG. 40 is a front view showing a condition where the electronic apparatus is set in a landscape state.
Figure 41:
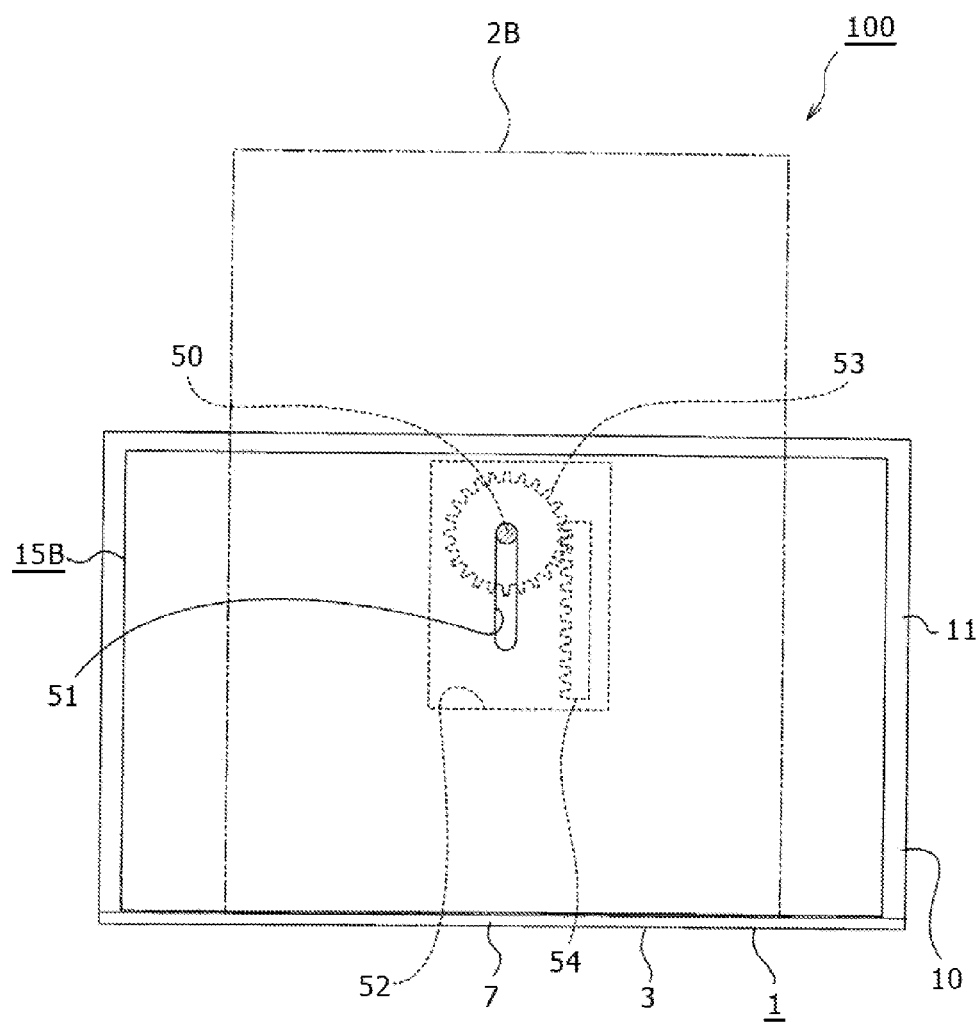
FIG. 41 is a front view showing a condition where the electronic apparatus is set in a portrait state.

In the condition wherein the connecting shaft 50 is located on the lower side within the support hole 51, the electronic apparatus 2B is set standing against the stand section 11 of the protective cover 1 through the back plate 15B, in a horizontally elongated state (landscape state) (see FIG. 40).

As the electronic apparatus 2B in the horizontally elongated state is gradually turned in one direction, the pinion gear 53 is rotated in mesh with the rack 54, and the electronic apparatus 2B is moved upward together with the pinion gear 53. The electronic apparatus 2B is turned in the state of being lifted up from the mount section 9 together with the back plate 15B, in order to avoid its contact with the mount section 9.

When the electronic apparatus 2B moved upward is turned by 90°, it is set into a vertically long state. Subsequently, the back plate 15B is put in contact with the mount section 9 of the cover unit 3, whereby the electronic apparatus 2B is set standing against the stand section 11 of the protective cover 1 through the back plate 15B, in the vertically elongated state (portrait state) (see FIG. 41). In this case, the control unit 17 performs such a control that characters and the like displayed on the display surface 2a of the electronic apparatus 2B are displayed in upright state even when the electronic apparatus 2B is thus set in the vertically elongated state.

When operations reverse to the above are conducted starting from the condition wherein the electronic apparatus 2B is in the vertically elongated state, the electronic apparatus 2B is again set standing against the stand section 11 of the protective cover 1 through the back plate 15B, in the horizontally elongated state (landscape state) (see FIG. 40).

Incidentally, when the electronic apparatus 2B is moved upward and downward relative to the back plate 15B and turned as above-mentioned, the position of a terminal part of the electronic apparatus 2B relative to the connection terminal section 15a is changed. In this case, therefore, a configuration is, for example, adopted wherein the terminal part and the connection terminal section 15a are interconnected through a flexible printed wiring board. Alternatively, another configuration is adopted wherein the electronic apparatus 2B is provided with two terminal parts respectively at positions according to the change in its position (posture) relative to the back plate 15B. With such a measure taken, it is ensured that the terminal part and the connection terminal section 15a are interconnected, irrespectively of the position (posture) of the electronic apparatus 2B relative to the back plate 15B.

With the electronic apparatus 2B supported on the back plate 15B in a turnable and movable manner as above-mentioned, the electronic apparatus 2B can be used by changing its orientation, which permits enhanced convenience in use.

In addition, in the electronic apparatus 2B and the back plate 15B according to the second modification, turning of the electronic apparatus 2B is accompanied simultaneously by its vertical movement, so that a change in the orientation (posture) of the electronic apparatus 2B can be made swiftly and easily.

Incidentally, while an example wherein the pinion gear 53 and the rack 54 are disposed inside the back plate 15B has been described above, this configuration is not restrictive. For example, a reverse configuration may be adopted in which a pinion gear and a rack are disposed inside the electronic apparatus. Further, the pinion gear 53 and the rack 54 may be located between the electronic apparatus 2B and the back plate 15B.

Besides, while an example wherein one pinion gear 53 is used has been described above, a plurality of gears may be arranged in the area ranging from the electronic apparatus 2B to the rack 54, or gears may be arranged in a plurality of stages.

[Control Operation in Information Processor]

Now, examples of a control operation performed in the information processor 100 will be described below (see FIGS. 42 to 51).

First Example

Figure 42:
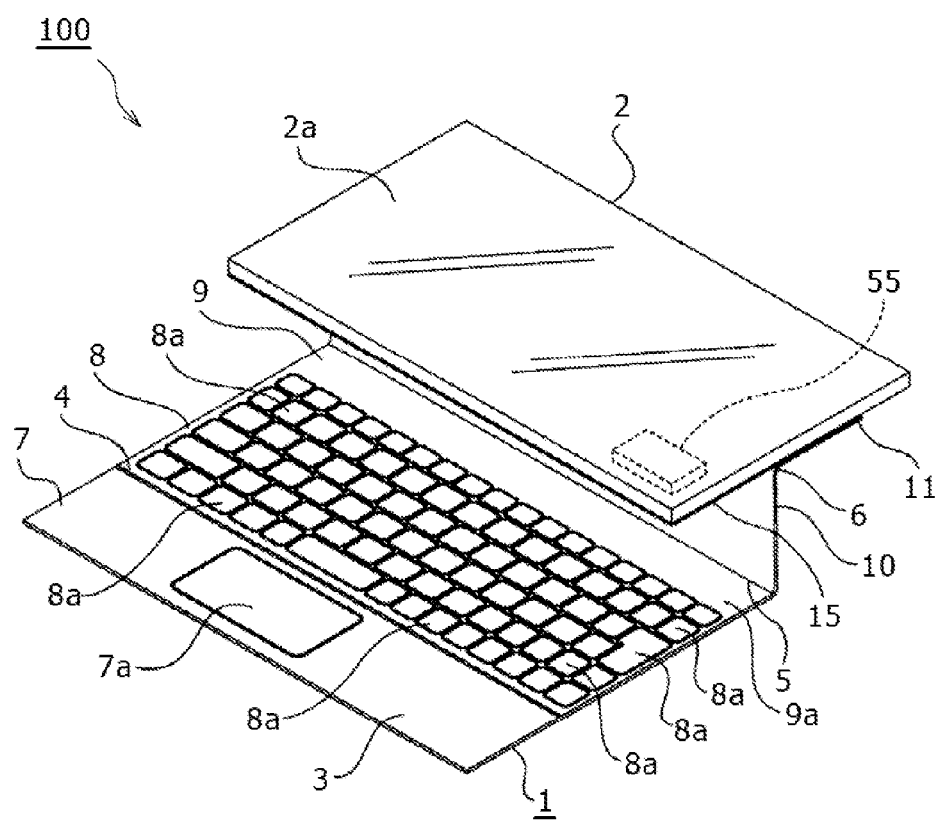
FIG. 42 shows, together with FIGS. 43 to 51, examples of control operation, and is a perspective view of an information processor representing a first example.
Figure 43:
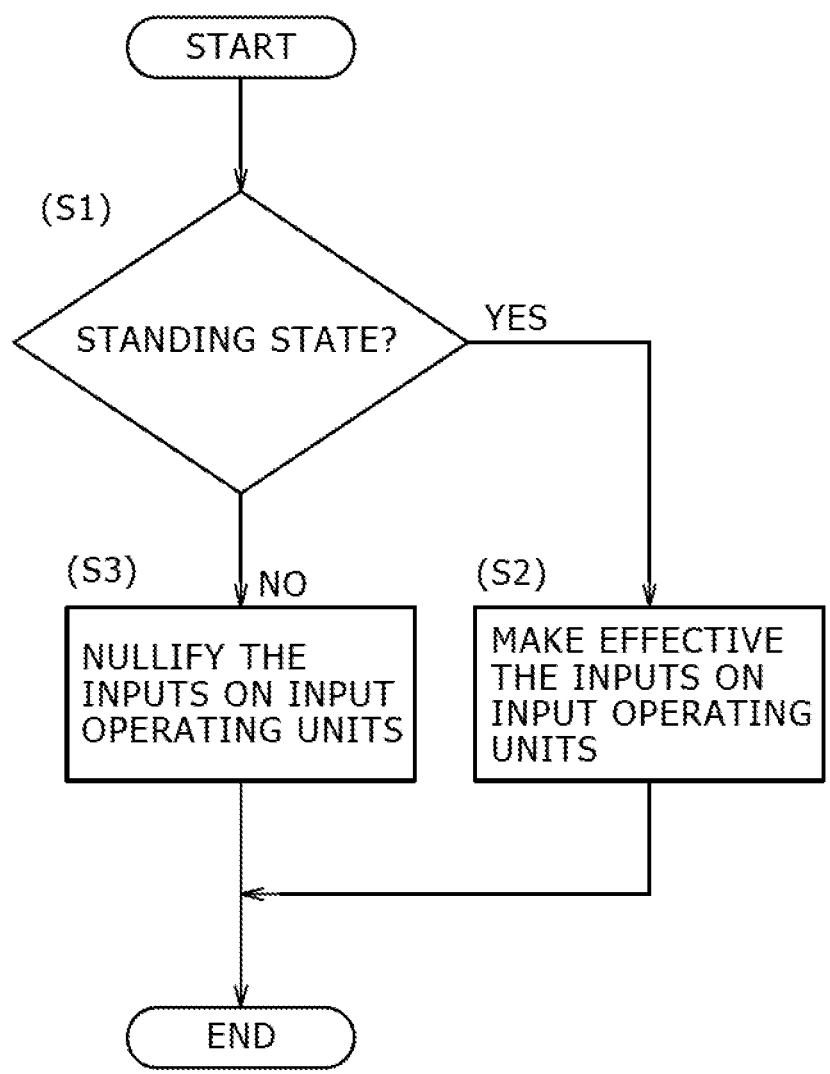
FIG. 43 is a flow chart representing a first example.

In a first example of the control operation, the state of the electronic apparatus 2 is detected, and inputs to the touch pad 12 and the keyboard 13 are nullified when the state of the electronic apparatus 2 of standing against the stand section 11 is not detected (see FIGS. 42 and 43).

The electronic apparatus 2 has an acceleration sensor 55 or vibration sensor incorporated therein (see FIG. 42). In the first example, motions of the electronic apparatus 2 are detected by the acceleration sensor 55 or vibration sensor, and a control operation is carried out based on the following steps (see FIG. 43).

In step (S1), a detecting operation for detecting the motion of the electronic apparatus 2 by the acceleration sensor 55 or vibration sensor is started. When a standing state of the electronic apparatus 2 is detected by the acceleration sensor 55 of vibration sensor, the control proceeds to step (S2). When a change of the electronic apparatus 2 from the standing state is detected by the acceleration sensor 55 or vibration sensor, the control proceeds to step (S3).

The detection by the acceleration sensor 55 or vibration sensor of the electronic apparatus 2 being in the standing state is carried out when an acceleration change or vibration amount of less than a predetermined threshold is detected. Therefore, when an acceleration change or vibration amount of not less than the predetermined threshold is detected by the acceleration sensor 55 or vibration sensor, a change of the electronic apparatus 2 from the standing state is detected.

In step (S2), a control by which inputs on the touch pad 12 and the keyboard 13 functioning as input operating sections are made effective is performed by the control unit 17 incorporated in the electronic apparatus 2 or the protective cover 1, followed by ending of the control operation.

In step (S3), a control by which inputs on the touch pad 12 and the keyboard 13 functioning as input operating sections are nullified is performed by the control unit 17, followed by ending of the control operation.

Thus, when the electronic apparatus 2 is not in the standing state, inputs on the touch pad 12 and the keyboard 13 are nullified. This ensures that even if an unintentional touch of a finger or fingers on the touch pad 12 or the keyboard 13 is made during a process for opening the protective cover 1 and setting the electronic apparatus 2 to stand against the stand section 11 or during a process for storing the electronic apparatus 2 into the protective cover 1, an erroneous input or inputs can be prevented from being made.

Incidentally, while an example wherein the detection of the standing state of the electronic apparatus 2 is made by the acceleration sensor 55 or vibration sensor incorporated in the electronic apparatus 2 has been described above, this is not restrictive. For example, the detection of the standing state of the electronic apparatus 2 can also be made through utilizing the coming of the lower surface of the electronic apparatus 2 into contact with or proximity to the protective cover 1.

Examples of such a detection method include a method in which whether or not the lower surface of the electronic apparatus 2 has come into contact with or proximity to the protective cover 1 is detected based on a change in capacitance at a touch panel provided in the electronic apparatus 2.

Another example is a method in which the electronic apparatus 2 is provided with a magnetic sensor, whereas the protective cover 1 is provided with a magnet, and the position of the magnet is detected by use of the magnetic sensor, whereby whether the lower surface of the electronic apparatus 2 is in contact with or proximity to the protective cover 1 is detected. Incidentally, in this method, a reverse configuration may be adopted in which the electronic apparatus 2 is provided with a magnet whereas the protective cover 1 is provided with a magnetic sensor.

A further example is a method in which the electronic apparatus 2 is provided with an optical type contact sensor, whereby it is detected whether the lower surface of the electronic apparatus 2 is in contact with or proximity to the protective cover 1.

Second Example

In a second example of the control operation, the inclination angle of the electronic apparatus 2 in a standing state or the position of the electronic apparatus 2 relative to the protective cover 1 is detected, and, according to the inclination angle or position of the electronic apparatus 2, those operating keys 13a, 13a, ... of the keyboard 13 which are presumed to be hidden by the electronic apparatus 2 are displayed on the display surface 2a of the electronic apparatus 2 (see FIGS. 44 to 49).

Figure 44:
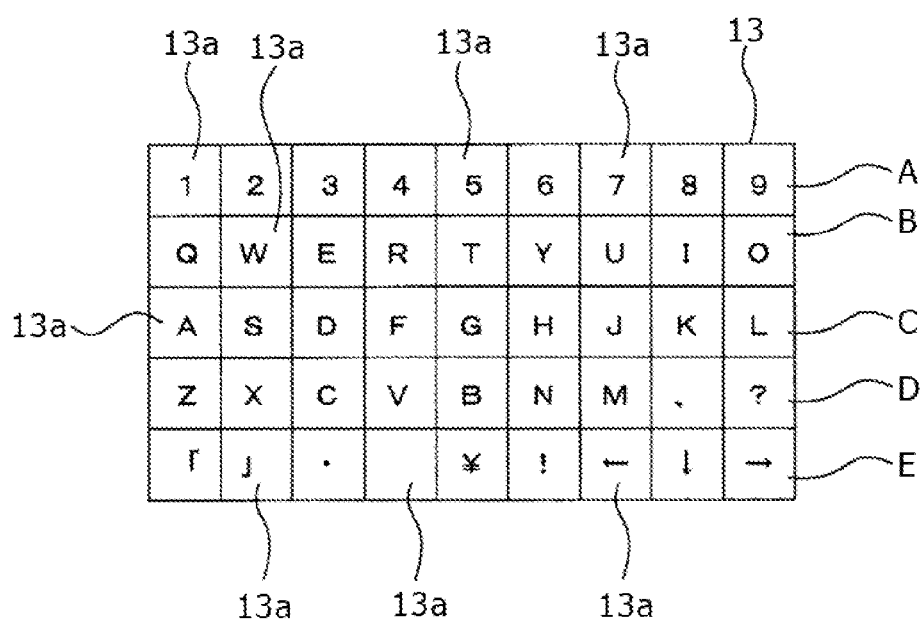
FIG. 44 is a plan view showing an example of a keyboard.

The operating keys 13a, 13a, ... of the keyboard 13 are arranged, for example, in five rows (see FIG. 44).

The inclination angle of the electronic apparatus 2 in the standing state is detected by an acceleration sensor 55 incorporated in the electronic apparatus 2.

Figure 45:
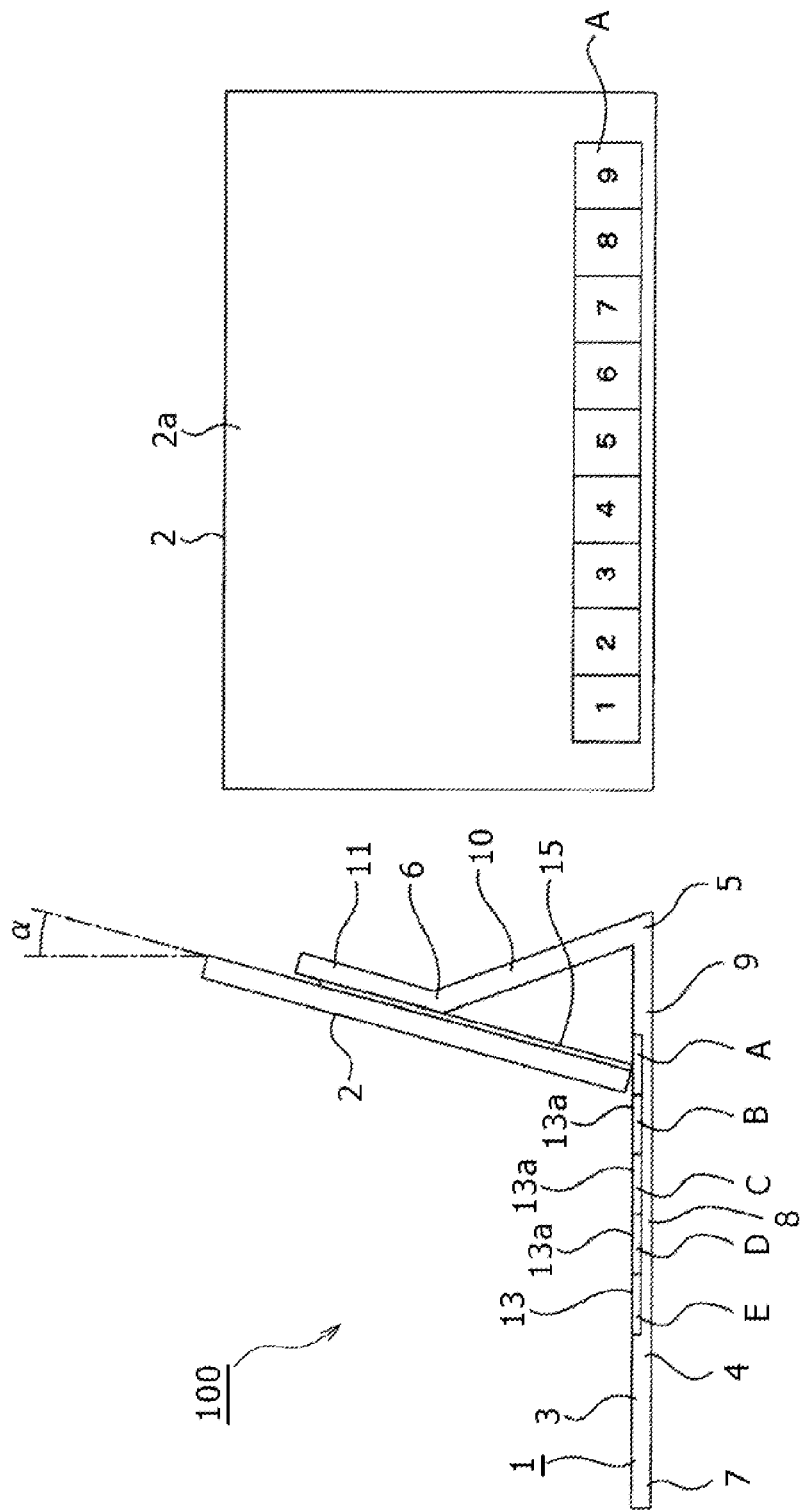
FIG. 45 shows conceptual diagrams of a condition where an electronic apparatus is inclined and a virtual keyboard displayed on a display surface of the electronic apparatus, in a second example.

When the inclination angle α of the electronic apparatus 2 is detected by the acceleration sensor 55 to be, for example, not less than 10° and less than 20°, it is assumed that the operating keys 13a, 13a, ... in the first row A of the keyboard 13 are hidden by the electronic apparatus 2 (see the left-side drawing in FIG. 45). In view of this, the operating keys 13a, 13a, ... in the first row A are displayed on the display surface 2a of the electronic apparatus 2 as the components of a virtual keyboard (see the right-side drawing in FIG. 45).

Figure 46:
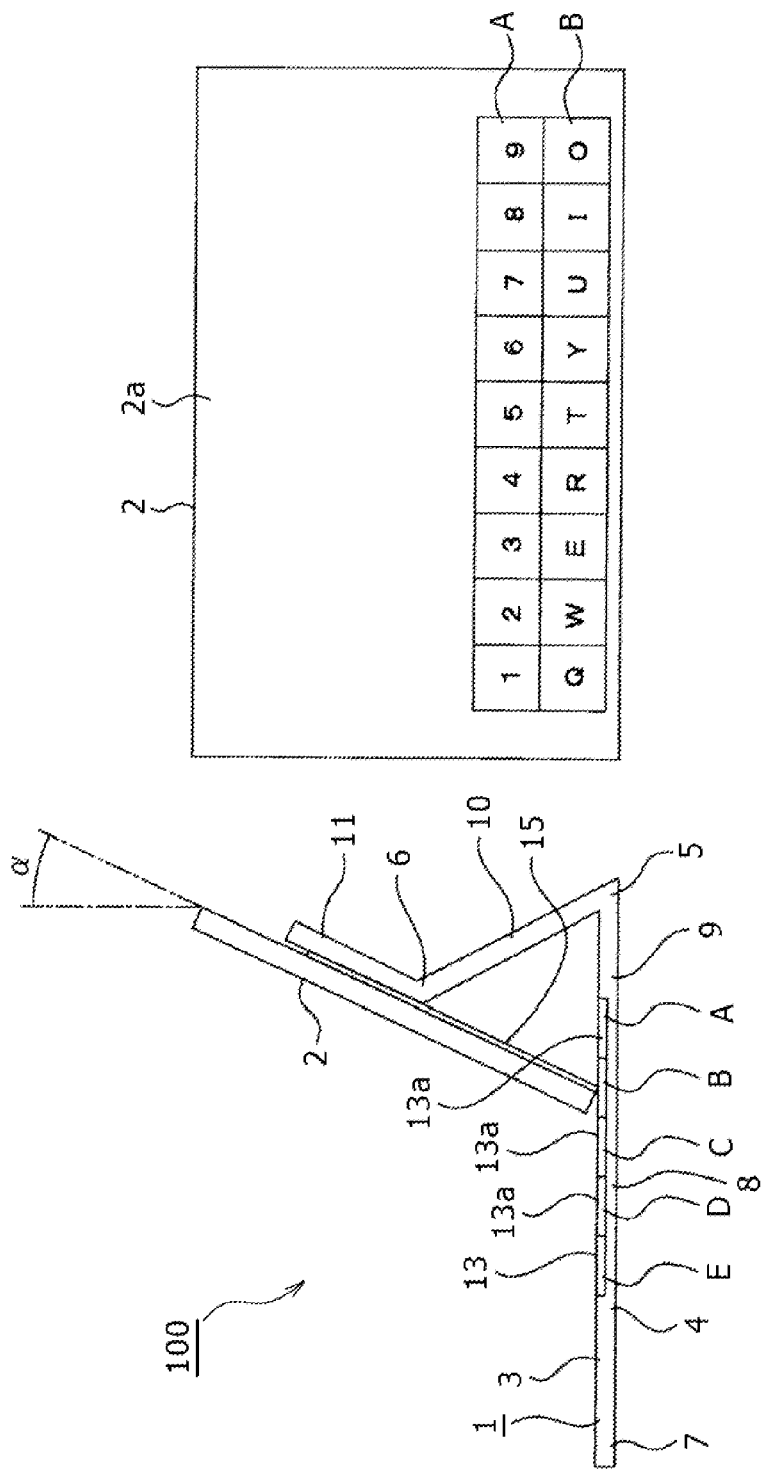
FIG. 46 shows conceptual diagrams of a condition where the electronic apparatus is inclined at an angle different from that in FIG. 45 and a virtual keyboard displayed on the display surface of the electronic apparatus, in the second example.

In addition, when the inclination angle α of the electronic apparatus 2 is detected by the acceleration sensor 55 to be, for example, not less than 20° and less than 30°, it is assumed that the operating keys 13a, 13a, ... in the first row A of the keyboard 13 and the operating keys 13a, 13a, ... in the second row B are hidden by the electronic apparatus 2 (see the left-side drawing in FIG. 46). In view of this, the operating keys 13a, 13a ... in the first row A and the operating keys 13a, 13a ... in the second row B are displayed on the display surface of the electronic apparatus 2 as the components of a virtual keyboard (see right-side drawing in FIG. 46).

Similarly, according to the detection result of the inclination angle α of the electronic apparatus 2, the operating keys 13a, 13a, ... in the third row C, the fourth row D and the fifth row E which are assumed to be hidden by the electronic apparatus 2 are displayed on the display surface 2a as the components of a virtual keyboard.

Figure 47:
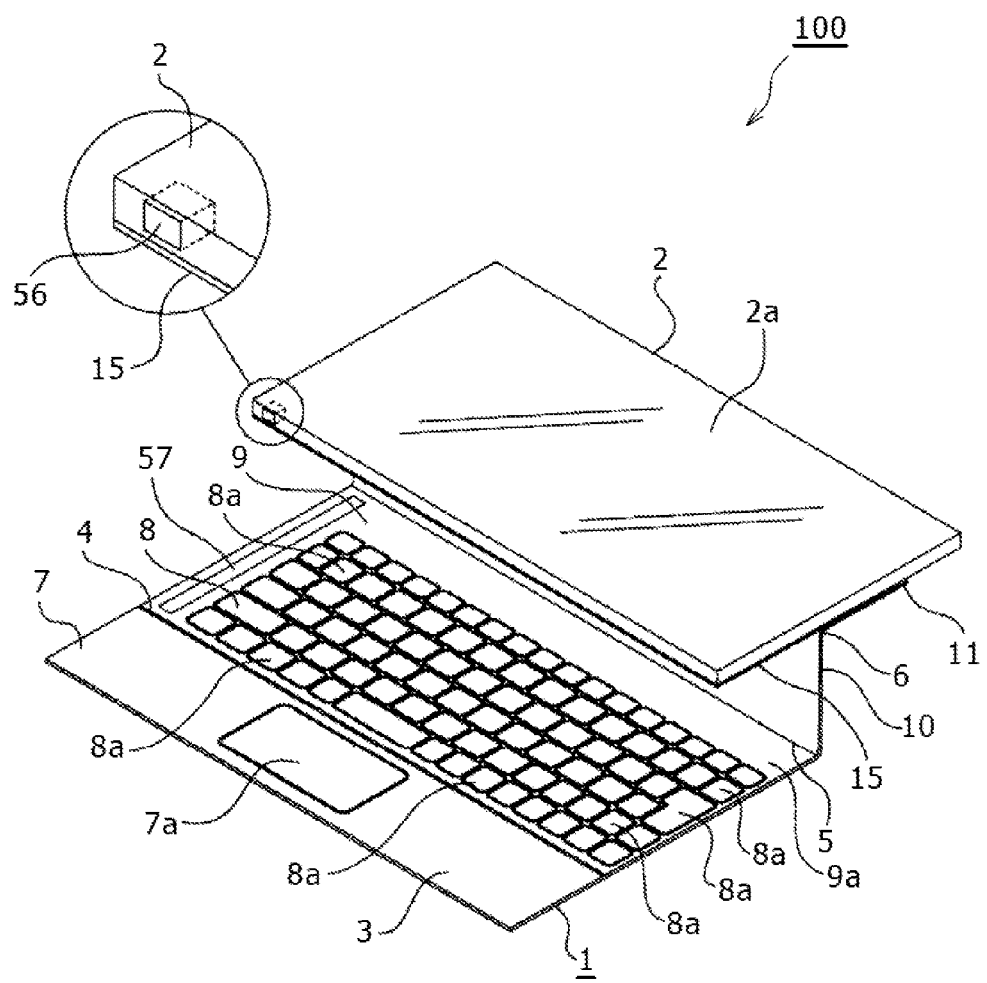
FIG. 47 is a perspective view of the information processor illustrating a configuration for detecting the position of the electronic apparatus, in the second example.

On the other hand, the position of the electronic apparatus 2 in the standing state is detected by a system in which a pointer 56 is provided at the lower surface of the electronic apparatus 2, the protective cover 1 is provided with a scale 57 extending along the front-rear direction over the range from the second operating region section 8 to the mount section 9, and the position of the pointer 56 with reference to the scale 57 is detected (see FIG. 47).

The combination of the pointer 56 and the scale 57 may be, for example, a combination of a dielectric body and a capacitance-type touch panel. In this case, a change in capacitance at the scale 57 is generated according to the position of the pointer 56, whereby the position of the electronic apparatus 2 relative to the protective cover 1 is detected.

Another example of the combination of the pointer 56 and the scale 57 is a combination of a magnetic body and a magnetic sensor. In this case, a change in magnetic field at the scale 57 is generated according to the position of the pointer 56, whereby the position of the electronic apparatus 2 relative to the protective cover 1 is detected.

Figure 48:
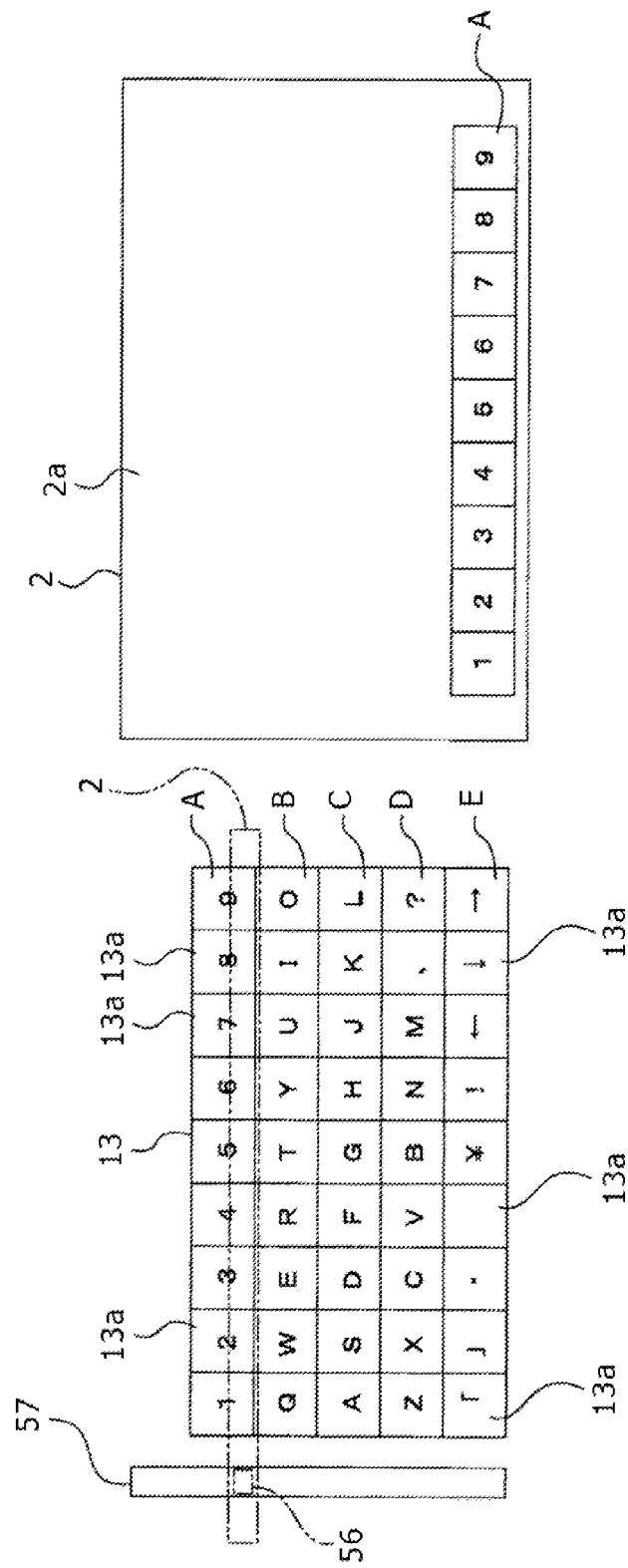
FIG. 48 shows conceptual diagrams of a condition where a first row of the keyboard is hidden by the electronic apparatus and a virtual keyboard displayed on the display surface of the electronic apparatus, in the second example.

In the case where it is assumed based on the detection results of the pointer 56 and the scale 57 that the operating keys 13*a*, 13*a*, . . . in the first row A of the keyboard 13 are hidden behind the electronic apparatus 2 (see the left-side drawing in FIG. 48), the operating keys 13*a*, 13*a*, . . . in the first row A are displayed on the display surface 2*a* of the electronic apparatus 2 as the components of a virtual keyboard (see the right-side drawing in FIG. 48).

Figure 49:
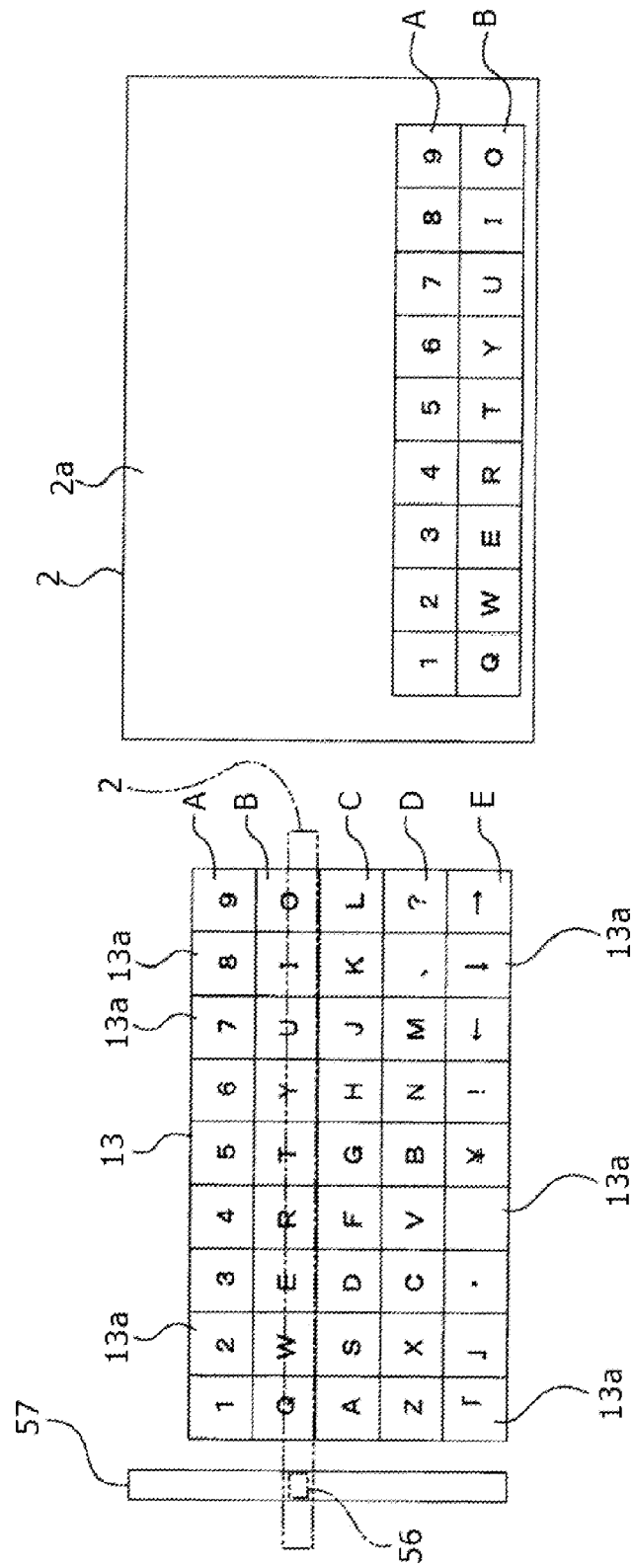
FIG. 49 shows conceptual diagrams of a condition where first and second rows of the keyboard are hidden by the electronic apparatus and a virtual keyboard displayed on the display surface of the electronic apparatus, in the second example.

In addition, when it is assumed based on the detection results of the pointer 56 and the scale 57 that the operating keys 13*a*, 13*a*, . . . in the first row A of the keyboard 13 and the operating keys 13*a*, 13*a*, . . . in the second row B are hidden by the electronic apparatus 2 (see the left-side drawing in FIG. 49), the operating keys 13*a*, 13*a*, . . . in the first row A and the operating keys 13*a*, 13*a*, . . . in the second row B are displayed on the display surface 2*a* of the electronic apparatus 2 as the components of a virtual keyboard (see the right-side drawing in FIG. 49).

Similarly, according to the detection result of the position of the electronic apparatus 2, the operating keys 13*a*, 13*a* . . . in the third row C, the fourth row D and the fifth row E which are assumed to be hidden behind the electronic apparatus 2 are displayed on the display surface 2*a* as the components of a virtual keyboard.

Where the operating keyboards 13*a*, 13*a* . . . of the keyboard 13 which are assumed to be hidden behind the electronic apparatus 2 are displayed on the display surface 2*a* of the electronic apparatus 2 as the components of a virtual keyboard in this way, inputs relevant to all the operating keys of the keyboard (the keyboard 13 and the virtual keyboard) can be made irrespectively of the inclination angle of the electronic apparatus 2 and the position of the electronic apparatus 2 relative to the protective cover 1. This promises enhanced operability.

Third Example

Figure 50:
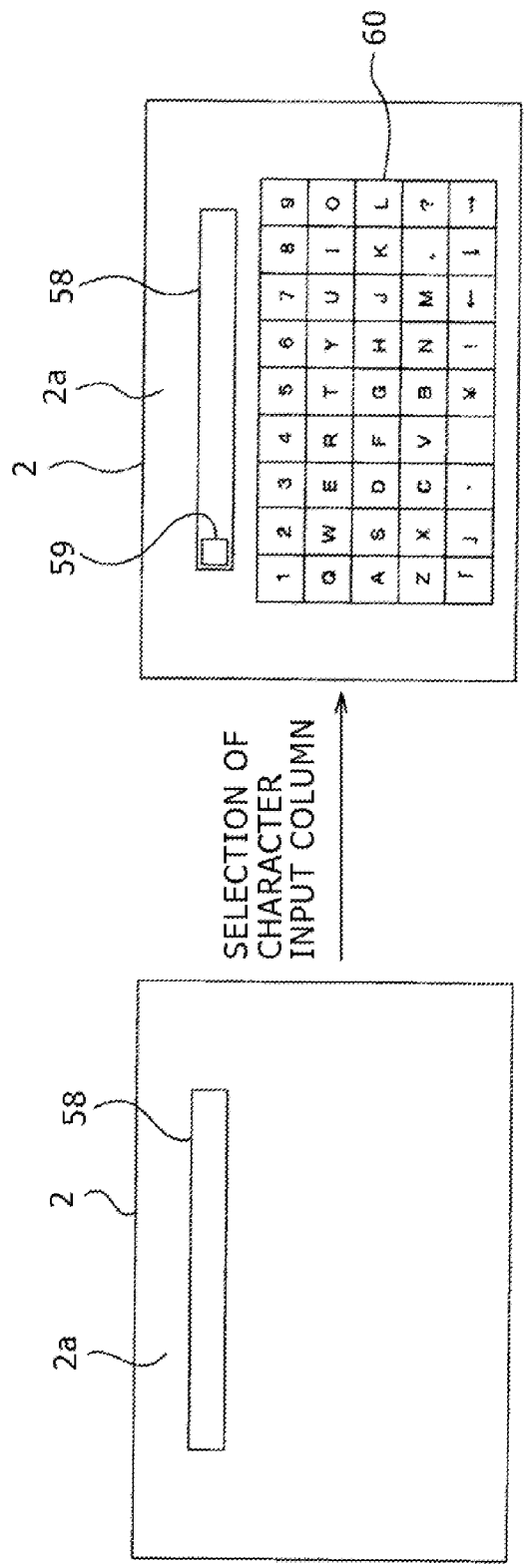
FIG. 50 shows conceptual diagrams of a condition where a character input column is displayed on the display surface of the electronic apparatus and a condition where a virtual keyboard is displayed after a selection as to the character input column is made, in a third example.
Figure 51:
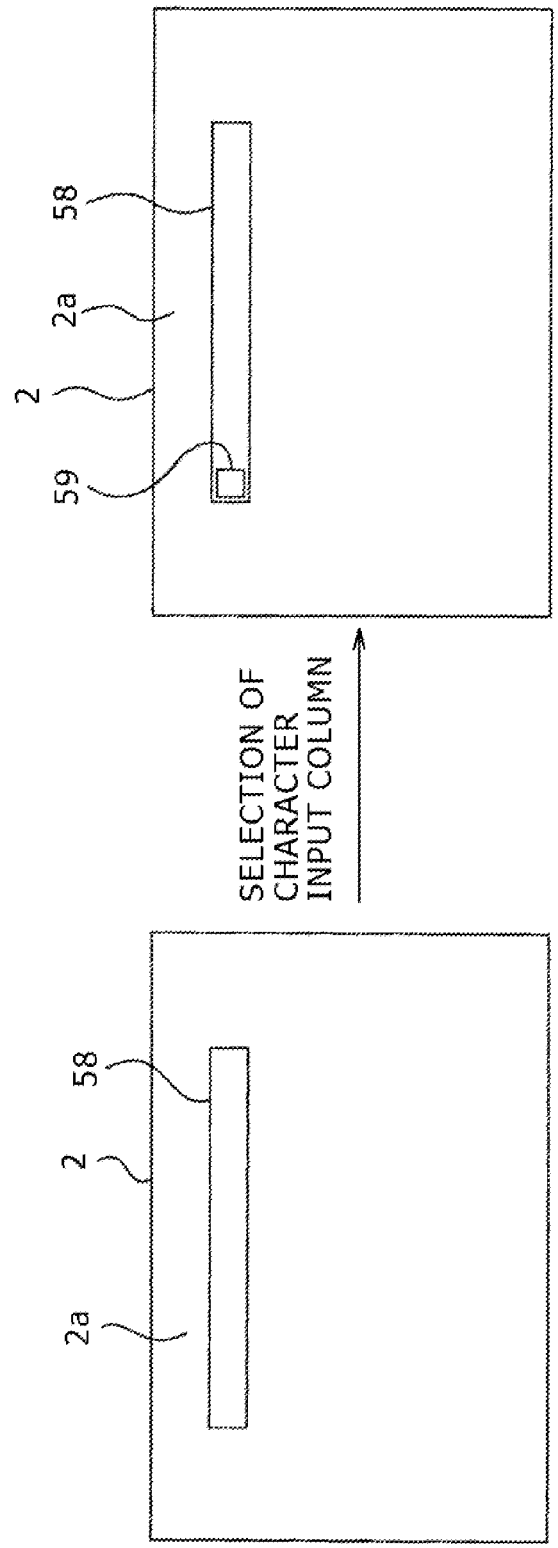
FIG. 51 shows conceptual diagrams of a condition where a character input column is displayed on the display surface of the electronic apparatus and a condition where a virtual keyboard is not displayed even though a selection as to the character input column is made, in the third example.

In a third example of the control operation, the state of the electronic apparatus 2 is detected, and, when the standing state of the electronic apparatus 2 against the stand section 11 is being detected, a virtual keyboard is not displayed on the display surface 2*a* even if an operation for displaying a virtual keyboard on the display surface 2*a* is conducted (see FIGS. 50 and 51).

As above-mentioned, a virtual keyboard can be displayed on the display surface 2*a* of the electronic apparatus 2. In addition, on the display surface 2*a* there is displayed a character input column in which characters inputted by operations on the keyboard 13 or the virtual keyboard are to be displayed.

The display of the virtual keyboard on the display surface 2*a* is enabled when a cursor is positioned by the user on the character input column being displayed on the display surface 2*a* and a selecting operation is conducted by the user.

The electronic apparatus 2 has an acceleration sensor 55 or vibration sensor incorporated therein, and the same detecting operation as in the first example of the control operation is carried out.

In the case where the standing state of the electronic apparatus 2 is not being detected, a virtual keyboard 60 is displayed on the display surface 2*a* when a cursor 59 is positioned on a character input column 58 and a selecting operation is conducted by the user (see FIG. 50). Accordingly, characters inputted by the user's operation on the keyboard 13 or the virtual keyboard 60 are displayed in the character input column 58.

On the other hand, in the case where the standing state of the electronic apparatus 2 is being detected, the virtual keyboard 60 is not displayed on the display surface 2*a* even if the cursor 59 is positioned on the character input column 58 and a selecting operation is conducted by the user (see FIG. 51). Accordingly, characters inputted by the user's operation on the keyboard 13 are displayed in the character input column 58.

When the electronic apparatus 2 is in the standing state, operations on the keyboard 13 can be made. Therefore, the above-mentioned control wherein the virtual keyboard 60 is not displayed on the display surface 2*a* when the standing state of the electronic apparatus 2 is being detected ensures that unnecessary displays on the display surface 2*a* are omitted, which promises simplified operability for the user.

Incidentally, when the electronic apparatus 2 is in the standing state, also, part of the keyboard 13 may be hidden by the electronic apparatus 2. In this case, the operating keys which are assumed to be hidden behind the electronic apparatus 2 are displayed on the display surface 2*a* as the components of a virtual keyboard by the effect of the above-described second example of the control operation. Accordingly, there arises no lowering in operability for the user.

Other Example

While the first, second and third examples of the control operation have been applied to the protective cover 1, the electronic apparatus 2 and the back plate 15 in the above description, the first, second and third examples of the control operation can be applied also to the protective cover 1A, the electronic apparatus 2A and the back plate 15A according to the modification.

[Configuration of Information Processor in Second Embodiment]

Now, the configuration of an information processor in a second embodiment will be described below.

An information processor 200 in the second embodiment includes a protective cover 61 and an electronic apparatus 62 (see FIGS. 52 to 58).

The protective cover 61 is foldable, and includes a cover unit 63 and required parts disposed inside the cover unit 63. The protective cover 61 is formed in a thin, vertically elongated, substantially rectangular plate-like shape in its state before being folded (see FIGS. 56 and 57).

The cover unit 63 is formed, for example, of an elastomer, which is a material having a high coefficient of friction. Incidentally, the material of the cover unit 63 is not restricted to elastomers but may be, for example, silicones, felt, compressed felt, resin materials such as polypropylene, ABS (acrylonitrile-butadiene-styrene copolymer), etc., leather or the like.

The required parts are disposed inside the cover unit 63.

The cover unit 63 has a first folding section 64 and a second folding section 65 which extend in the left-right direction and are provided sequentially along the front-rear direction, at an interval along the front-rear direction.

Of the part on the front side of the first folding section 64, the front-side portion (roughly one half the part) is provided as an operating region section 66, and the rear-side portion (roughly one half the part) is provided as a mount section 67. The part between the first folding section 64 and the second folding section 65 is provided as a link section 68. The part on the rear side of the second folding section 65 is provided as a stand section 69.

The operating region section 66, the mount section 67, the link section 68 and the stand section 69 are each provided as a plate section. The total front-rear-directional length of the operating region section 66 and the mount section 67 is set to be approximately equal to the total front-rear-directional length of the link section 68 and the stand section 69.

Thin plate-like members (not shown) are disposed correspondingly in the interiors of the front-side portion of the first folding section 64, the link section 68 and the stand section 69. Consequently, the operating region section 66, the mount section 67, the link section 68 and the stand section 69 are set high in rigidity, whereas the first folding section 64 and the second folding section 65 which are not provided therein with any plate-like member are each in an easily foldable state. The plate-like members are formed, for example, of paper, resin or metal.

Figure 56:
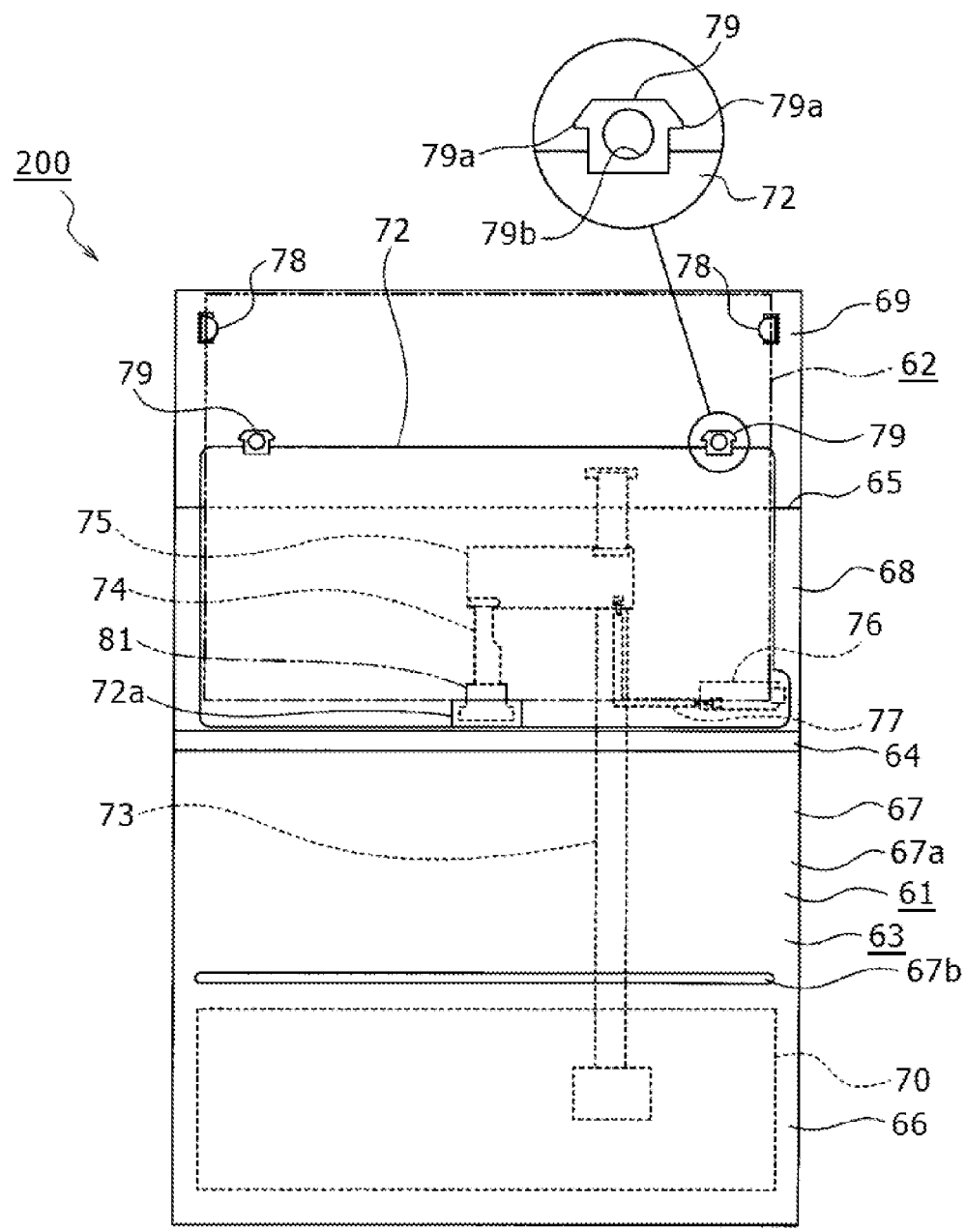
FIG. 56 is a schematic plan view of a cover.
Figure 57:
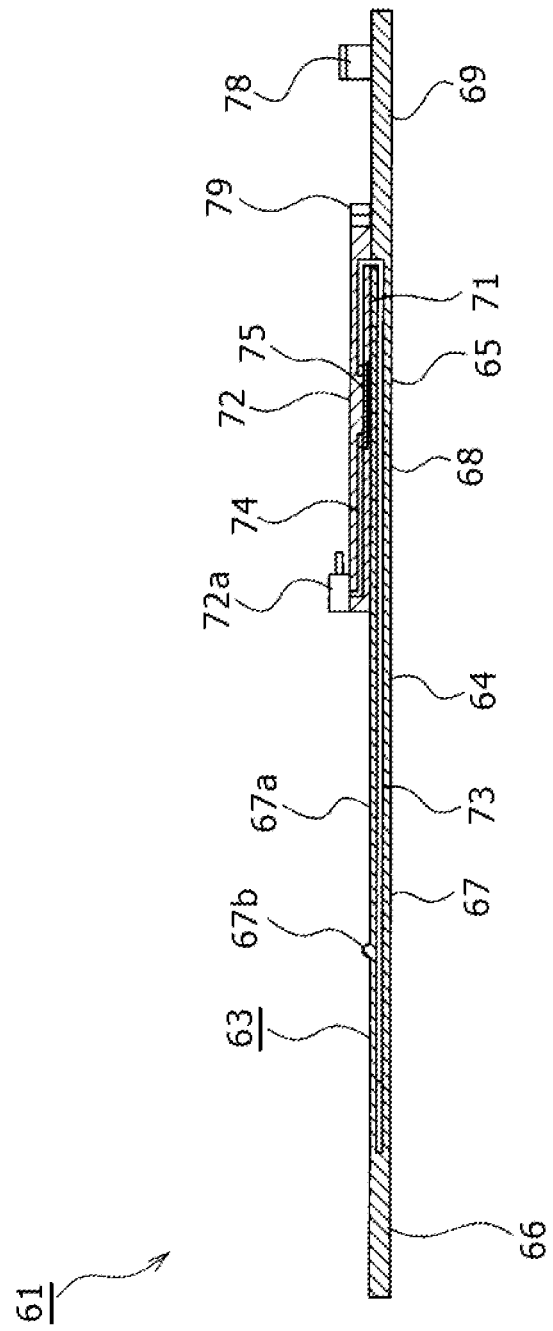
FIG. 57 is a schematic side view of the cover.

Inside the operating region section 66 is disposed a keyboard 70 which functions as an input operating unit (see FIGS. 56 and 57). The keyboard 70 is provided with a plurality of operating keys 70a, 70a, . . . (see FIG. 58). The operating keys 70a, 70a, . . . are arranged in the front-rear direction and the left-right direction, and can be operated by operations from the upper side of the operating region section 66. These keys are operated, for example, by an electrostatic system wherein a change in capacitance is detected or a pressure-sensing system wherein a change in pressure is detected or a contact system wherein key switches or membrane switches are operated by pressing operations.

Figure 52:
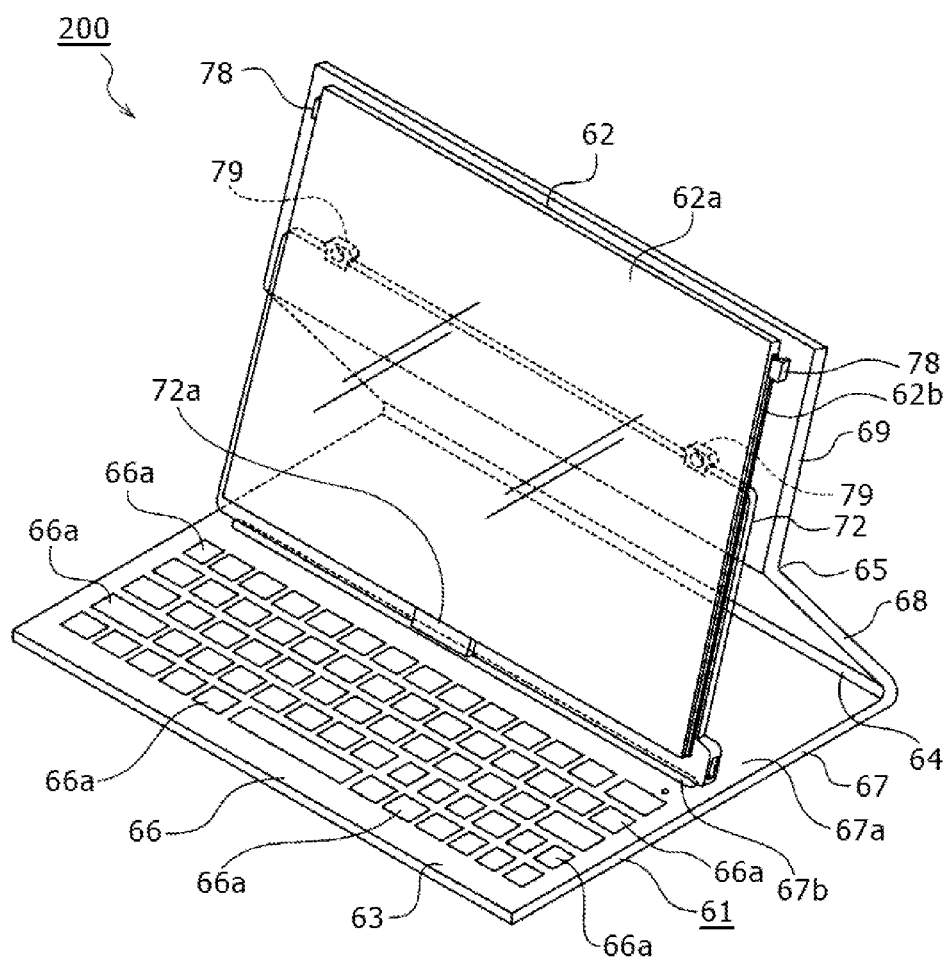
FIG. 52 shows, together with FIGS. 53 to 76, a best mode for carrying out a second embodiment of the present technology, and is a perspective view of an information processor in a condition where a protective cover is set in a stand mode.
Figure 58:
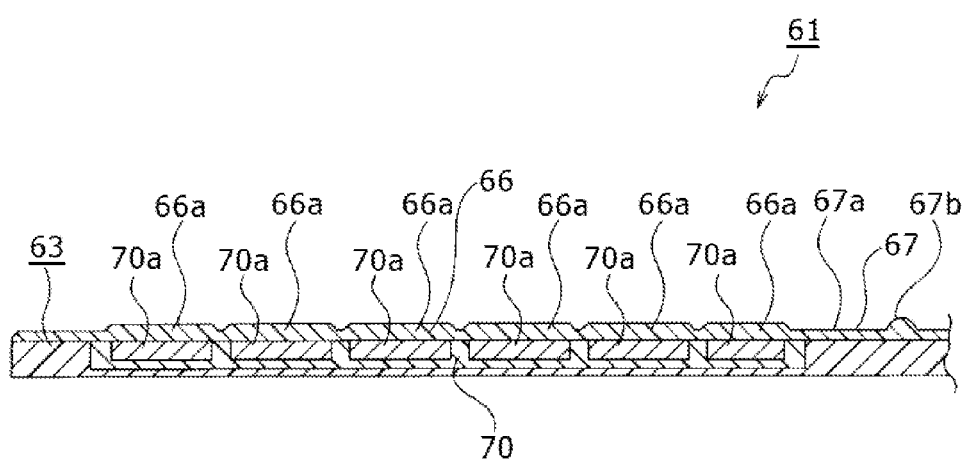
FIG. 58 is a schematic enlarged sectional view showing an operating projection formed in the cover.

The operating region section 66 is formed, on the upper side of areas where the operating keys 70a, 70a, . . . are disposed, with small-height operating projections 66a, 66a, . . . which are projecting upward (see FIGS. 52 and 58). With the operating projections 66a, 66a, . . . thus formed, the user can externally specify the positions of the operating keys 70a, 70a, . . . of the keyboard 70, which promises enhanced convenience in use.

Incidentally, the keyboard 70 may be detachable from the cover unit 63.

An upper surface of the mount section 67 is formed as a mount surface 67a (see FIGS. 52, 56 and 57). At an end portion on the operating region section 66 side of the mount surface 67a, there is provided a small-height mounting projection 67b which extends in the left-right direction.

On the upper surface (front surface) of the stand section 69, a back plate 72 formed in a horizontally elongated rectangular shape is fixed, for example, by an adhesive 71 or screws or the like (see FIGS. 52, 53, 56 and 57).

The back plate 72 is formed in a rectangular shape of which the horizontal length is slightly smaller than the horizontal length of the stand section 69 and the vertical length is greater than the vertical length of the link section 68. The vertical length of the back plate 72 is set to be smaller than the total vertical length of the stand section 69 and the link section 68. A rear end portion (upper end portion) of the back plate 72 is fixed to a front end portion (lower end portion) of the stand section 69 by the adhesive 71 or screws or the like. A connection terminal section 72a is provided at a left-right-directionally roughly central part of a front end portion (lower end portion) of the surface of the back plate 72.

The back plate 72 is formed with a first insertion hole 72b in a rear end portion (upper end portion) thereof, and with a second insertion hole 72c in a front end portion (lower end portion) thereof. The first insertion hole 72b is formed at a position deviated a little to the right side from a left-right-directionally central part, and the second insertion hole 72c is formed in a left-right-directionally central part.

Figure 59:
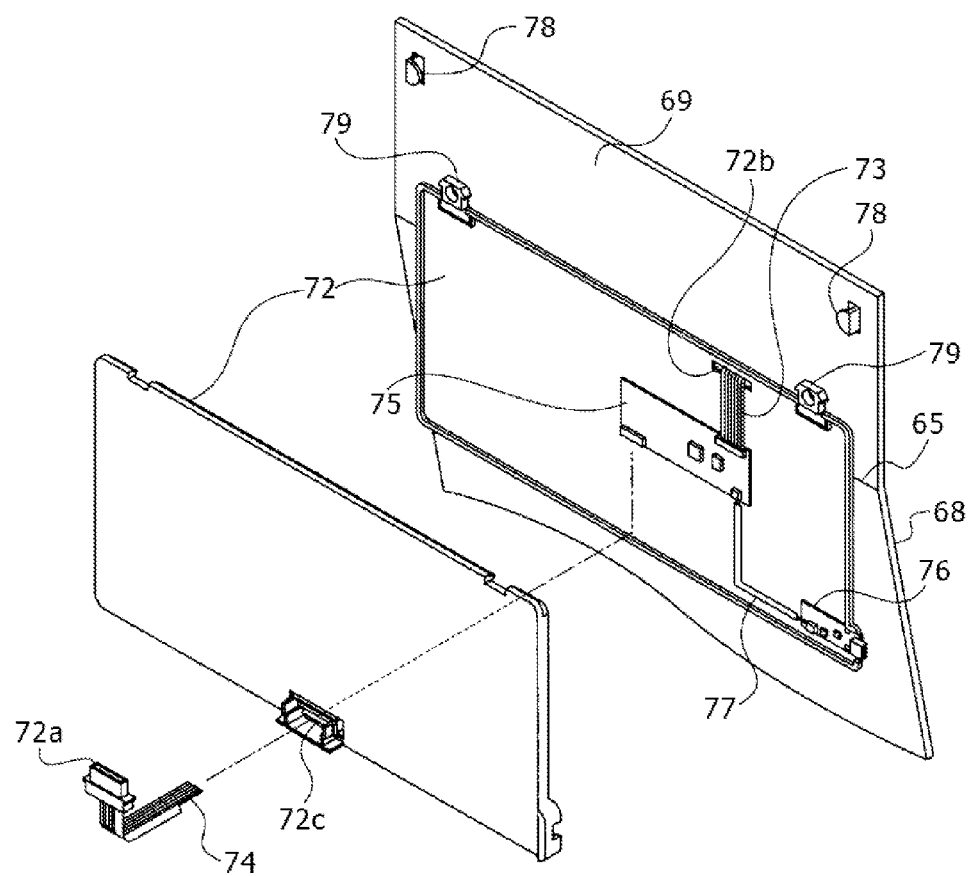
FIG. 59 is a conceptual diagram showing a back plate and the inside structure thereof.

A portion exclusive of a one-end-side portion of a wiring board 73 which functions as a wiring section is disposed inside the cover unit 63, and a portion exclusive of a one-end portion of a wiring board 74 which functions as a wiring section is disposed inside the back plate 72 (see FIGS. 56, 57 and 59).

As the wiring boards 73 and 74, for example, flexible printed wiring boards are used. As the wiring boards 73 and 74, those of other kinds may also be used insofar as they are bendable; for example, cables having conductors coated with a coating portion may be used.

Of the wiring board 73, a one-end-side portion is folded back relative to the other portion, is inserted in and passed through the first insertion hole 72b, and is disposed inside the back plate 72. Of the wiring board 74, an other-end-side portion is folded back relative to the other portion, is inserted in and passed through the second insertion hole 72c, and is protruded to the exterior of the back plate 72.

A main substrate 75 and a connector substrate 76 are disposed inside the back plate 72 (see FIG. 59).

The main substrate 75 is disposed in a substantially central part of the back plate 72. A one-end portion of the wiring board 73 is connected to a rear end portion (upper end portion) of the main substrate 75, and an other-end portion of the wiring board 74 is connected to a front end portion (lower end portion) of the main substrate 75. A one-end portion of the wiring board 74 is connected to a connector 72a.

An other-end portion of the wiring board 73 is connected to the keyboard 70, is disposed sequentially in the interiors of the operating region section 66, the mount section 67, the link section 68 and the stand section 69 in this order from the other end side, and a one-end-side portion thereof is folded back relative to the other portion and is inserted in and passed through the first insertion hole 72b. The wiring board 73 is disposed at a position deviated a little to the right side from a left-right-directionally central part of the protective cover 61.

Incidentally, while examples of the binding part of the protective cover 61 have been described above, the examples are not restrictive. For example, in the case of holding the protective cover 61 by a rubber band 43, a configuration may be adopted wherein a part of the rubber band is attached by inserting into a left-right-directionally central part of the first folding section 64, whereby the rubber band 43 is prevented from slipping off from the cover unit 63.

In this case, as above-mentioned, the first insertion hole 72b in the back plate 72 is formed at a position deviated a little to the right side from a left-right-directionally central part of the back plate 72, and the wiring board 73 is disposed at a position deviated a little to the right side of a left-right-directionally central part of the protective cover 61, whereby that part of the rubber band 43 which is attached to the back plate 72 and the wiring board 73 can be prevented from interfering with each other.

The connector substrate 76 is disposed at a right end portion of the inside of the back plate 72, and has a connector (not shown). The connector is, for example, a connector for charging. A charging terminal (not shown) is connected to the connector from a lateral side of the back plate 72.

The main substrate 75 and the connector substrate 76 are connected to each other through connection wires 77.

The stand section 69 of the cover unit 63 is provided at an upper surface (front surface) thereof with guide projections 78, 78 which are projected to the upper side (front side) and are spaced apart along the left-right direction (see FIGS. 52, 53, 55 and 59). The guide projections 78, 78 are formed from a material high in sliding properties, for example, a resin material. The guide projections 78, 78 are provided at a rear end portion (upper end portion) of the stand section 69, and are formed in gently curved surface shapes such that they approach each other as one goes along the projecting direction.

The back plate 72 is provided at a rear end portion (upper end portion) thereof with holding projections 79, 79 which are projected to the rear side (upper side) and are spaced apart along the left-right direction. The holding projection 79 is formed of an easily elastically deformable material, for example, a rubber material. The holding projection 79 is provided, at both left and right side surfaces of a rear end portion (upper end portion) thereof, with engaging projections 79a, 79a which are projected to lateral sides (outer sides). The holding projection 79 is formed therein with a deformation hole 79b, the presence of which promises easier elastic deformation of the engaging projections 79a, 79a toward each other.

The electronic apparatus 62 is formed, for example, in a thin, horizontally elongated rectangular shape, and is provided with a battery.

As the electronic apparatus 62, for example, a tablet terminal is used. A tablet terminal is a device such that input of various kinds of information, display of information, modifications of information displayed, etc. can be performed by operations made on a display surface of the device with a stylus pen or a finger. Examples of the tablet terminal include those of various forms such as electronic note, computer device, electronic dictionary, electronic calculator, game machine, telecommunication device, electronic book, etc.

The electronic apparatus 62 is operated by supplying electric power from the battery. Incidentally, a configuration may also be adopted wherein the electronic apparatus 62 is supplied with electric power from an external power supply (commercial power supply).

A front surface of the electronic apparatus 62 is formed as a display surface 62a. On the display surface 62a of the electronic apparatus 62, for example, not only characters or pictures or video pictures are displayed but also a virtual keyboard can be displayed; in addition, a character input column is displayed in which characters inputted through operations on the keyboard 70 or the virtual keyboard are displayed. The virtual keyboard displayed on the display surface 62a has a plurality of operation keys arranged in the same manner as the operating keys 70a, 70a, . . . of the keyboard 70.

Besides, the display surface 62a functions also as an operating surface through which the user can make a predetermined input operation with a stylus pen or a finger. The operating surface can be operated, for example, by an electrostatic system wherein a change in capacitance is detected or a pressure-sensing system wherein a change in pressure is detected.

Figure 60:
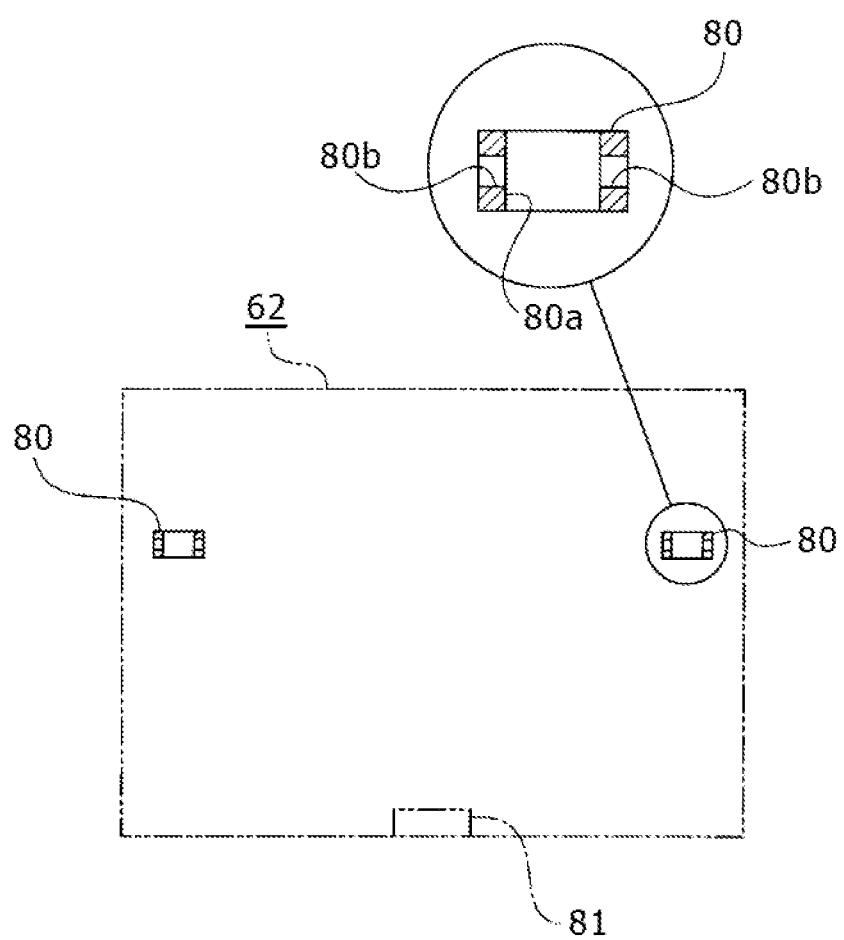
FIG. 60 shows a conceptual diagram of an electronic apparatus.

The electronic apparatus 62 is formed with guided grooves 62b, 62b in both left and right side surfaces, respectively. The electronic apparatus 62 is provided in a back surface thereof with held sections 80, 80 which are spaced apart along the left-right directions (see FIG. 60).

The electronic apparatus 62 is provided with a terminal section 81 at a lower end portion thereof. With the terminal section 81 connected to the connection terminal section 72a provided on the back plate 72, the electronic apparatus 62 is connected to the keyboard 70 through the wiring plates 73 and 74 and the main substrate 75.

The held section 80 is formed at least with an insertion hole 80a opening to the lower side, and engaging holes 80b, 80b penetrating the held section 80 in the left-right direction. The engaging holes 80b, 80b are formed at positions spaced apart in the left-right direction, and communicate with each other through the insertion hole 80a located between them.

Figure 61:
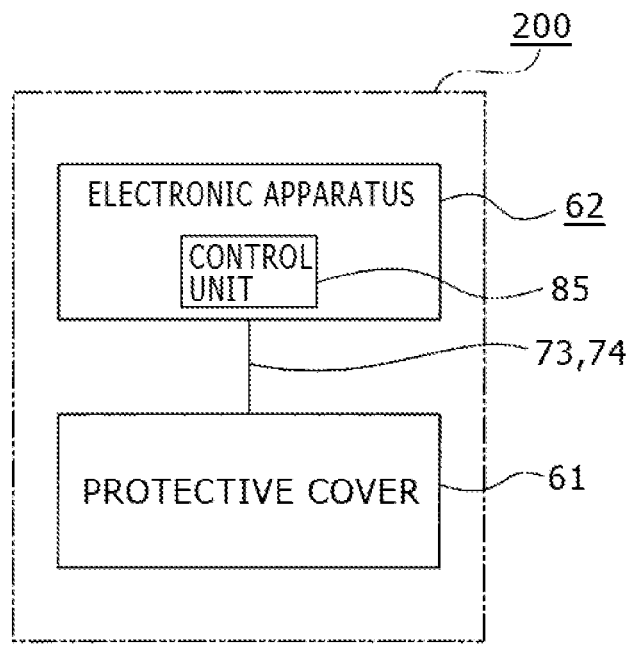
FIG. 61 is a block diagram showing a configuration of the information processor.

In the electronic apparatus 62 is incorporated a control unit 82 such as a CPU (central processing unit) which controls the whole part of the information processor 200 (see FIG. 61). Processing of information inputted according to operations on the keyboard 70 and the virtual keyboard, display of images on the display surface 62a according to information inputted, etc. are performed by the control unit 82.

Figure 62:
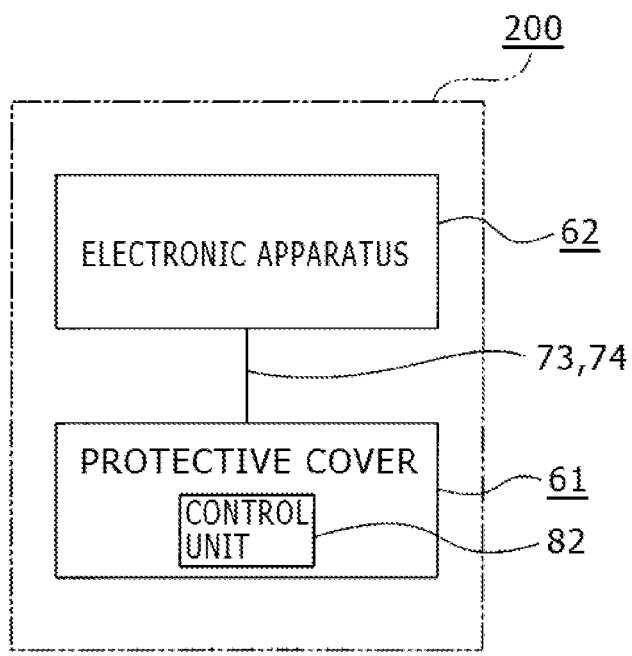
FIG. 62 is a block diagram showing another configuration of the information processor.

Incidentally, while an example wherein the control unit 82 is incorporated in the electronic apparatus 62 has been described above, a configuration may also be adopted wherein the control unit 82 is incorporated in the protective cover 61 (see FIG. 62).

[Mounting of Electronic Apparatus to Protective Cover]

The electronic apparatus 62 is mounted to the protective cover 61 in the following manner (see FIGS. 63 to 65).

Figure 63:
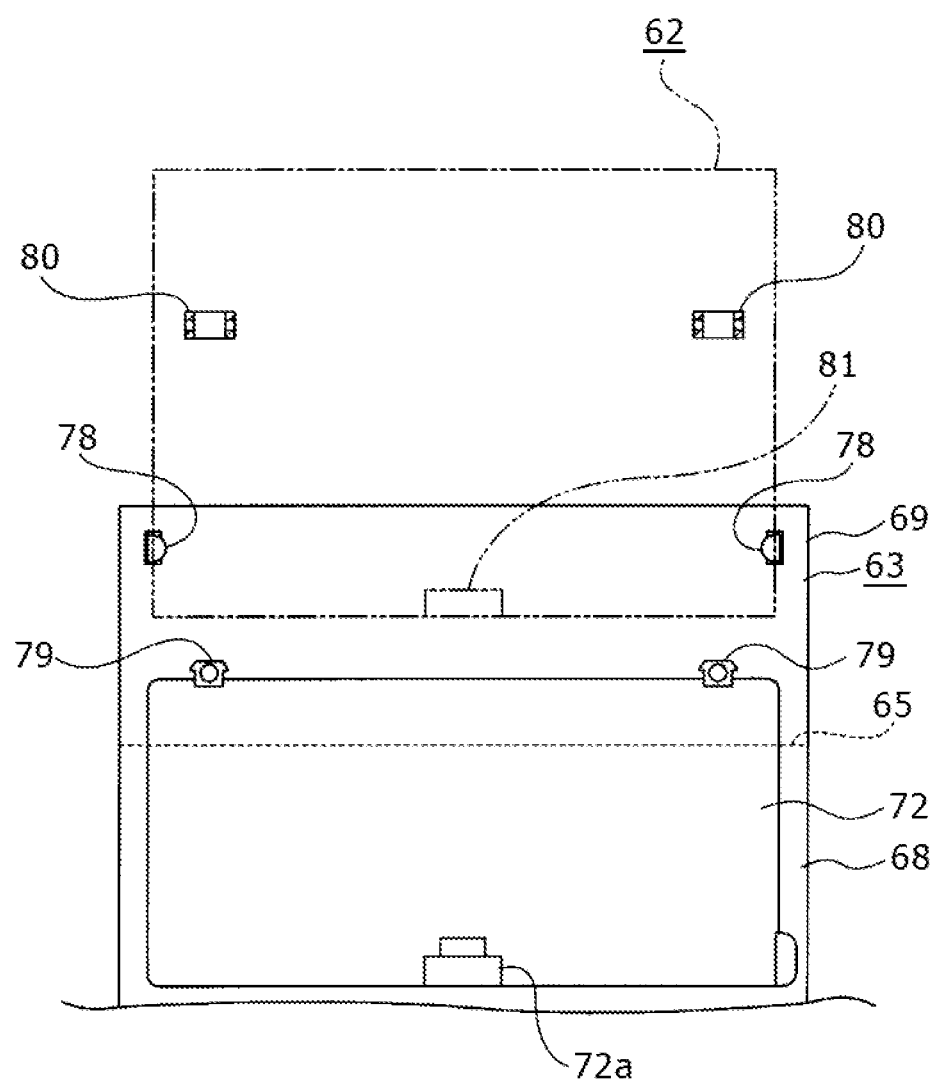
FIG. 63 shows, together with FIGS. 64 and 65, a procedure for mounting the electronic apparatus to the back plate, and is a conceptual diagram showing a condition where the electronic apparatus is being guided by guide projections.

First, the electronic apparatus 62 is inserted from the rear side (upper side) into the space between the guide projections 78, 78 provided on the cover unit 62 (see FIG. 63). When the electronic apparatus 62 is inserted between the guide projections 78, 78, the guided grooves 62b, 62b formed respectively in the left and right side surfaces of the electronic apparatus 62 are guided by the guide projections 78, 78, while the electronic apparatus 62 is slid relative to the cover unit 63 and the back plate 72.

Figure 64:
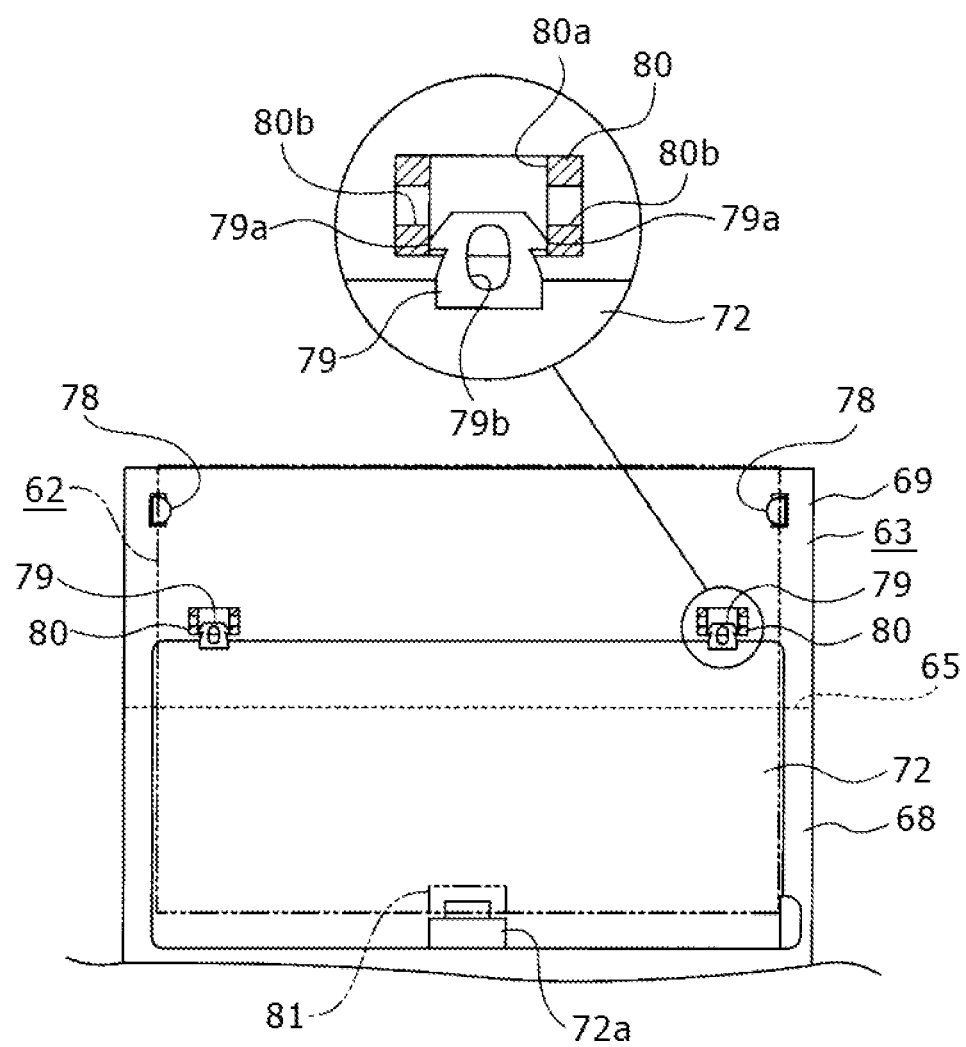
FIG. 64 is a conceptual diagram showing a condition immediately before the electronic apparatus is held by holding projections.

Next, with the electronic apparatus 62 slid, the holding projections 79, 79 provided on the back plate 72 are inserted correspondingly into the insertion holes 80a, 80a of the held sections 80, 80 (see FIG. 64). Upon insertion of the holding projections 79, 79 into the insertion holes 80a, 80a, the engaging projections 79a, 79a, . . . of the holding projections 79, 79 are slid on the inner surfaces of the guide projections 78, 78, and the engaging projections 79a, 79a, . . . are elastically deformed in such directions as to approach each other.

Figure 65:
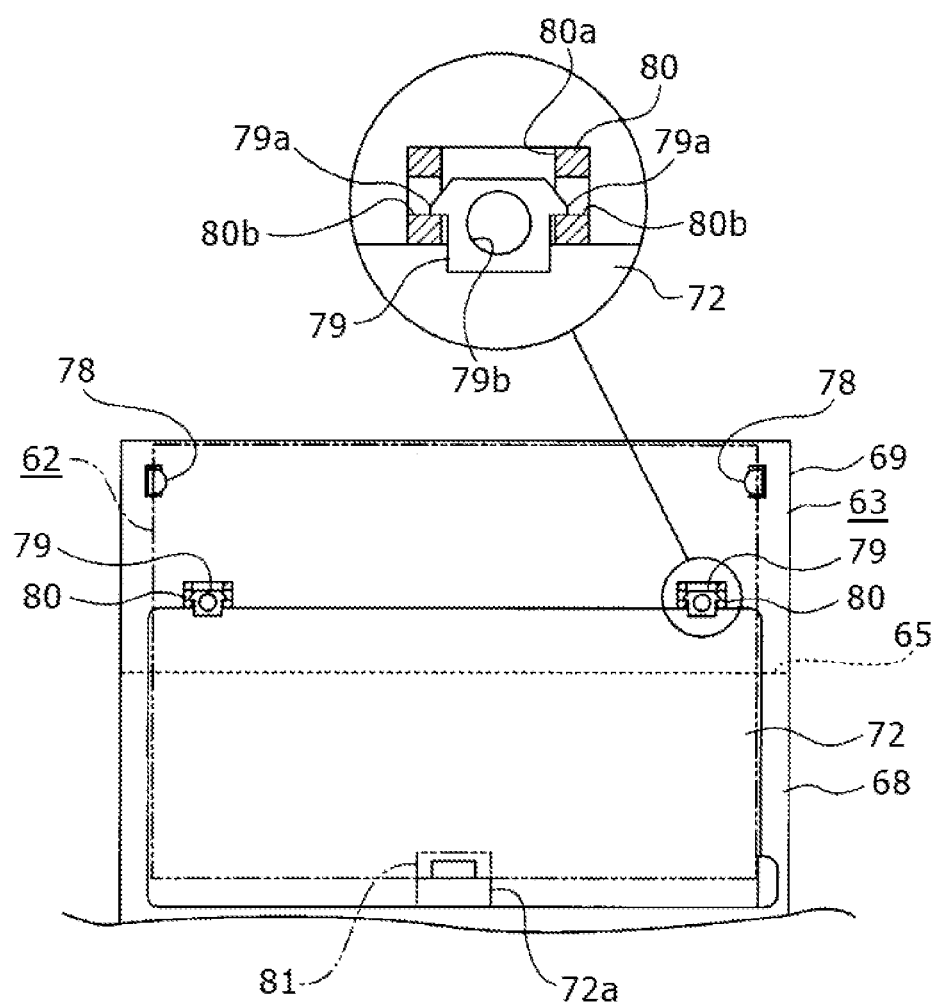
FIG. 65 is a conceptual diagram showing a condition where the electronic apparatus has been mounted to the back plate while being held by the holding projections.

With the electronic apparatus 62 slid further on, the engaging projections 79a, 79a, . . . are located on lateral sides of the engaging holes 80b, 80b, . . . , correspondingly (see FIG. 65). With the engaging projections 79a, 79a, . . . thus located on the lateral sides of the engaging holes 80b, 80b, . . . , correspondingly, the holding projections 79, 79 are elastically restored into their original shape, whereby the engaging projections 79a, 79a, . . . are inserted into and engaged with the engaging holes 80b, 80b, correspondingly. In this instance, simultaneously, the terminal section 81 of the electronic apparatus 62 is connected to the connection terminal section 72a provided on the back plate 72. With the engaging projections 79a, 79a, . . . engaged respectively with the engaging holes 80b, 80b, . . . and with the terminal section 81 connected to the connection terminal section 72a as above-mentioned, the electronic apparatus 62 is mounted to the protective cover 61.

In the state wherein the electronic apparatus 62 is mounted to the protective cover 61 as above-mentioned, lifting-up of the electronic apparatus 62 relative to the protective cover 61 is prevented by the guide projections 78, 78, and movements of the electronic apparatus 62 in directions orthogonal to the thickness direction are restrained by the holding projections 79, 79.

With the cover unit 63 thus provided with the guide projections 78, 78 for guiding the electronic apparatus 62, the terminal section 81 is connected to the connection terminal section 72a assuredly, and the electronic apparatus 62 can be mounted to the back plate 72 in a stable state.

Besides, with the back plate 72 provided with the holding projections 79, 79, the electronic apparatus 62 in the state of being mounted to the back plate 72 is prevented from slipping off relative to the back plate 72, and the electronic apparatus 62 can be mounted to the back plate 72 in a stabler state.

[Modes of Protective Cover]

The protective cover 61 is set into a stand mode (see FIGS. 52 and 53) wherein the protective cover 61 is folded as described below to be used as a stand for the electronic apparatus 62 and a cover mode (see FIGS. 54 and 55) wherein the protective cover 61 houses and covers the electronic apparatus 62.

In addition, the protective cover 61 can be set also into a laid-flat mode (see FIG. 66) wherein the protective cover 61 cannot be folded as described below and an inside-out mode (see FIG. 67) wherein the protective cover 61 is folded back to the opposite side from the cover mode.

The stand mode, the laid-flat mode and the inside-out mode are each set as a use state wherein the electronic apparatus 62 is used, whereas the cover mode is set as a non-use state wherein the electronic apparatus 62 is stored (housed).

Incidentally, the protective cover 1 in the first embodiment described above, also, can be set into the laid-flat mode and the inside-out mode, in addition to the stand mode and the cover mode.

Figure 53:
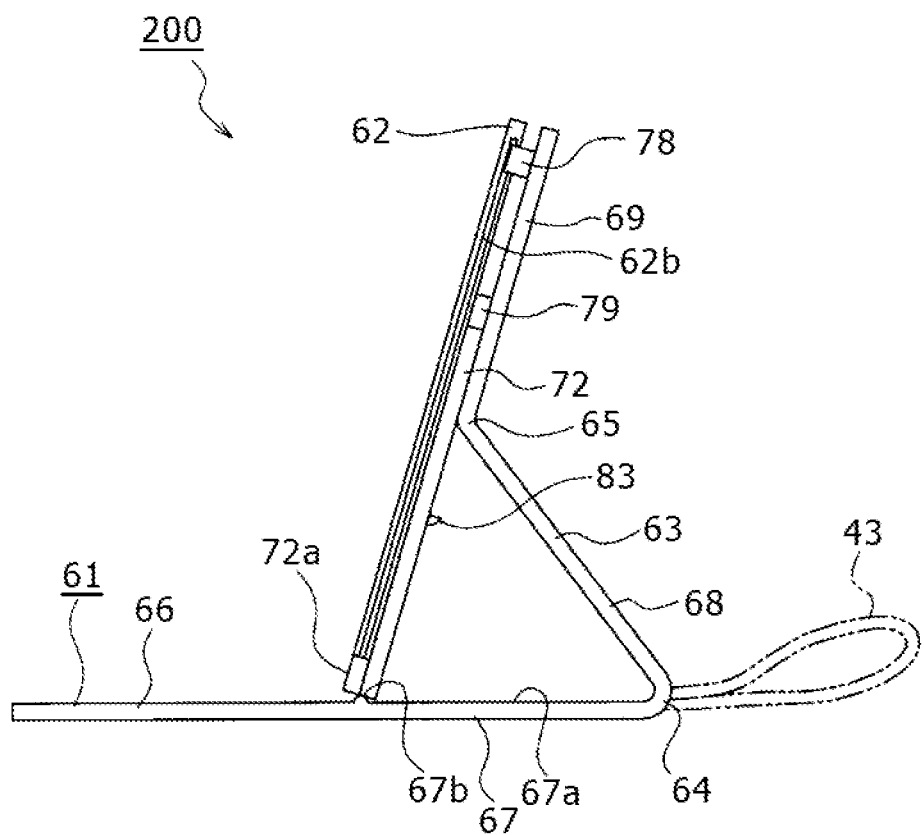
FIG. 53 is a side view of the information processor in the condition where the protective cover is set in the stand mode.

The stand mode is set by folding the link section at the first folding section 64 relative to the mount section 67 and folding the stand section 69 at the second folding section 65 relative to the link section 68 (see FIGS. 52 and 53).

The link section 68 is folded at an angle of not less than 90°, for example, 100 to 150°, relative to the mount section 67, in the direction for approaching the keyboard 70. The stand section 69 is folded at an angle of less than 90°, for example, 10 to 60°, relative to the link section 68, in the direction for coming away from the keyboard 70.

In the stand mode wherein the sections are folded in the this manner, the electronic apparatus 62 is set to stand against the stand section 69 of the protective cover 61, with the back plate 72 interposed therebetween. In the stand mode in which the electronic apparatus 62 stands against the stand section 69, the electronic apparatus 62 is borne by the back plate 72 in the state wherein the display surface 62*a* is inclined to be obliquely oriented to an upper front side; in this instance, a lower end portion of the back plate 72 is mounted on the mount section 67 in the state of making contact with the mount surface 67*a*. The lower surface of the electronic apparatus 62 is contacted or approached by the mount surface 67*a*.

In this case, the lower end portion of the back plate 72 is set in the state of making contact with the mounting projection 67*b*, whereby the back plate 72 is prevented from slipping off to the operating region section 66 side. Accordingly, a stably held state of the electronic apparatus 62 can be secured.

Besides, as above-mentioned, the cover section 63 is formed from an elastomer, which is a material having a high coefficient of friction. Therefore, in the condition where the lower end portion of the back plate 72 is in contact with the mount surface 67*a*, the back plate 72 is not liable to slip off relative to the mount surface 67*a*. Accordingly, the electronic apparatus 62 can be held in a stable state, without providing any part for restraining the position of the electronic apparatus 62.

In the stand mode, it is possible to perform various operations on the keyboard 70 and the electronic apparatus 62.

Figure 54:
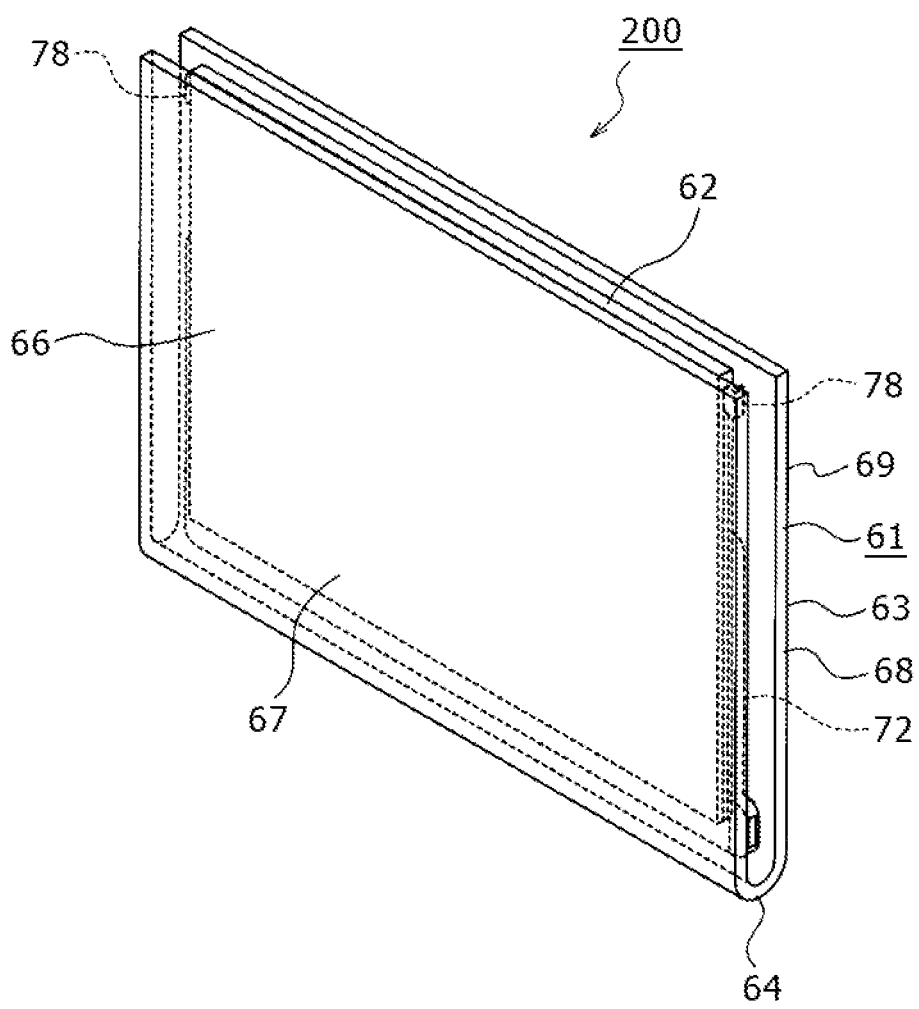
FIG. 54 is a perspective view of the information processor in a condition where the protective cover is set in a cover mode.
Figure 55:
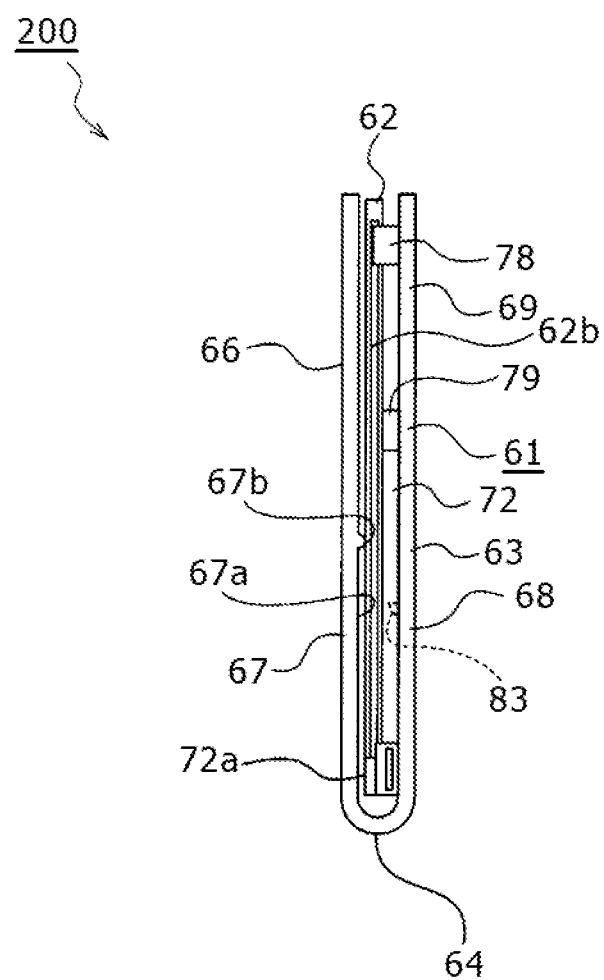
FIG. 55 is a side view of the information processor in the condition where the protective cover is set in the cover mode.

On the other hand, the cover mode is set by folding the link section 68 at the first folding section 64 in relation to the mount section 67, in the condition wherein the display surface 62*a* of the electronic apparatus 62 is mounted on and in contact with the operating region section 66 and the mount section 67 (see FIGS. 54 and 55). The link section 68 is folded at an angle of about 180° relative to the mount section 67 in the direction for approaching the keyboard 70.

Such a cover mode is held, for example, by the rubber band 43, whereby the electronic apparatus 62 is stored inside the protective cover 61 in the state of being enveloped with the protective cover 61.

In the cover mode, the information processor 200 can be carried and transported in the state wherein the electronic apparatus 62 is protected by the protective cover 61.

Figure 66:
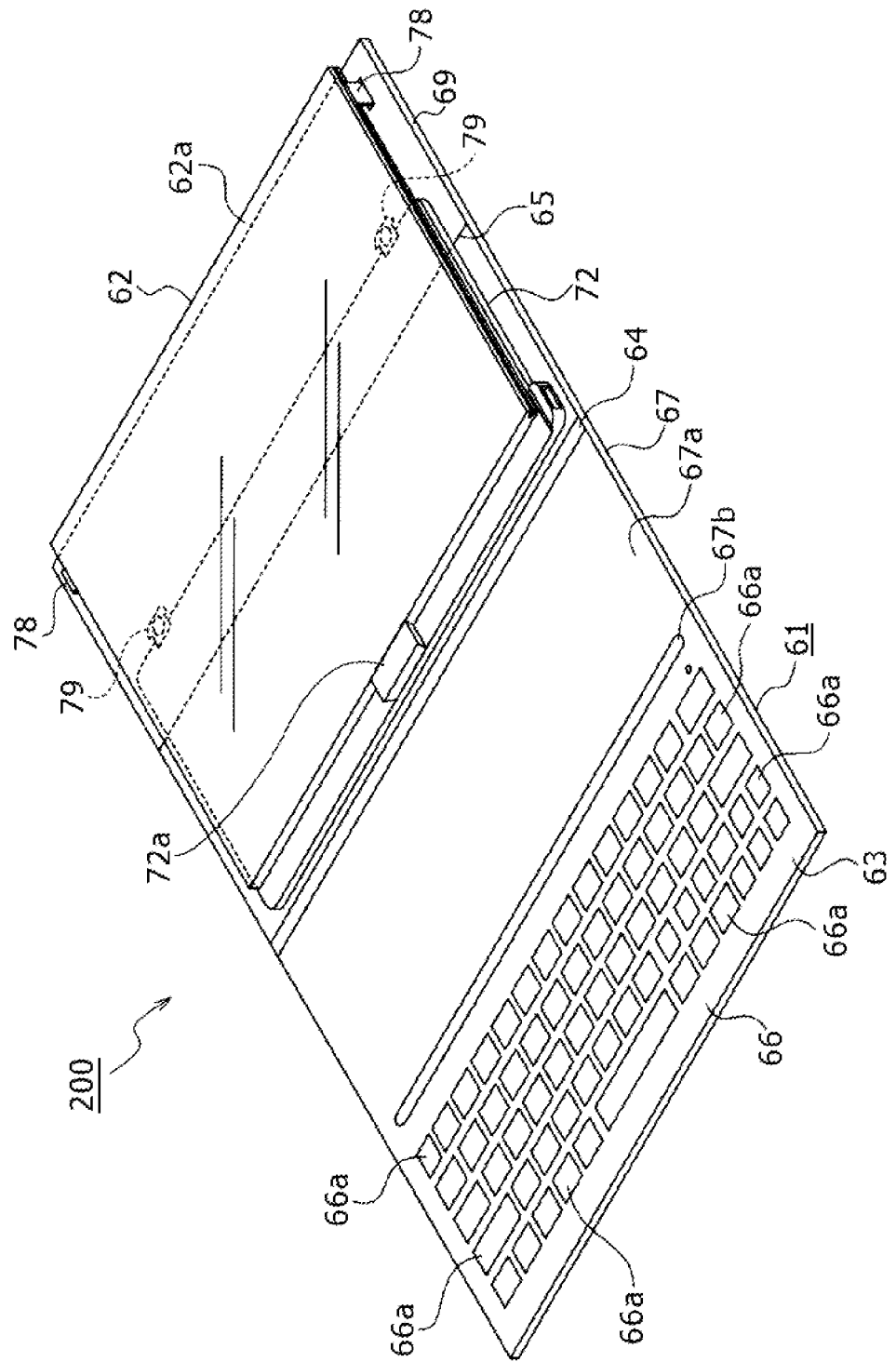
FIG. 66 is a perspective view of the information processor, showing a condition where a protective cover is set in a laid-flat mode.

The laid-flat mode is set by putting the protective cover 61 into a flat plate-like form, without folding the first folding section 64 or the second folding section 65 (see FIG. 66).

In the laid-flat mode, it is possible to perform various operations on the keyboard 70 and the electronic apparatus 62.

Figure 67:
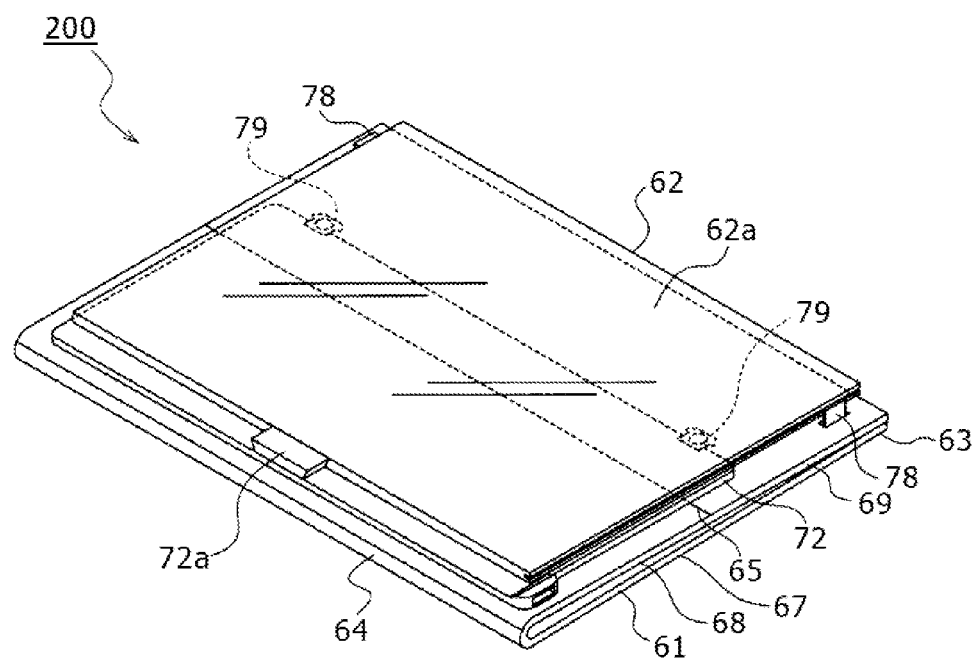
FIG. 67 is a perspective view of the information processor, showing a condition where the protective cover is set in an inside-out mode.

The inside-out mode is set by folding the link section 68 at the first folding section 64 relative to the mount section 67 to the side opposite to that at the time of setting the cover mode (see FIG. 67). The link section 68 is folded at an angle of about 180° relative to the mount section 67.

In the inside-out mode, it is possible to perform various operations on the electronic apparatus 62, and to perform operations on the virtual keyboard displayed on the display surface 62*a* of the electronic apparatus 62.

[Sizes of Operating Projections and Operating Keys]

Figure 68:
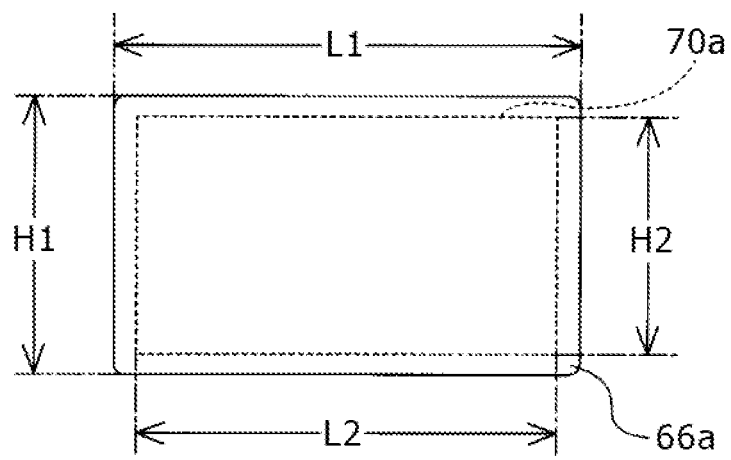
FIG. 68 is a conceptual diagram showing an operating projection and a corresponding operating key in comparison in size (dimensions)

Now, the sizes of the operating projections 66*a*, 66*a*, . . . provided in the cover unit 63 and the operating keys 70*a*, 70*a*, . . . provided in the keyboard 70 will be described below (see FIG. 68).

The operating keys 70*a*, 70*a*, . . . are disposed on the inner surface side of the operating projections 66*a*, 66*a*, . . . , correspondingly, and they are formed in substantially rectangular shapes analogous to each other. The operating projection 66*a* and the corresponding operating key 70*a* are laid on each other in the thickness direction of the cover unit 63, and the operating key 70*a* is located on the inside of the operating projection 66*a*. The operating key 70*a* is a detection region for detecting an operation performed by the user, upon the operation.

In regard of the operating projection 66*a* and the corresponding operating key 70*a*, relations of H1>H2 and L1>L2 are set, where H1 and L1 are dimensions in the front-rear direction and the left-right direction of the operating projection 66*a*, and H2 and L2 are the dimensions in the front-rear direction and the left-right direction of the operating key 70*a*. Specifically, H2 is set to be, for example, 80 to 90% based on H1, and L2 is set to be, for example, 80 to 90% based on L1.

Where the dimensions of the operating key 70*a* in the front-rear direction and the left-right direction are set to be a little smaller than those of the corresponding operating projection 66*a*, the size of the operating key 70*a* is sufficiently large in relation to the size of the operating projection 66*a*. This lowers the possibility of a misoperation in which detection of an operation on the operating key 70*a* fails. Consequently, good operability can be secured.

In general, the operating key 70*a* is formed from a high-sensitivity material, such as silver. Since the size of the operating key 70*a* is set to a minimum necessary size, the material cost can be reduced accordingly, which promises a reduction in manufacturing cost.

Furthermore, since the operating projection 66*a* and the corresponding operating key 70*a* are analogous in shape, the rate of occurrence of misoperation would not vary with the position of operation on the operating projection 66*a*. Consequently, a stable operating condition can be secured.

[Operation of Information Processor]

In the information processor 200 configured as above, when the operating keys 70a, 70a, . . . of the keyboard are operated by operations from the upper side of the operating region section 66, information signals according to the operations are outputted through the wiring boards 73 and 74 and the main substrate 75 to the electronic apparatus 62. The information signals thus outputted are subjected to predetermined processing under control by the control unit 82, and operations such as displaying of images on the display surface 62a of the electronic apparatus 62 are carried out.

As above-mentioned, in the information processor 200, operations according to the operations on the keyboard 70 are performed not through wireless communication but through wired communication based on the wiring boards 73 and 74, etc.

Figure 69:
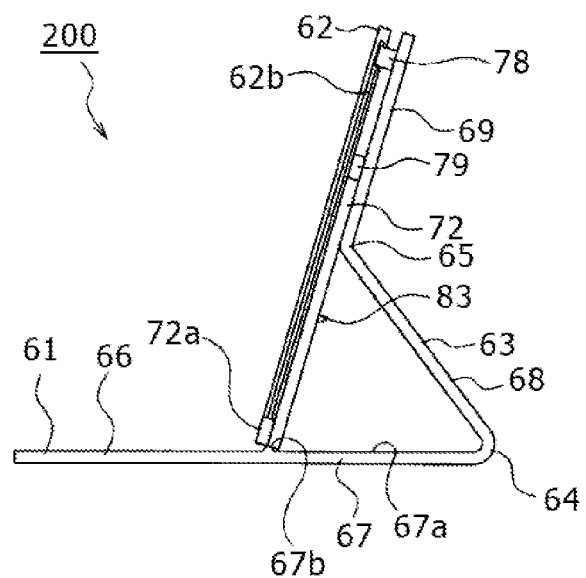
FIG. 69 is a schematic side view showing a condition where a detection switch is OFF.
Figure 70:
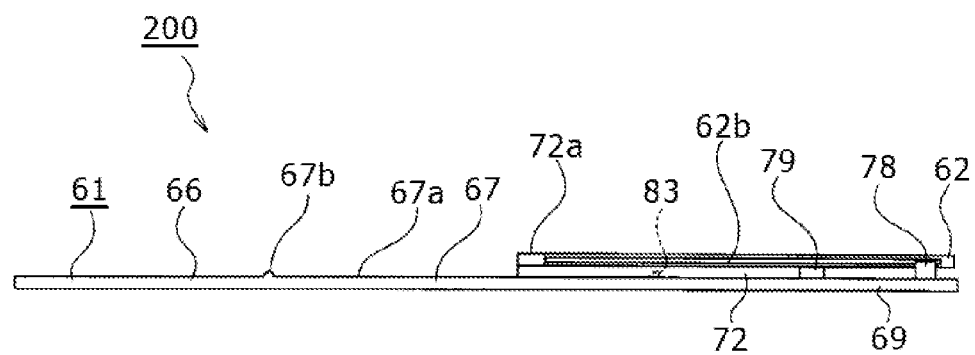

The information processor 200 is provided with a detection switch 83 on the back side of the back plate 72 (see FIGS. 69 and 70). According to the ON/OFF state of the detection switch 83, the mode in which the electronic apparatus 62 (the protective cover 61) is being set is distinguished based on the state of the back plate 72, in the following manner.

In the stand mode, of the various modes set as use modes of the electronic apparatus 62, the detection switch 83 is not in contact with the protective cover 61 and, hence, the detection switch 83 is in OFF state (see FIG. 69). Accordingly, it is determined by the control unit 82 that the current mode is the stand mode.

On the other hand, in the laid-flat mode or the inside-out mode, of the various modes set as use modes of the electronic apparatus 62, the detection switch 83 is in contact with the protective cover 61 and, hence, the detection switch is in ON state (see FIG. 70). Accordingly, it is determined by the control unit 82 that the current mode is the laid-flat mode or the inside-out mode.

In the information processor 200, when it is determined by the control unit 82 based on the state of the detection switch 83 that the current mode is the laid-flat mode or the inside-out mode, a state is established in which inputs to the keyboard 70 are impossible. When it is determined by the control unit 82 based on the state of the detection switch 83 that the current mode is the stand mode, on the other hand, a state is established in which inputs to the keyboard 70 are possible. Details of these controls will be described later.

[Others]

In the information processor 200 in the second embodiment as above-described, also, it is possible, like in the information processor 100 in the first embodiment, to apply the first to fourth examples of the position restraining section (FIGS. 10 to 17), the first to ninth examples of the binding parts (FIGS. 18 to 32), the various modifications of the protective cover (FIGS. 33 to 35), the various modifications of the electronic apparatus and the back plate (FIGS. 36 to 41), and the various control operations (FIGS. 42 to 51).

[Operating States and Control Operations in Information Processor]

Now, various operating states set in the information processor 200 and control operations in the information processor 200 will be described below (see FIGS. 71 to 76).

Incidentally, the various operating states and control operations described below are applicable also in the information processor 100 in the first embodiment.

<Various Operating States>

In the information processor 200, States 1 to 8 as described below are set as operating states in various modes which are set as use states. State 1, State 2, State 5 and State 6 are states in the laid-flat mode or inside-out mode, whereas State 3, State 4, State 7 and State 8 are states in the stand mode.

States 1 to 8 are each defined by three elements. Specifically, a first element is the displayed/non-displayed state of the virtual keyboard on the electronic apparatus 62, a second element is the possible/impossible state of inputs to the keyboard 70, and a third element is the effective/nullified state of inputs to the keyboard 70 based on a forcible input key which will be described later.

The displayed/non-displayed state of the virtual keyboard on the electronic apparatus 62, which constitutes the first element, is realized by a user's operation on the electronic apparatus 62. Specifically, setting of the displayed/non-displayed state of the virtual keyboard on the display surface 62a of the electronic apparatus 62 is effected by predetermined operations made on the electronic apparatus 62.

The possible/impossible state of inputs to the keyboard 70, which constitutes the second element, is realized by determination that the current mode is one of the laid-flat mode and the inside-out mode or the stand mode, the determination being made by the control unit 82 based on the state of the detection switch 83 provided on the back side of the back plate 72 as above-described. When it is determined that the current mode is the laid-flat mode or the inside-out mode, inputs to the keyboard 70 are made impossible. When it is determined that the current mode is the stand mode, inputs to the keyboard 70 are made possible.

The effective/nullified state of inputs to the keyboard 70, which constitutes the third element, is realized by a user's operation of the forcible input key. As the forcible input key, for example, two sets are set. For instance, simultaneous operation of a function key (Fn) and an enter key (Enter) of the keyboard 70 is set as a first forcible input key, and simultaneous operation of a function key (Fn) and a tab key (Tab) of the keyboard 70 is set as a second forcible input key. When the first forcible input key is operated, inputs to the keyboard 70 are made effective and the virtual keyboard is non-displayed on the display surface 62a of the electronic apparatus 62, irrespectively of the ON/OFF state of the detection switch 83. When the second forcible input key is operated, on the other hand, inputs to the keyboard 70 are nullified and the virtual keyboard is displayed on the display surface 62a of the electronic apparatus 62.

State 1, State 3, State 5 or State 7 is a state in which the displayed/non-displayed state of the virtual keyboard as the first element is the displayed state, whereas State 2, State 4, State 6 or State 8 is a state in which the displayed/non-displayed state of the virtual keyboard as the first element is the non-displayed state (see FIGS. 71 to 75).

State 1, State 2, State 5 or State 6 is a state in which the possible/impossible state of inputs to the keyboard as the second element is the impossible state, whereas State 3, State 4, State 7 or State 8 is a state in which the possible/impossible state of inputs to the keyboard 70 as the second element is the possible state.

State 3, State 4, State 5 or State 6 is a state in which the effective/nullified state of inputs to the keyboard 70 as the third element is the effective state because of an operation of the first forcible input key, whereas State 1, State 2, State 7 or State 8 is a state in which the effective/nullified state of inputs to the keyboard 70 as the third element is the nullified state because of an operation of the second forcible input key.

State 1 is a state wherein the virtual keyboard is displayed by a user's operation, inputs to the keyboard 70 are made impossible by the detection switch 83, and inputs to the keyboard 70 are nullified by the forcible input key. In State 1, therefore, inputs to the virtual keyboard can be made, but inputs to the keyboard 70 cannot be made.

State 2 is a state wherein the virtual keyboard is not displayed, inputs to the keyboard 70 are made impossible by the detection switch 83, and inputs to the keyboard 70 are nullified by the forcible input key. In State 2, therefore, inputs to the virtual keyboard cannot be made, and inputs to the keyboard 70 cannot be made.

State 3 is a state wherein the virtual keyboard is displayed by a user's operation, inputs to the keyboard 70 are made possible by the detection switch 83, and inputs to the keyboard 70 are made effective by the forcible input key. In State 3, therefore, inputs to the virtual keyboard can be made, and inputs to the keyboard 70 can also be made.

State 4 is a state wherein the virtual keyboard is not displayed, inputs to the keyboard 70 are made possible by the detection switch 83, and inputs to the keyboard 70 are made effective by the forcible input key. In State 4, therefore, inputs to the virtual keyboard cannot be made, but inputs to the keyboard 70 can be made.

State 5 is a state wherein the virtual keyboard is displayed by a user's operation, inputs to the keyboard 70 is made impossible by the detection switch 83, and inputs to the keyboard 70 are made effective by the forcible input key. In State 5, therefore, inputs to the virtual keyboard can be made. In addition, since inputs to the keyboard 70 are forcibly made effective by the forcible input key although inputs to the keyboard 70 are made impossible by the detection switch 83, inputs to the keyboard 70 can also be made.

State 6 is a state wherein the virtual keyboard is not displayed, inputs to the keyboard 70 are made impossible by the detection switch 83, and inputs to the keyboard 70 are made effective by the forcible input key. In State 6, therefore, inputs to the virtual keyboard cannot be made. Besides, since inputs to the keyboard 70 is forcibly made effective by the forcible input key although inputs to the keyboard 70 are made impossible by the detection switch 83, inputs to the keyboard 70 can be made.

State 7 is a state wherein the virtual keyboard is displayed by a user's operation, inputs to the keyboard 70 are made possible by the detection switch 83, and inputs to the keyboard 70 are nullified by the forcible input key. In State 7, therefore, inputs to the virtual keyboard can be made. In addition, since inputs to the keyboard 70 are nullified by the forcible input key although inputs to the keyboard 70 are made possible by the detection switch 83, inputs to the keyboard 70 cannot be made.

State 8 is a state wherein the virtual keyboard is not displayed, inputs to the keyboard 70 are made possible by the detection switch 83, and inputs to the keyboard 70 are nullified by the forcible input key. In State 8, therefore, inputs to the virtual keyboard cannot be made. Besides, since inputs to the keyboard 70 are nullified by the forcible input key although inputs to the keyboard 70 are made possible by the detection switch 83, inputs to the keyboard 70 also cannot be made.

<Transitions Between Various States>

Now, transitions between the above-mentioned various states will be described below (see FIGS. 71 to 75).

First of all, transition between states when the first forcible input key is operated by the user will be described (see FIG. 71).

When the first forcible input key is operated in State 1, State 2 or State 5, a signal for making effective the inputs to the keyboard 70 is outputted, and a signal for non-displaying the virtual keyboard is outputted, whereby transition to State 6 is always made (see FIG. 71). Incidentally, when the first forcible input key is operated by the user in State 6, State 6 is maintained as it is.

When the first forcible input key is operated in State 3, State 7 or State 8, a signal for making effective the inputs to the keyboard 70 is outputted, and a signal for non-displaying the virtual keyboard is outputted, whereby transition to State 4 is always made. Incidentally, when the first forcible input key is operated in State 4, State 4 is maintained as it is.

Figure 72:
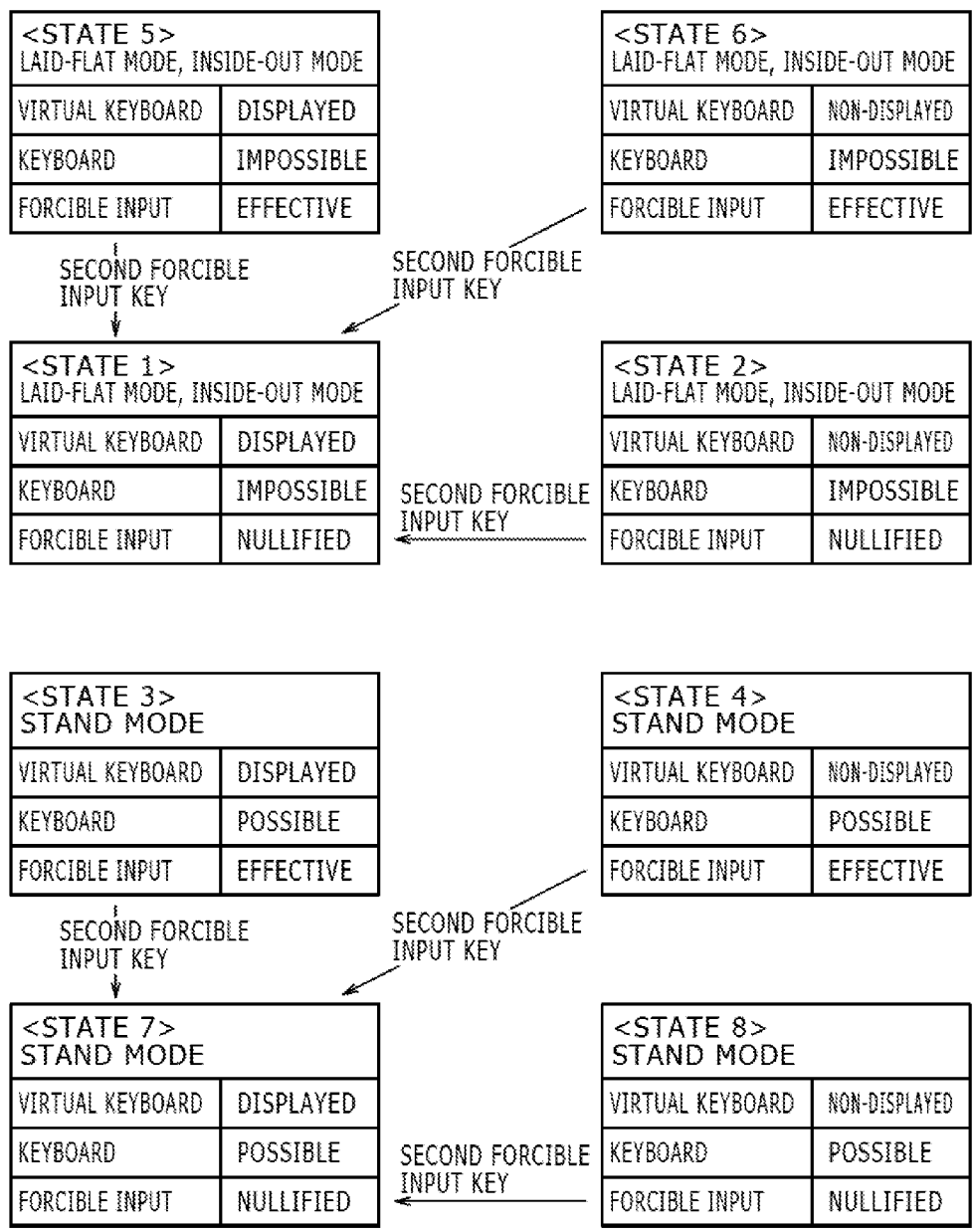
FIG. 72 shows transitions in state when a second forcible input key is operated by the user.

Next, transition between states when the second forcible input key is operated by the user will be described (see FIG. 72).

When the second forcible input key is operated in State 2, State 5 or State 6, a signal for nullifying the inputs to the keyboard 70 is outputted, and a signal for displaying the virtual keyboard is outputted, whereby transition to State 1 is always made. Incidentally, when the second forcible input key is operated in State 1, State 1 is maintained as it is.

When the second forcible input key is operated in State 3, State 4 or State 8, a signal for nullifying the inputs to the keyboard 70 is outputted, and a signal for displaying the virtual keyboard is outputted, whereby transition to State 7 is always made. Incidentally, when the second forcible input key is operated in State 7, State 7 is maintained as it is.

Now, transition between states when an operation for setting the displayed/non-displayed state of the virtual keyboard on the electronic apparatus 62 is performed by the user will be described below (see FIG. 73).

When an operation of setting the virtual keyboard to be non-displayed is performed by the user in State 1, a signal for non-displaying the virtual keyboard is outputted, whereby transition to State 2 is made. On the contrary, when an operation of setting the virtual keyboard to be displayed is performed by the user in State 2, a signal for displaying the virtual keyboard is outputted, whereby transition to State 1 is made.

When an operation of setting the virtual keyboard to be non-displayed is performed by the user in State 3, a signal for non-displaying the virtual keyboard is outputted, whereby transition to State 4 is made. On the contrary, when an operation of setting the virtual keyboard to be displayed is performed by the user in State 4, a signal for displaying the virtual keyboard is outputted, whereby transition to State 3 is made.

When an operation of setting the virtual keyboard to be non-displayed is performed by the user in State 5, a signal for non-displaying the virtual keyboard is outputted, whereby transition to State 6 is made. On the contrary, when an operation of setting the virtual keyboard to be displayed is performed by the user in State 6, a signal for displaying the virtual keyboard is outputted, whereby transition to State 5 is made.

When an operation of setting the virtual keyboard to be non-displayed is performed by the user in State 7, a signal for non-displaying the virtual keyboard is outputted, whereby transition to State 8 is made. On the contrary, when an operation of setting the virtual keyboard to be displayed is performed by the user in State 8, a signal for displaying the virtual keyboard is outputted, whereby transition to State 7 is made.

Figure 74:
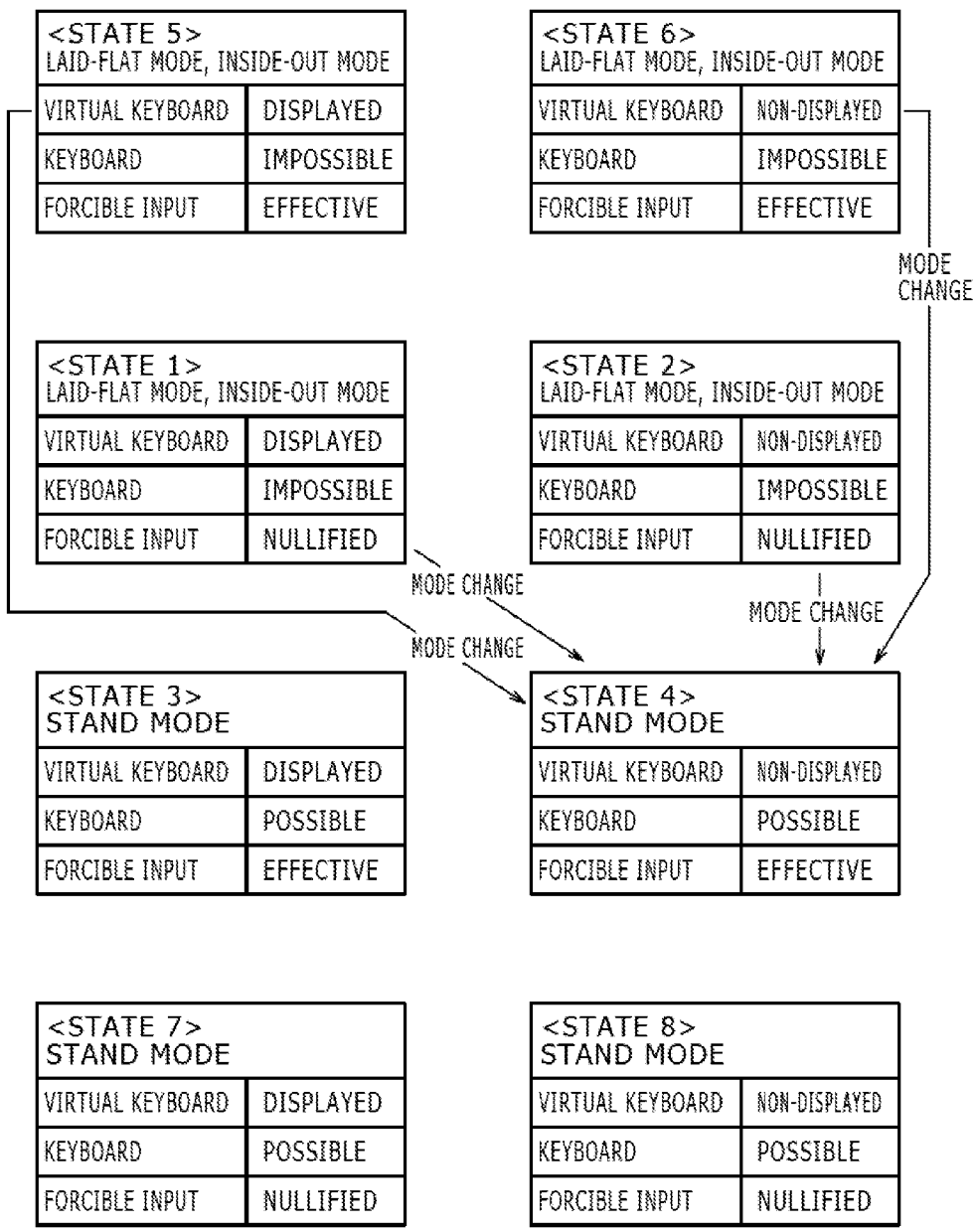
FIG. 74 shows transitions in state when the mode is changed from the laid-flat mode or inside-out mode to the stand mode by the user.

Now, transition between states when the mode is changed from the laid-flat state or inside-out state to the stand state by the user will be described below (see FIG. 74).

When the mode is changed to the stand mode by the user in State 1, State 2, State 5 or State 6, namely, starting from the condition where the laid-flat mode or the inside-out mode is set, inputs to the keyboard 70 is made possible on the basis of the state of the detection switch 83. Simultaneously, a signal for non-displaying the virtual display is outputted. Consequently, transition to State 4 is always made.

Figure 75:
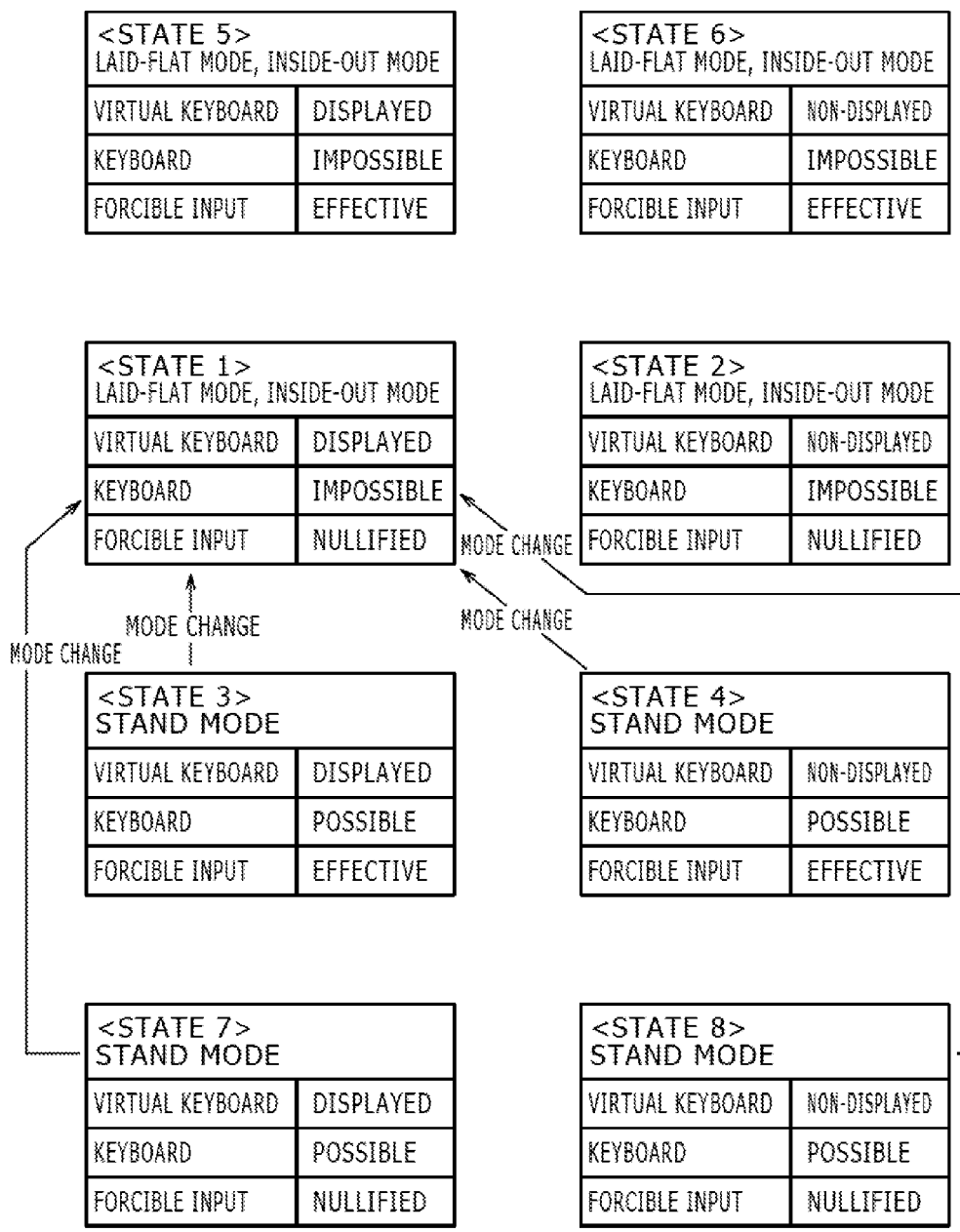
FIG. 75 shows transitions in state when the mode is changed from the stand mode to the laid-flat mode or inside-out mode by the user.

Next, transition between states when the mode is changed by the user from the stand mode to the laid-flat mode or inside out mode will be described below (see FIG. 75).

When the mode is changed to the laid-flat mode or inside-out mode by the user in State 3, State 4, State 7 or State 8, namely, starting from the condition where the stand mode is set, inputs to the keyboard 70 is made impossible on the basis of the state of the detection switch 83. Simultaneously, a signal for displaying the virtual keyboard is outputted. Consequently, transition to State 1 is always made.

Incidentally, while an example wherein inputs to the keyboard 70 are made possible/impossible based on the state of the detection switch 83 has been described above, this is not restrictive. For example, a configuration may be adopted wherein an acceleration sensor or vibration sensor is provided, and inputs to the keyboard 70 are made possible/impossible based on the result of detection by the acceleration sensor or vibration sensor.

<Flow of Control>

Figure 76:
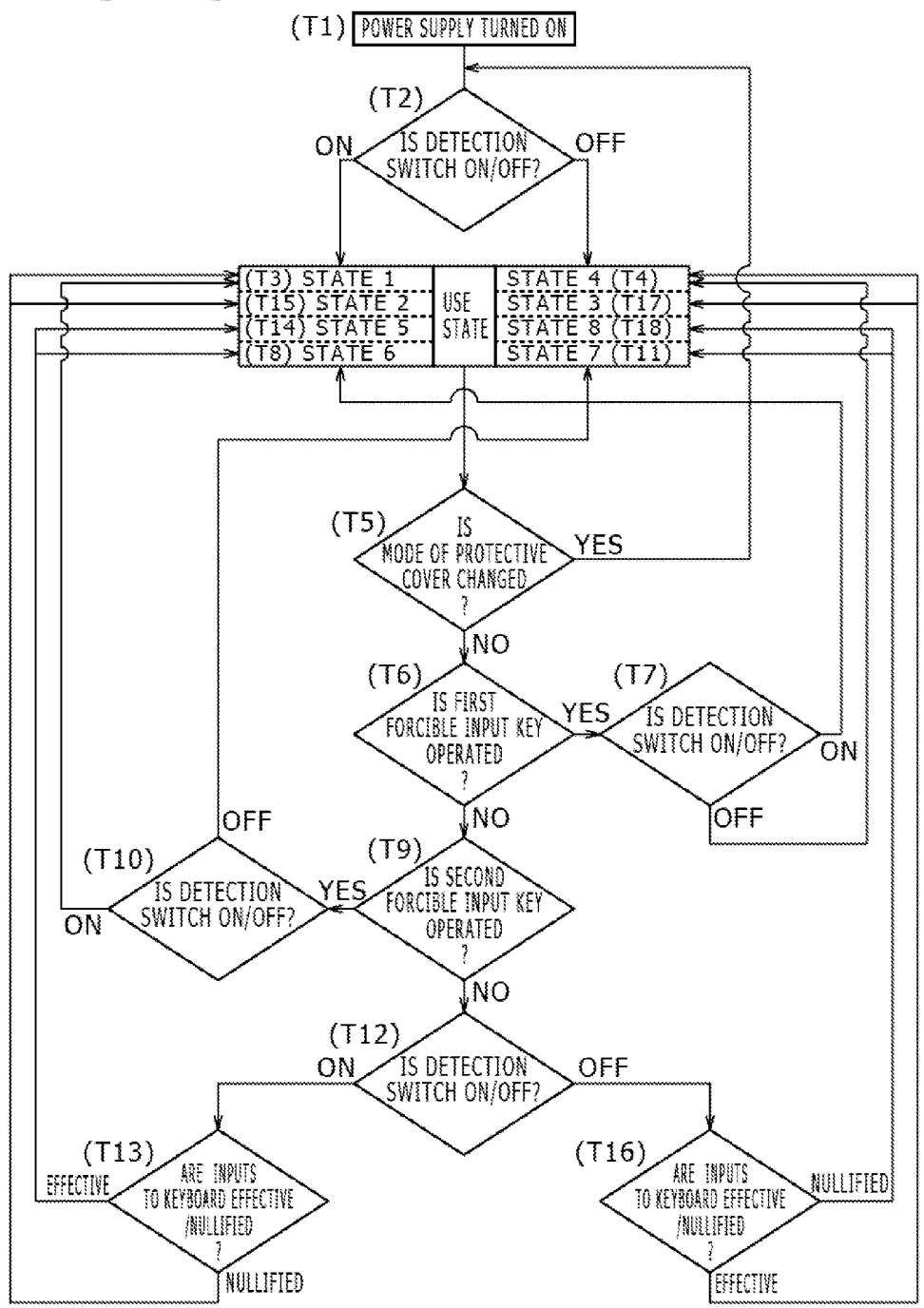
FIG. 76 is a flow chart showing the flow of control carried out by a control unit with respect to various state transitions.

Now, the flow of the control performed by the control unit 82 with respect to the above-mentioned transitions between various states will be described below (see FIG. 76).

(T1) When the power supply is turned ON, control is started and proceeds to (T2).

(T2) The mode of the protective cover 61 is detected based on the ON/OFF state of the detection switch 83. When the detection switch 83 is ON and it is thereby determined that the current mode is the laid-flat mode or inside-out mode, the control proceeds to (T3). When the detection switch 84 is OFF and it is thereby determined that the current mode is the stand mode, the control proceeds to (T4).

(T3) State 1 is set, to be a use state.

(T4) State 4 is set, to be a use state.

(T5) In the use state, whether or not the mode of the protective cover 61 has been changed is detected based on the ON/OFF state of the detection switch 83. When a change in the mode of the protective cover 61 is detected, the control proceeds to (T2). When a change in the mode of the protective cover 61 is not detected, on the other hand, the control proceeds to (T6).

(T6) It is detected whether or not the first forcible input key has been operated. When it is detected that the first forcible input key has been operated, the control proceeds to (T7). When it is not detected that the first forcible input key has been operated, the control proceeds to (T9).

(T7) The mode of the protective cover 61 is detected based on the ON/OFF state of the detection switch 83. When the detection switch 83 is ON and it is thereby determined that the current mode is the laid-flat mode or inside-out mode, the control proceeds to (T8). When the detection switch 83 is OFF and it is thereby determined that the current mode is the stand mode, the control proceeds to (T4).

(T8) State 6 is set, to be a use state.

(T9) It is detected whether or not the second forcible input key has been operated. When it is detected that the second forcible input key has been operated, the control proceeds to (T10). When it is not detected that the second forcible input key has been operated, the control proceeds to (T12).

(T10) The mode of the protective cover 61 is detected based on the ON/OFF state of the detection switch 83. When the detection switch 83 is ON and it is thereby determined that the current mode is the laid-flat mode or inside-out mode, the control proceeds to (T3). When the detection switch 83 is OFF and it is thereby determined that the current mode is the stand mode, the control proceeds to (T11).

(T11) State 7 is set, to be a use state.

(T12) The mode of the protective cover 61 is detected based on the ON/OFF state of the detection switch 83. When the detection switch 83 is ON and it is determined that the current mode is the laid-flat mode or inside-out mode, the control proceeds to (T13). When the detection switch 83 is OFF and it is determined that the current mode is the stand mode, the control proceeds to (T16).

(T13) It is detected whether inputs to the keyboard 70 are made effective or nullified. When it is detected that inputs to the keyboard 70 are made effective, the control proceeds to (T14) or (T8) according as the virtual keyboard is displayed or non-displayed. When it is detected that inputs to the keyboard 70 are nullified, the control proceeds to (T3) or (T15) according as the virtual keyboard is displayed or non-displayed.

(T14) State 5 is set, to be a use state.

(T15) State 2 is set, to be a use state.

(T16) It is detected that inputs to the keyboard 70 are made effective or nullified. When it is detected that inputs to the keyboard 70 are made effective, the control proceeds to (T17) or (T4) according as the virtual keyboard is displayed or non-displayed. When it is detected that inputs to the keyboard 70 are nullified, the control proceeds to (T11) or (T8) according as the virtual keyboard is displayed or non-displayed.

(T17) State 3 is set, to be a use state.

(T18) State 8 is set, to be a use state.

As above-mentioned, in the protective cover 61, a plurality of different kinds of modes are distinguished according to the state of the detection switch 83. Therefore, various kinds of control can be performed according to the detection results, which promises enhanced convenience in use.

In addition, whether inputs to the keyboard 70 are possible or impossible is determined according to the distinction of the plurality of different kinds of modes. Therefore, inputs to the keyboard 70 are made possible or impossible according to the use mode. Consequently, appropriate input operation conditions according to the use conditions can be secured.

Further, whether input operations on the keyboard are possible or impossible can be determined by the forcible input keys, irrespectively of whether the input operations on the keyboard 70 are possible or impossible. Therefore, good operability according to the user's intention can be secured.

Furthermore, control of the displayed/non-displayed state of the virtual keyboard is performed when a change in the state of the detection switch 83 is detected. Therefore, appropriate input operation conditions according to the use conditions can be secured.

In addition, since control of the displayed/non-displayed state of the virtual keyboard is performed by the forcible input keys, good operability according to the user's intention can be secured.

[Summarizing]

As above-mentioned, the protective cover 1 can be set into the cover mode for storing (housing) and protecting the electronic apparatus 2, and various operations according to operations on the touch pad 12 and the keyboard 13 are carried out not by wireless communication but by wired communication through the wiring board 16.

Therefore, it is unnecessary to dispose a circuit substrate and a battery for wireless communication inside the protective cover 1, in addition to the touch pad 12 and the keyboard 13. Besides, enhanced convenience in use can be promised while securing a simplified structure and a reduced thickness.

In addition, the protective cover 1 can be set into the stand mode for being used as a stand for the electronic apparatus 2.

Accordingly, the protective cover 1 has multiple uses, and enhanced convenience of the protective cover 1 can be realized.

Besides, the protective cover 1 is provided with the stand section 11 against which the electronic apparatus 2 can stand, and the back plate 15 for bearing the electronic apparatus 2 is mounted to the stand section 11.

Therefore, the standing state of the electronic apparatus 2 can be stabilized.

Further, the back plate 15 is provided with the connection terminal section 15*a* for connection to the electronic apparatus 2, part of the wiring board 16 is disposed inside the back plate 15, and one end portion of the wiring board 16 is connected to the connection terminal section 15*a*.

Accordingly, the wiring board 16 is connected to the connection terminal section 15*a* provided in the back plate 15, which is high in rigidity. As a result, a stable standing state of the electronic apparatus 2 is secured, and a stable connection condition between the wiring board 16 and the electronic apparatus 2 can be ensured.

Furthermore, the first folding section 4 is provided between the touch pad 12 and the keyboard 13 which function as different kinds of input operating units.

Therefore, the first folding section 4 can be folded when the protective cover 1 is set into the cover mode. This makes it possible to realize a reduction in size in the cover mode while securing enhanced operability.

In addition, the protective cover 61 can be set into the cover mode in which the electronic apparatus 62 is stored inside and protected by the protective cover 61. Various operations according to operations on the keyboard 70 are conducted not through wireless communication but through wired communication based on the wiring boards 73 and 74, etc.

Therefore, it is unnecessary to dispose a circuit substrate and a battery for wireless communication inside the protective cover 61 in addition to the keyboard 70. This promises enhanced convenience in use, while securing a simplified structure and a reduced thickness.

In addition, the protective cover 61 can be set into the stand mode in which the protective cover 61 is used as a stand for the electronic apparatus 62.

Accordingly, the protective cover 61 has multiple kinds of use, so that enhanced convenience of the protective cover 61 is promised.

Besides, the protective cover 61 is provided with the stand section 69 against which the electronic apparatus 62 is permitted to stand, and the back plate 72 for bearing the electronic apparatus 62 is attached to the stand section 69.

Therefore, stabilization of the standing state of the electronic apparatus 62 can be realized.

Furthermore, the back plate 72 is provided with the connection terminal section 72*a* for connection to the electronic apparatus 62, a part of the wiring board 73 is disposed inside the back plate 72, and a one-end portion of the wiring board 74 is connected to the connection terminal section 72*a*.

Accordingly, since the wiring board 74 is connected to the connection terminal section 72*a* provided on the back plate 72 which is high in rigidity, a stable standing state of the electronic apparatus 62 is secured, and a stable connection state between the wiring boards 73, 74 and the electronic apparatus 62 can be secured.

[Present Technology]

The present technology can also be configured in the following manner.

(1) A protective cover including: an input operating unit through which an input operation to an electronic apparatus is performed; and a cover unit in which the input operating unit is disposed, wherein the cover unit includes at least one folding section and at least two plate sections connected to the folding section, a connection terminal section is provided to which the electronic apparatus is connected, a wiring section which interconnects the input operating unit and the connection terminal section and which is bent attendantly on folding at the folding section is disposed inside the cover unit, and folding at the folding section into a predetermined shape enables setting of a cover mode in which the electronic apparatus is covered.

(2) The protective cover as described in the above paragraph (1), wherein folding at the folding section into a shape different from the predetermined shape permits part of the plate sections to function as a stand section against which the electronic apparatus can stand, whereby setting of a stand mode in which the electronic apparatus can stand against the stand section is performed.

(3) The protective cover as described in the above paragraph (2), wherein a back plate operative to support the electronic apparatus when the electronic apparatus stands against the stand section is attached to the stand section.

(4) The protective cover as described in the above paragraph (3), wherein the connection terminal section is provided at a surface of the back plate, and part of the wiring section is disposed inside the back plate.

(5) The protective cover as described in any of the above paragraphs (1) to (4), wherein a first input operating unit and a second input operating unit are provided as the input operating unit, and the folding section is provided between the first input operating unit and the second input operating unit.

(6) The protective cover as described in any of the above paragraphs (1) to (5), wherein binding parts are provided respectively at one end portion and other end portion of the cover unit, and the binding parts are bound to each other so that the electronic apparatus is wholly covered when the cover mode is set.

(7) The protective cover as described in any of the above paragraphs (2) to (6), wherein at least one of the plate sections functions as a mount section including: a mount surface which is contacted or approached by a side portion of the electronic apparatus when the electronic apparatus stands against the stand section; and a position restraining section which restrains the position of the electronic apparatus.

(8) The protective cover as described in the above paragraph (7), wherein at least one of the plate sections functions as an operating region section having the input operating unit, and a plurality of the position restraining sections are provided at an interval along a direction in which the mount section and the operating region section are aligned.

(9) The protective cover as described in the above paragraph (7), wherein a position restraining projection projecting from the mount surface is provided as the position restraining section.

(10) The protective cover as described in the above paragraph (7), wherein a position restraining recess opening in the mount surface is formed as the position restraining section.

(11) The protective cover as described in the above paragraph (10), wherein the position restraining recess is formed in part other than part where the wiring section is disposed.

(12) The protective as described in any of the above paragraphs (1) to (11), wherein the cover unit is formed from an elastomer.

(13) The protective cover as described in the above paragraph (7), wherein a position restraining magnet is provided as the position restraining section.

(14) The protective over as described in any of the above paragraphs (1) to (13), wherein the cover unit is provided with a contact-preventing section which is located between the plate section and the electronic apparatus when the cover mode is set.

(15) The protective cover as described in any of the above paragraphs (1) to (14), wherein the cover unit is provided with a stand section against which the electronic apparatus is permitted to stand, the input operating unit is provided with an operating key, and that part of the plate section which faces the operating key is provided with an operating recess opening to a side opposite to the operating key side.

(16) The protective cover as described in any of the above paragraphs (1) to (15), wherein the cover unit is provided with a stand section against which the electronic apparatus is permitted to stand, a back plate which supports the electronic apparatus when the electronic apparatus stands against the stand section is attached to the stand section, and the electronic apparatus is supported on the back plate so as to be turnable and movable along the back plate.

(17) An information processor including: an electronic apparatus having a display surface; and a protective cover including an input operating unit through which an input operation to the electronic apparatus is performed and a cover unit in which the input operating unit is disposed, wherein the cover unit includes at least one folding section and at least two plate sections connected to the folding section, a connection terminal section is provided to which the electronic apparatus is connected, a wiring section which interconnects the input operating unit and the connection terminal section and which is bent attendantly on folding at the folding section is disposed inside the cover unit, and folding at the folding section into a predetermined shape enables setting of a cover mode in which the electronic apparatus is covered.

(18) A protective cover including: an input operating unit through which an input operation to an electronic apparatus is performed; and a cover unit in which the input operating unit is disposed, wherein the cover unit includes at least one folding section and at least two plate sections connected to the folding section, a connection terminal section is provided to which the electronic apparatus is connected, a back plate for bearing the electronic apparatus is attached to part of the cover section, the back plate is provided with a detection switch, a plurality of different modes are set according to folded states at the folding section, and the kinds of a plurality of different modes are discriminated according to the ON/OFF state of the detection switch.

(19) The protective cover as described in the above paragraph (18), wherein the possible/impossible state of inputs to the input operating unit is determined according to the distinction of the kinds of the plurality of modes.

(20) The protective cover as described in the above paragraph (19), wherein it is possible to operate forcible input keys capable of determining the possible/impossible state of inputs to the input operating unit, irrespectively of determination of the possible/impossible state of inputs to the input operating unit according to the discrimination of the kinds of the plurality of modes.

(21) The protective cover as described in any of the above paragraphs (18) to (20), wherein a virtual input operating unit having the same input function as that of the input operating unit can be displayed on a display surface of the electronic apparatus, and the virtual input operating unit is always displayed on the display surface when a change in the ON/OFF state of the detection switch is detected.

(22) The protective cover as described in any of the above paragraphs (18) to (20), wherein a virtual input operating unit having the same input function as that of the input operating unit can be displayed on a display surface of the electronic apparatus, and the virtual input operating unit is always non-displayed on the display surface when a change in the ON/OFF state of the detection switch is detected.

(23) The protective cover as described in any of the above paragraphs (18) to (22), wherein a virtual input operating unit having the same input function as that of the input operating unit can be displayed on a display surface of the electronic apparatus, and the virtual input operating unit is always displayed on the display surface when the forcible input key is operated.

(24) The protective cover as described in any of the above paragraphs (18) to (22), wherein a virtual input operating unit having the same input function as that of the input operating unit can be displayed on a display surface of the electronic apparatus, and the virtual input operating unit is always non-displayed on the display surface when the forcible input key is operated.

(25) The protective cover as described in any of the above paragraphs (18) to (24), wherein the electronic apparatus is slid relative to the cover unit and mounted to the back plate, and the cover unit is provided with a guide projection for guiding the electronic apparatus during the sliding of the electronic apparatus.

(26) The protective cover as described in any of the above paragraphs (18) to (25), wherein the back plate is provided with a holding projection for holding the electronic apparatus.

(27) The protective cover as described in any of the above paragraphs (18) to (26), wherein the cover unit is provided with operating projections, and operating keys are provided which are located on the inside of the outer shapes of the operating projections inside the cover unit.

(28) The protective cover as described in the above paragraph (27), wherein the operating projections and the corresponding operating keys are analogous in shape.

(29) An information processor including: an electronic apparatus having a display surface; and a protective cover including an input operating unit through which an input operation to the electronic apparatus is performed and a cover unit in which the input operating unit is disposed, wherein the cover unit includes at least one folding section and at least two plate sections connected to the folding section, a connection terminal section is provided to which the electronic apparatus is connected, a back plate which bears the electronic apparatus is attached to part of the cover section, the back plate is provided with a detection switch, a plurality of different modes are set according to the folded state at the folding section, and the kinds of the plurality of different modes are discriminated according to the ON/OFF state of the detection switch.

The specific shapes and structures of parts or sections or units described above in the best modes for carrying out the present technology are each merely shown as an example of embodiment in carrying out the present technology, and the technical scope of the present technology is not to be construed restrictively according to these specific shapes and structures mentioned.

It should be understood by those skilled in the art that various modifications, combinations, sub-combinations and alterations may occur depending on design requirements and other factor in so far as they are within the scope of the appended claims or the equivalents thereof.

What is claimed is:

1. A protective cover comprising:
   an input operating unit through which an input operation to an electronic apparatus, mounted to the protective cover, is performed;
   a cover unit in which the input operating unit is disposed, wherein the cover unit includes:
   a folding section, and
   two plate sections connected to the folding section, wherein the electronic apparatus is slidably inserted into the cover unit to mount the electronic apparatus to the protective cover;
   a connection terminal section provided on the cover unit, wherein the electronic apparatus mounted to the protective cover is connected to the input operating unit through the connection terminal section; and
   a wiring section, which interconnects the input operating unit and the connection terminal section and which is bent attendantly on folding at the folding section, is disposed inside the cover unit,
   wherein folding at the folding section into a predetermined shape enables setting of a cover mode in which the electronic apparatus is covered by the protective cover.

2. The protective cover according to claim 1,
   wherein folding at the folding section into a shape different from the predetermined shape permits a part of a first plate section of the two plate sections to function as a stand section against which the electronic apparatus is permitted to stand,
   whereby setting of a stand mode in which the electronic apparatus can stands against the stand section is performed.

3. The protective cover according to claim 2, wherein a back plate operative to support the electronic apparatus when the electronic apparatus stands against the stand section is attached to the stand section.

4. The protective cover according to claim 3,
   wherein the connection terminal section is provided at a surface of the back plate, and
   part of the wiring section is disposed inside the back plate.

5. The protective cover according to claim 2,
   wherein a part of second plate section of the two plate sections functions as a mount section including:
   a mount surface which is contacted or approached by a side portion of the electronic apparatus when the electronic apparatus stands against the stand section; and
   a position restraining section which restrains a position of the electronic apparatus.

6. The protective cover according to claim 5,
   wherein another part of the section plate section of the two plate sections functions as an operating region section having the input operating unit, and
   a plurality of the position restraining sections are provided at an interval along a direction in which the mount section and the operating region section are aligned.

7. The protective cover according to claim 5, wherein a position restraining projection projecting from the mount surface is provided as the position restraining section.

8. The protective cover according to claim 5, wherein a position restraining recess opening in the mount surface is formed as the position restraining section.

9. The protective cover according to claim 8, wherein the position restraining recess opening is formed in part of the mount surface other than part where the wiring section is disposed.

10. The protective cover according to claim 5, wherein a position restraining magnet is provided as the position restraining section.

11. The protective cover according to claim 1,
    wherein a first input operating unit and a second input operating unit are provided as the input operating unit, and
    the folding section is provided between the first input operating unit and the second input operating unit.

12. The protective cover according to claim 1,
    wherein binding parts are provided respectively at one end portion and other end portion of the cover unit, and
    the binding parts are bound to each other so that the electronic apparatus is wholly covered by the protective cover when the cover mode is set.

13. The protective cover according to claim 1, wherein the cover unit is formed from an elastomer.

14. The protective cover according to claim 1, wherein the cover unit is provided with a contact-preventing section which is located between a plate section of the two plate sections and a display of the electronic apparatus when the cover mode is set, wherein the contact-preventing section is in contact with the display.

15. The protective cover according to claim 1,
    wherein the cover unit is provided with a stand section against which the electronic apparatus is permitted to stand,
    the input operating unit is provided with an operating key, and
    that part of a plate section of the two plate sections which faces the operating key is provided with an operating recess opening to a side opposite to the operating key side.

16. The protective cover according to claim 1,
    wherein the cover unit is provided with a stand section against which the electronic apparatus is permitted to stand,
    a back plate which supports the electronic apparatus, when the electronic apparatus stands against the stand section, is attached to the stand section, and
    the electronic apparatus is supported on the back plate so as to be turnable and movable along the back plate.

17. An information processor comprising:
    an electronic apparatus having a display surface; and
    a protective cover configured to mount the electronic apparatus, the protective cover including:
    an input operating unit through which an input operation to the electronic apparatus is performed;
    a cover unit in which the input operating unit is disposed, wherein the cover unit includes:
    a folding section, and
    two plate sections connected to the folding section, wherein the electronic apparatus is slidably inserted into the cover unit to mount the electronic apparatus to the protective cover;
    a connection terminal section provided on the cover unit, wherein the electronic apparatus mounted to the protective cover is connected to the input operating unit through the connection terminal section; and
    a wiring section, which interconnects the input operating unit and the connection terminal section and which is bent attendantly on folding at the folding section, is disposed inside the cover unit,
    wherein folding at the folding section into a predetermined shape enables setting of a cover mode in which the electronic apparatus is covered by the protective cover.

* * * * *